US009902270B2

(12) United States Patent
Hashimoto

(10) Patent No.: US 9,902,270 B2
(45) Date of Patent: Feb. 27, 2018

(54) MOTOR-DRIVEN VEHICLE

(71) Applicant: TOYOTA JIDOSHA KABUSHIKI KAISHA, Toyota-shi, Aichi-ken (JP)

(72) Inventor: Toshiya Hashimoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/328,242

(22) PCT Filed: Jun. 26, 2015

(86) PCT No.: PCT/JP2015/003225
§ 371 (c)(1),
(2) Date: Jan. 23, 2017

(87) PCT Pub. No.: WO2016/013158
PCT Pub. Date: Jan. 28, 2016

(65) Prior Publication Data
US 2017/0217313 A1 Aug. 3, 2017

(30) Foreign Application Priority Data

Jul. 23, 2014 (JP) ................. 2014-150051

(51) Int. Cl.
*H02P 1/00* (2006.01)
*B60L 3/00* (2006.01)
(Continued)

(52) U.S. Cl.
CPC ............ *B60L 3/003* (2013.01); *B60L 11/1855* (2013.01); *B60L 11/1868* (2013.01); *B60L 15/20* (2013.01);
(Continued)

(58) Field of Classification Search
CPC .............. Y02T 10/7005; Y02T 90/127; Y02T 10/7055; B60L 2240/545; B60L 11/1868;
(Continued)

(56) References Cited

U.S. PATENT DOCUMENTS 7,710,067 B2 *  5/2010  Kosaka ............... B60L 11/1864
                                                    318/479
8,928,174 B2 *  1/2015  Muto ................. B60L 11/1855
                                                    307/71
(Continued)

FOREIGN PATENT DOCUMENTS

EP          2773034 A1     9/2014
JP       2012-051515 A     3/2012
(Continued)

*Primary Examiner* — Bentsu Ro
*Assistant Examiner* — Thai Dinh
(74) *Attorney, Agent, or Firm* — Oliff PLC

(57) ABSTRACT

Disclosed is a motor-driven vehicle including: a first and second battery; a voltage converter that includes a plurality of switching elements configured to perform voltage conversion between an electric power output path and the first and second battery, and to switch the connection of the first battery and the second battery between an in-series connection and an in-parallel connection; a motor-generator; and a control device configured to turn on and off the switching elements, in which the control device switches connection to either of connection between the electric power output path and both the first battery and the second battery, and connection between the first battery and the second battery based on the switching element temperature, and the operating point of the motor-generator.

15 Claims, 44 Drawing Sheets

(51) Int. Cl.
*B60L 11/18* (2006.01)
*B60L 15/20* (2006.01)
*H02M 3/158* (2006.01)
*H02P 27/06* (2006.01)

(52) U.S. Cl.
CPC ....... *B60L 2210/12* (2013.01); *B60L 2210/14* (2013.01); *B60L 2240/36* (2013.01); *B60L 2240/421* (2013.01); *B60L 2240/423* (2013.01); *B60L 2240/429* (2013.01); *B60L 2240/525* (2013.01); *B60L 2240/526* (2013.01); *B60L 2240/527* (2013.01); *B60L 2240/547* (2013.01); *B60L 2260/26* (2013.01); *H02M 3/158* (2013.01); *H02P 27/06* (2013.01)

(58) Field of Classification Search
CPC .............. B60L 2240/36; B60L 11/1811; B60L 2240/425; B60L 11/1855; B60L 3/003
USPC .................. 318/139, 83, 95; 307/63, 71, 80
See application file for complete search history.

(56) References Cited

U.S. PATENT DOCUMENTS

| | | | |
|---|---|---|---|
| 8,994,212 B2* | 3/2015 | Kurokawa | H02M 7/537 307/37 |
| 2002/0113493 A1* | 8/2002 | Morrow | H02J 7/0024 307/71 |
| 2013/0134786 A1 | 5/2013 | Ishigaki et al. | |
| 2014/0265605 A1* | 9/2014 | Ishigaki | H02M 3/158 307/80 |

FOREIGN PATENT DOCUMENTS

| | | |
|---|---|---|
| JP | 2012-070514 A | 4/2012 |
| JP | 2013-093923 A | 5/2013 |

* cited by examiner

[Fig. 25]
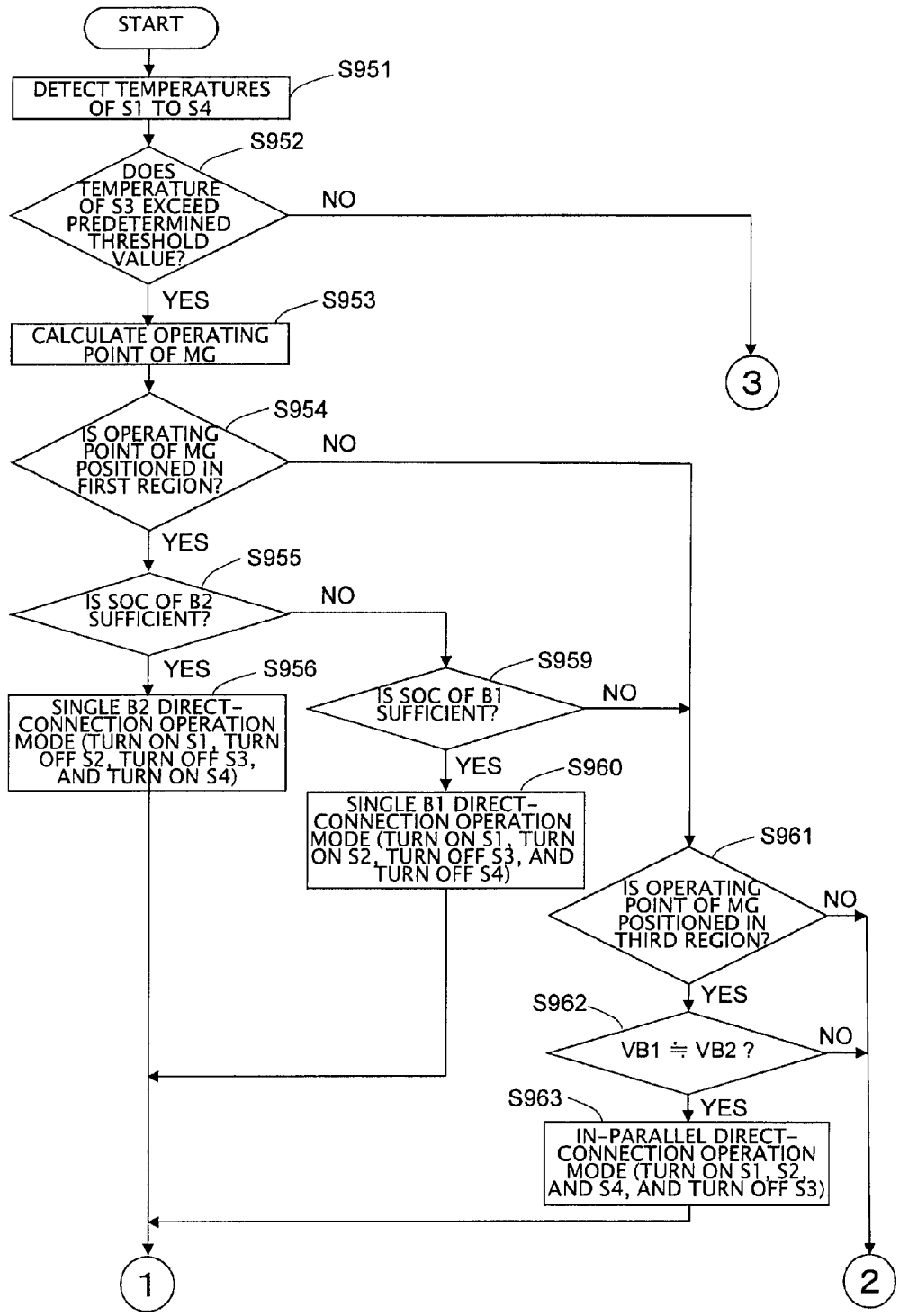

[Fig. 26]
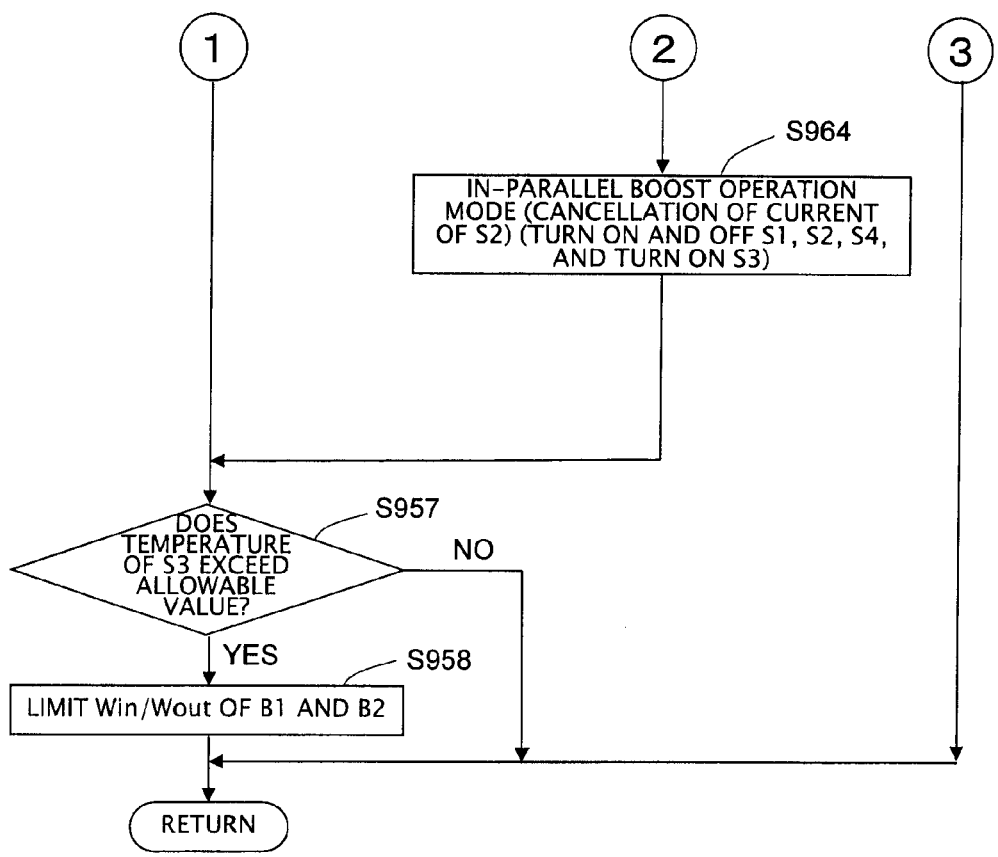

[Fig. 27]
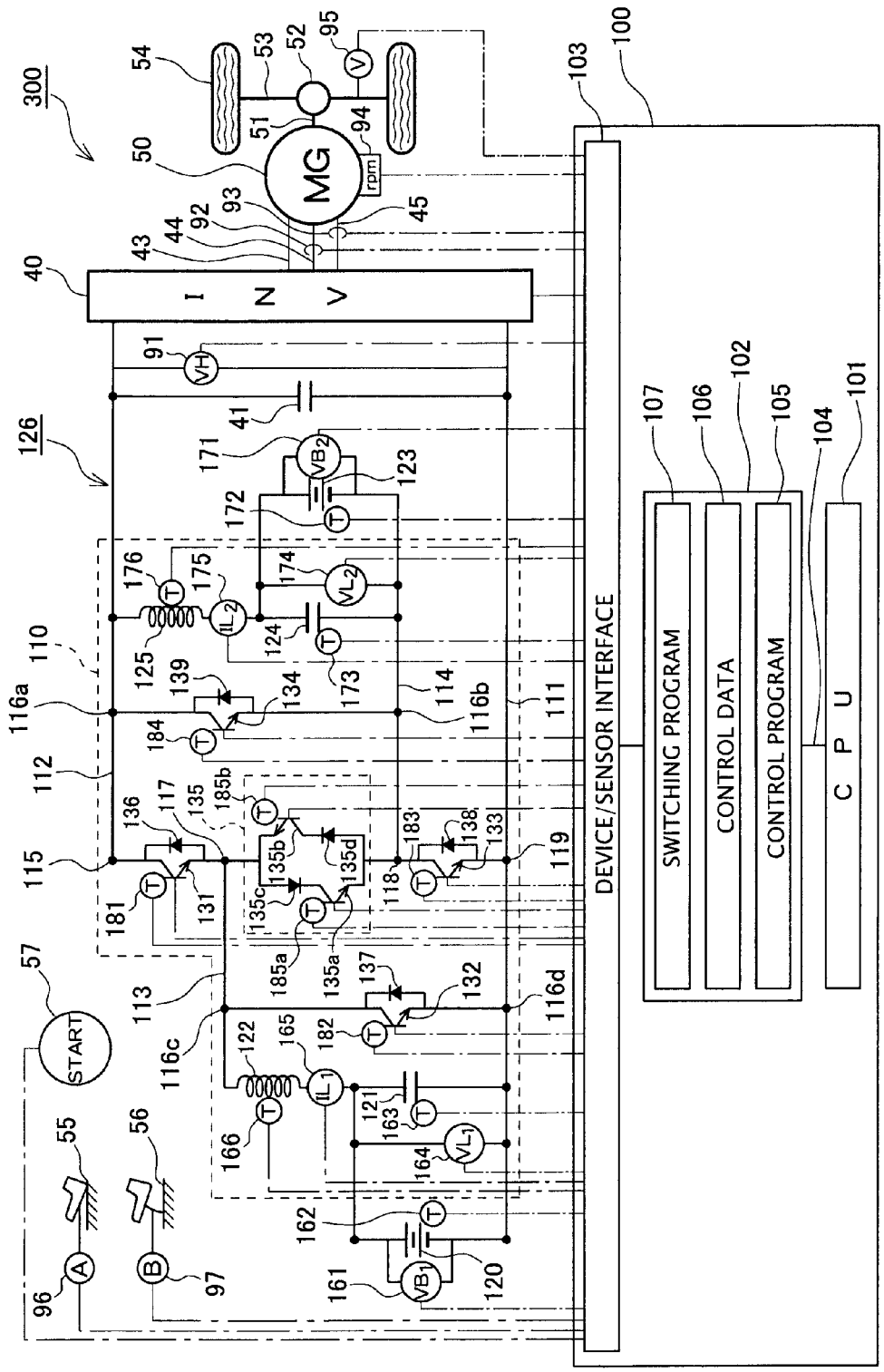

[Fig. 28]
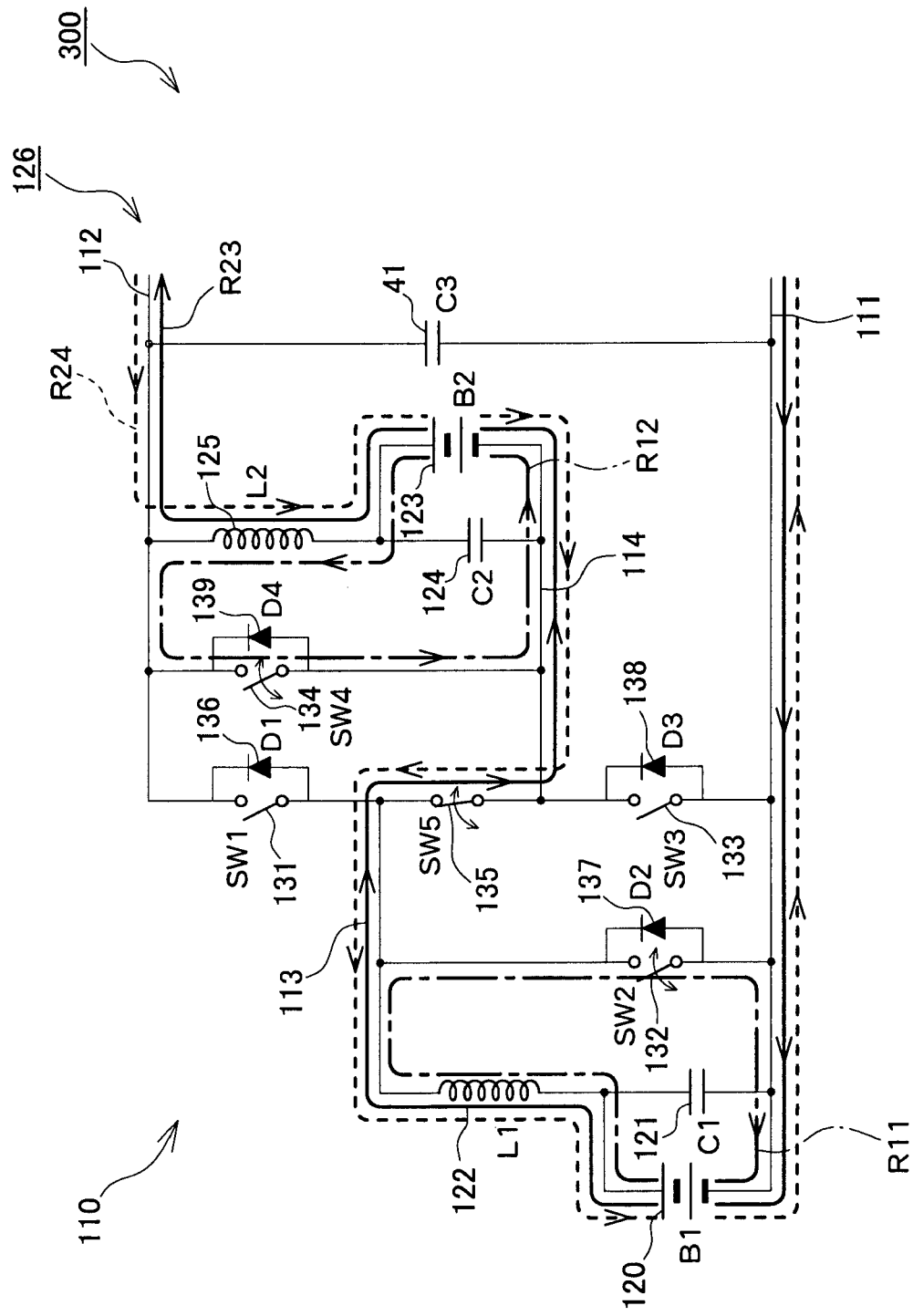

[Fig. 29]
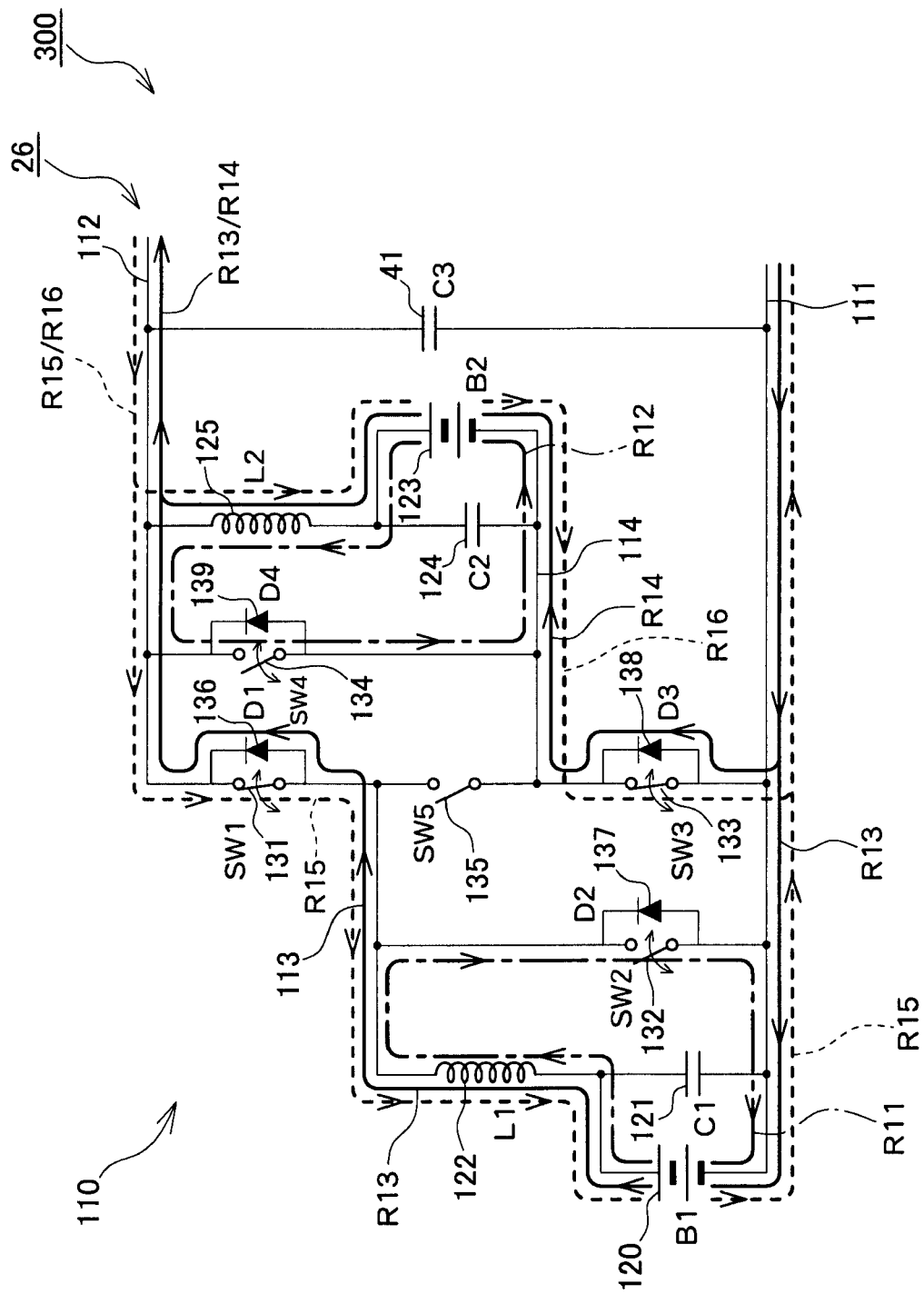

[Fig. 30]
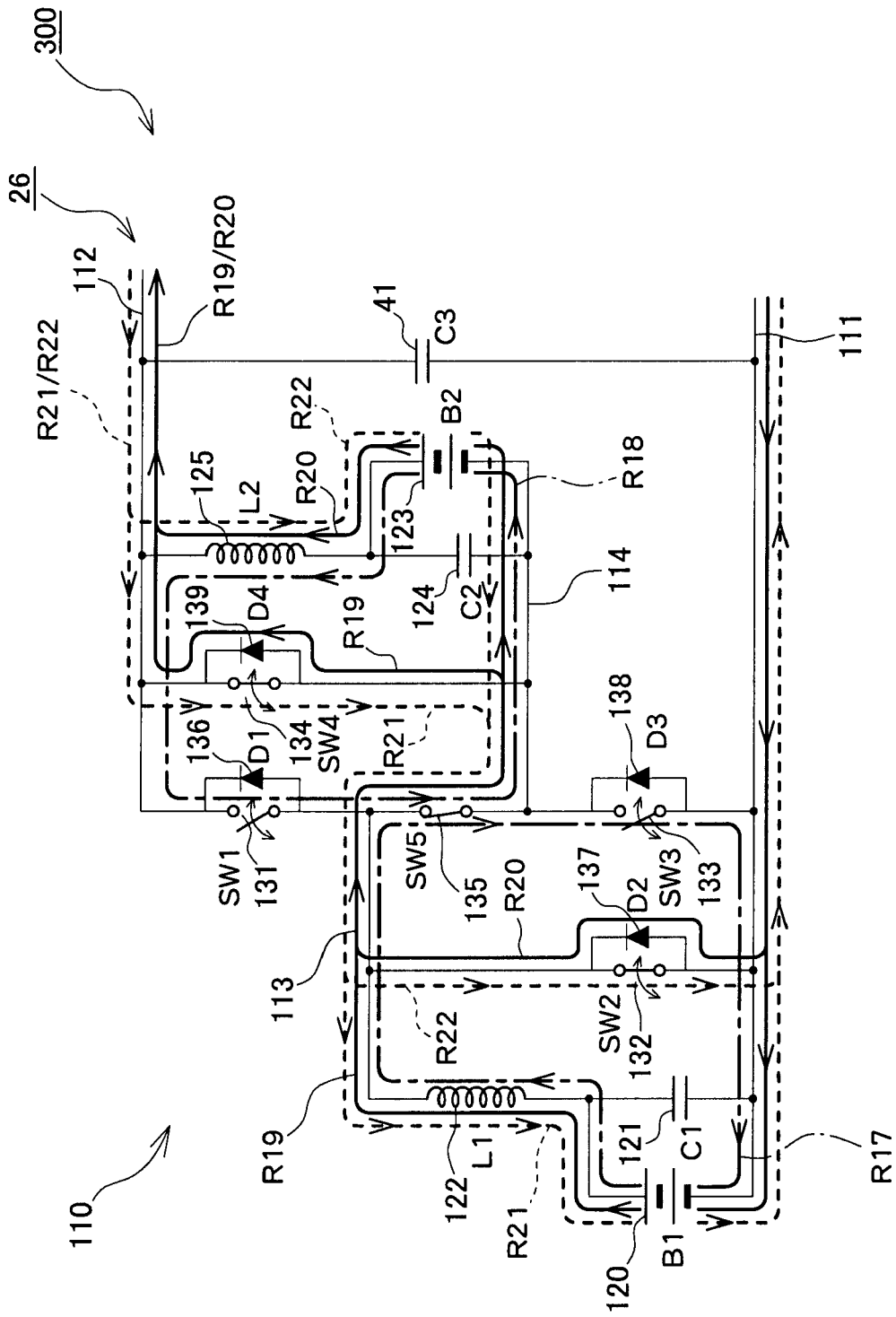

[Fig. 31]
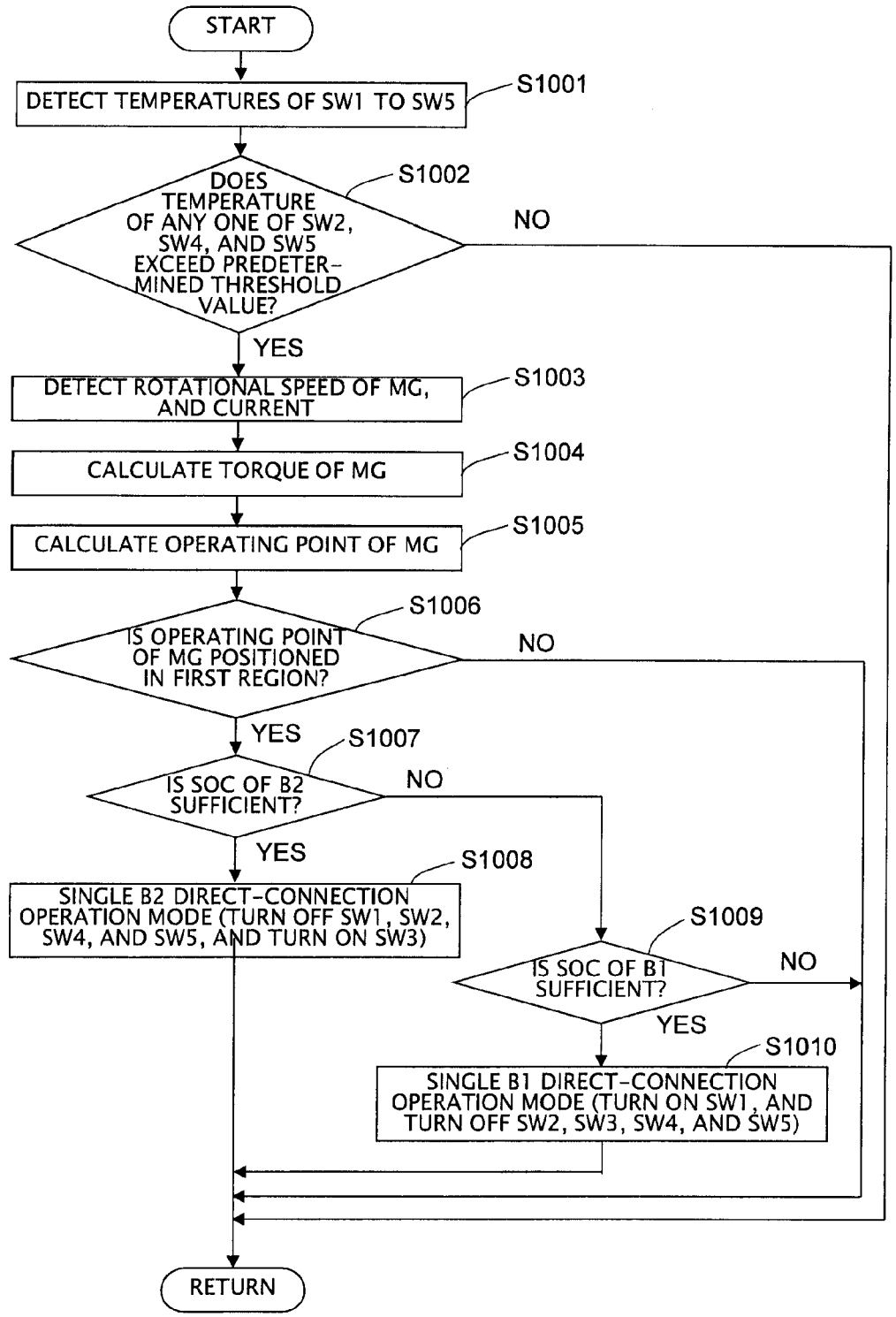

[Fig. 32]
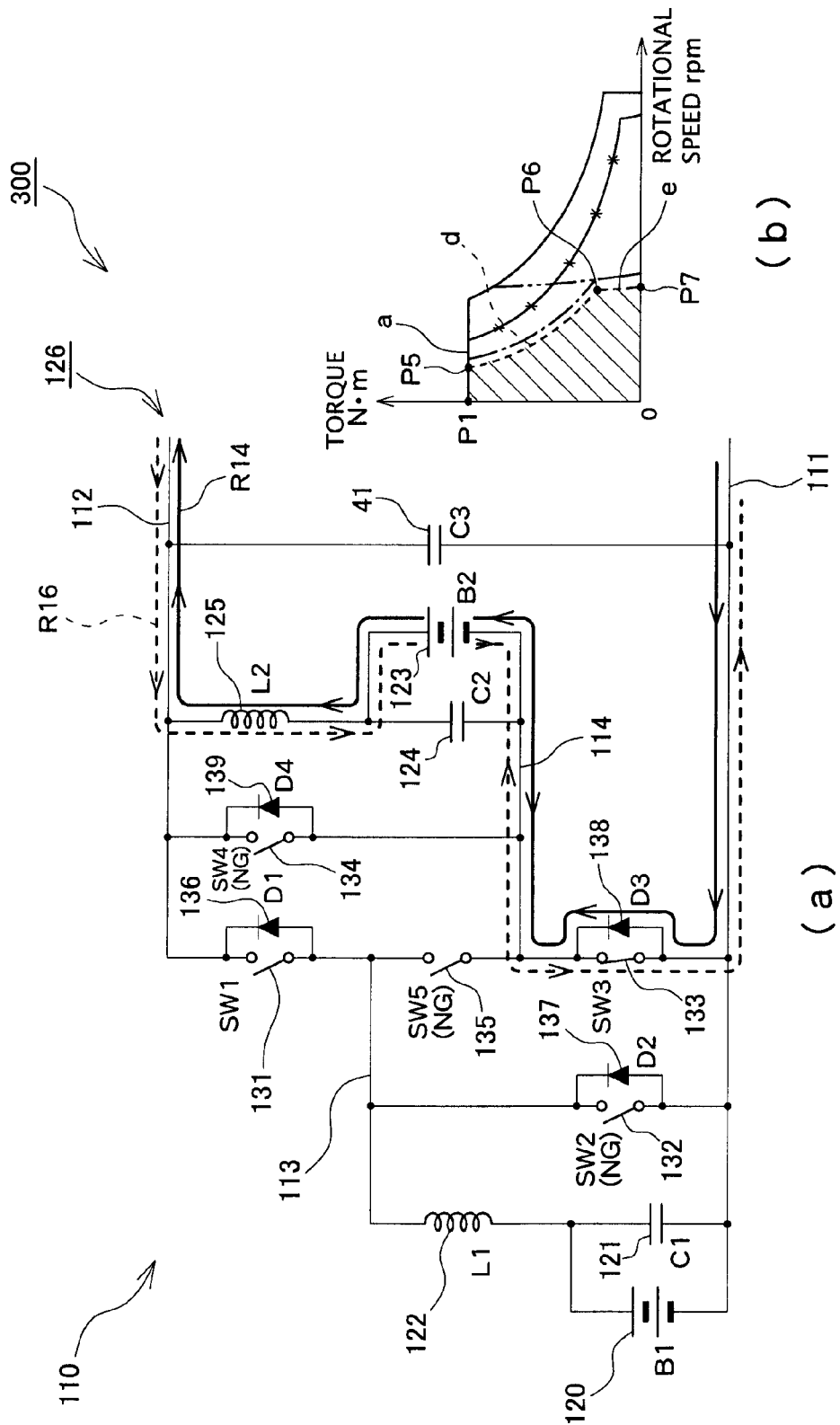

[Fig. 33]
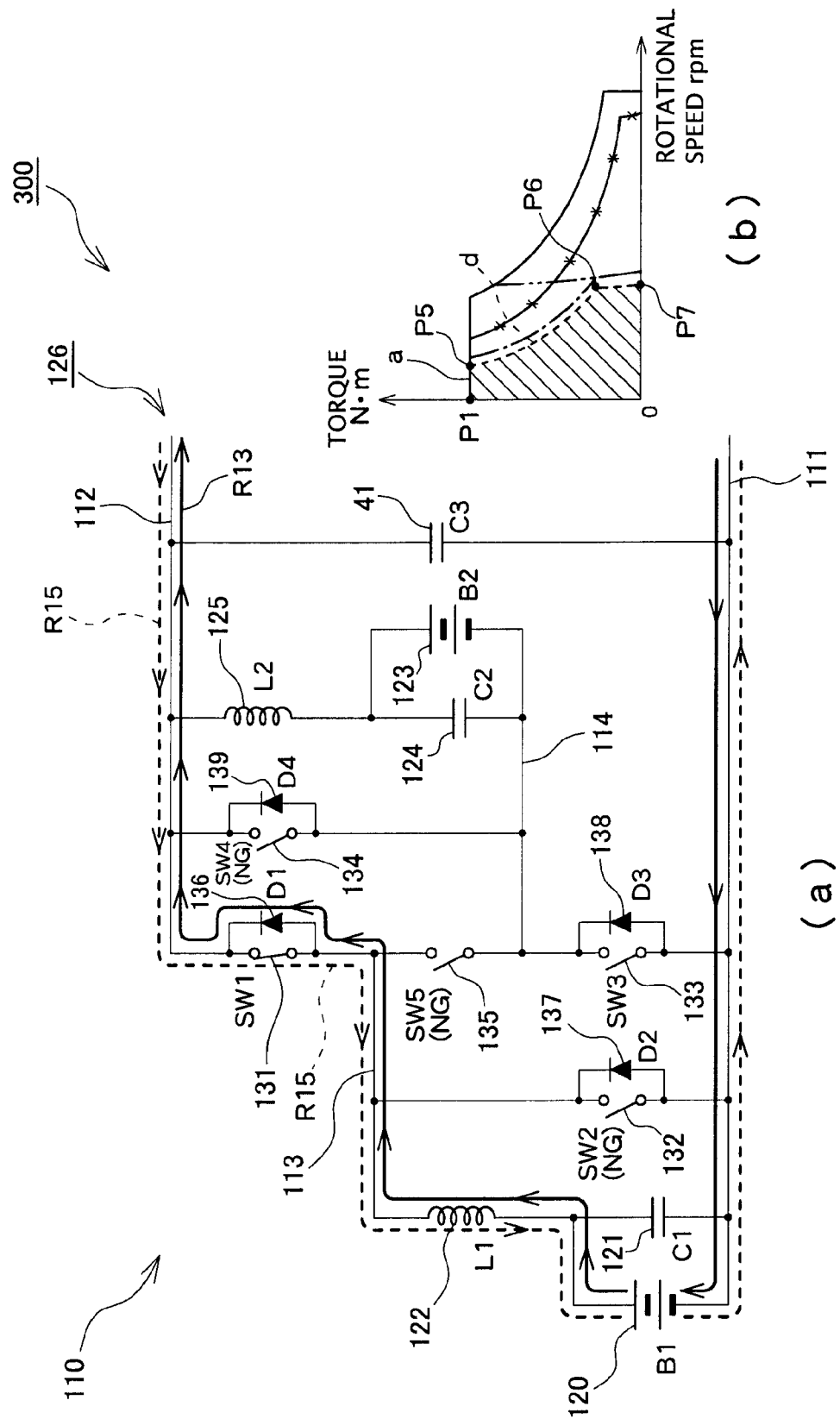

[Fig. 34]
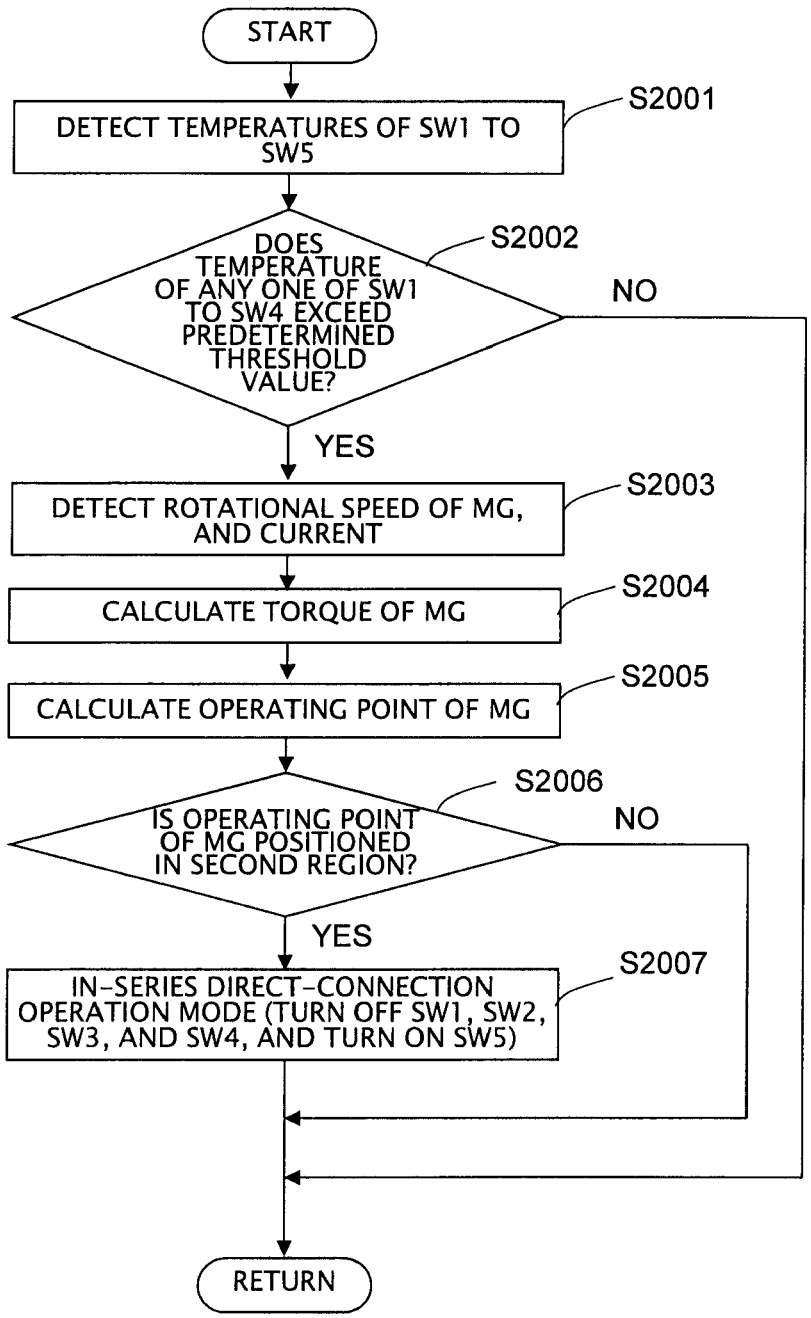

[Fig. 35]
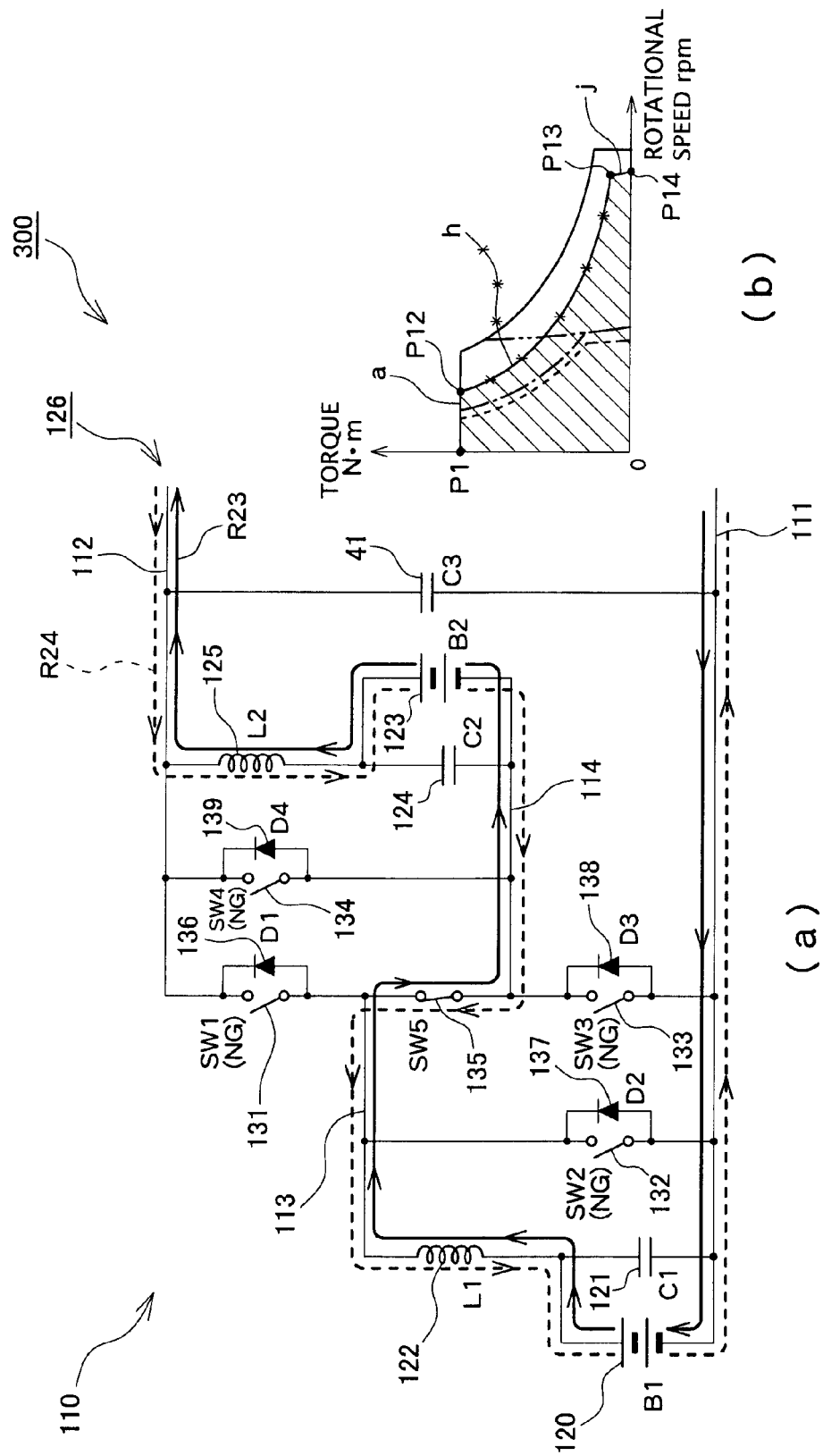

[Fig. 36]
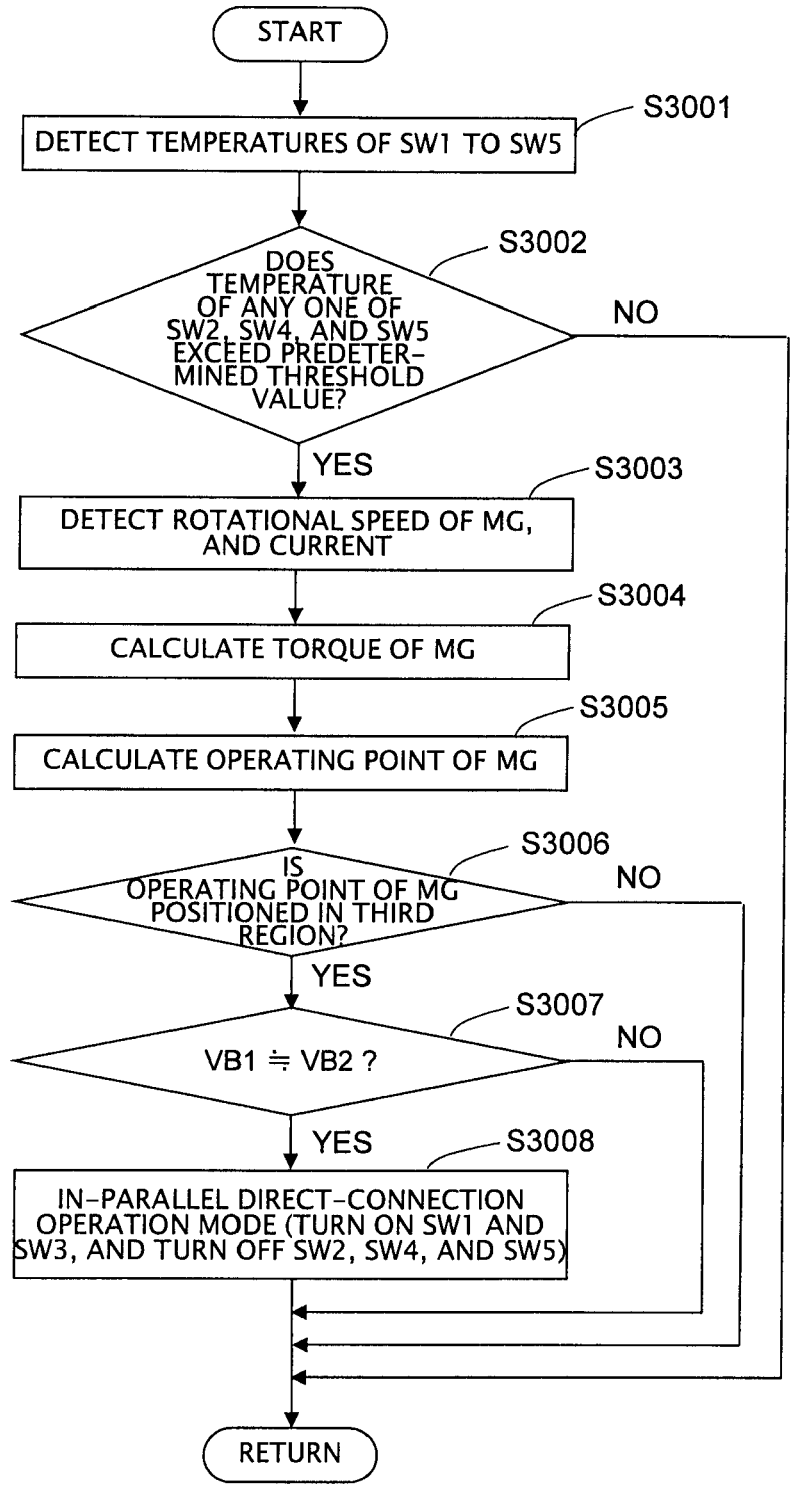

[Fig. 37]
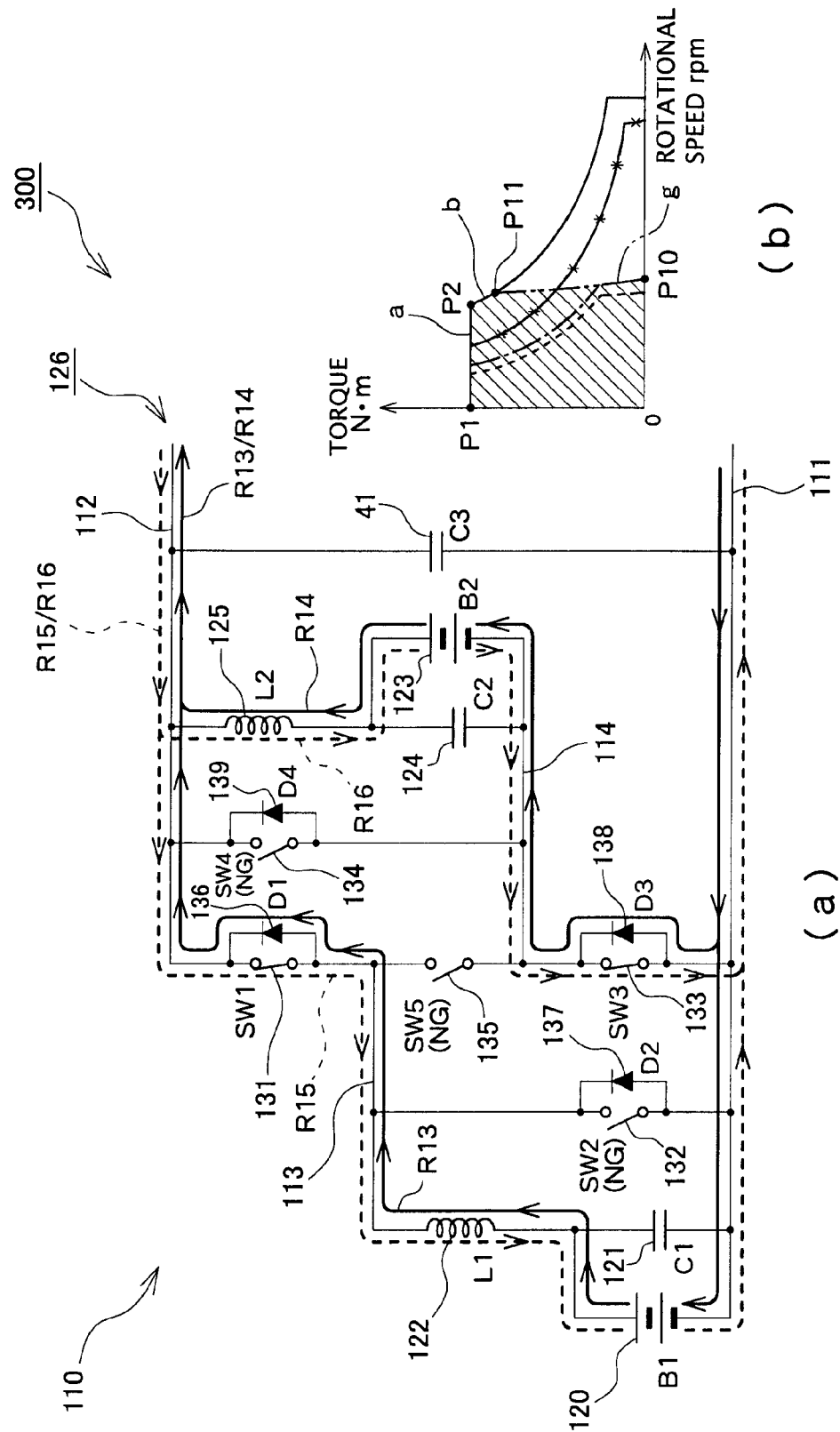

[Fig. 38]
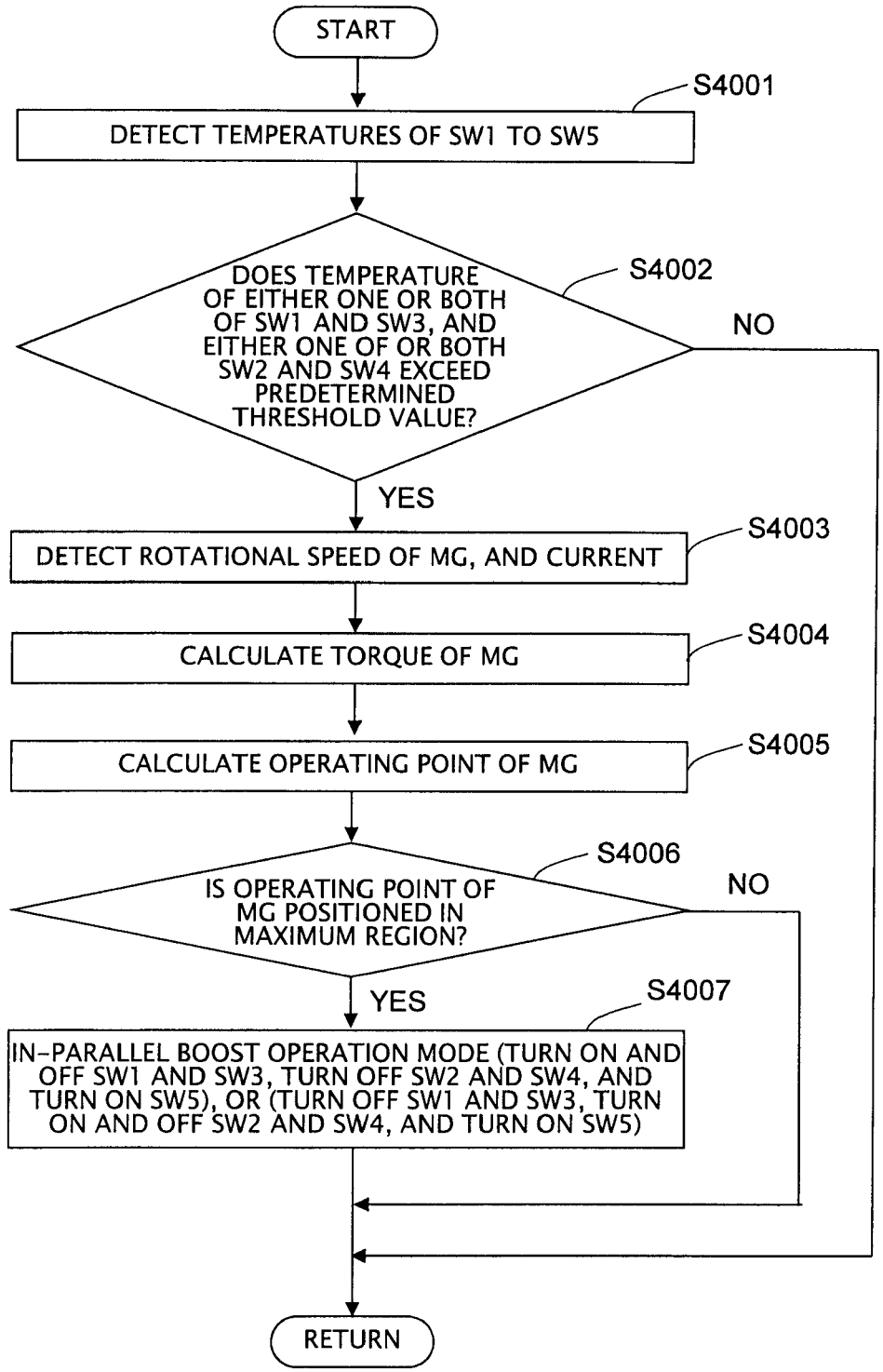

[Fig. 39]
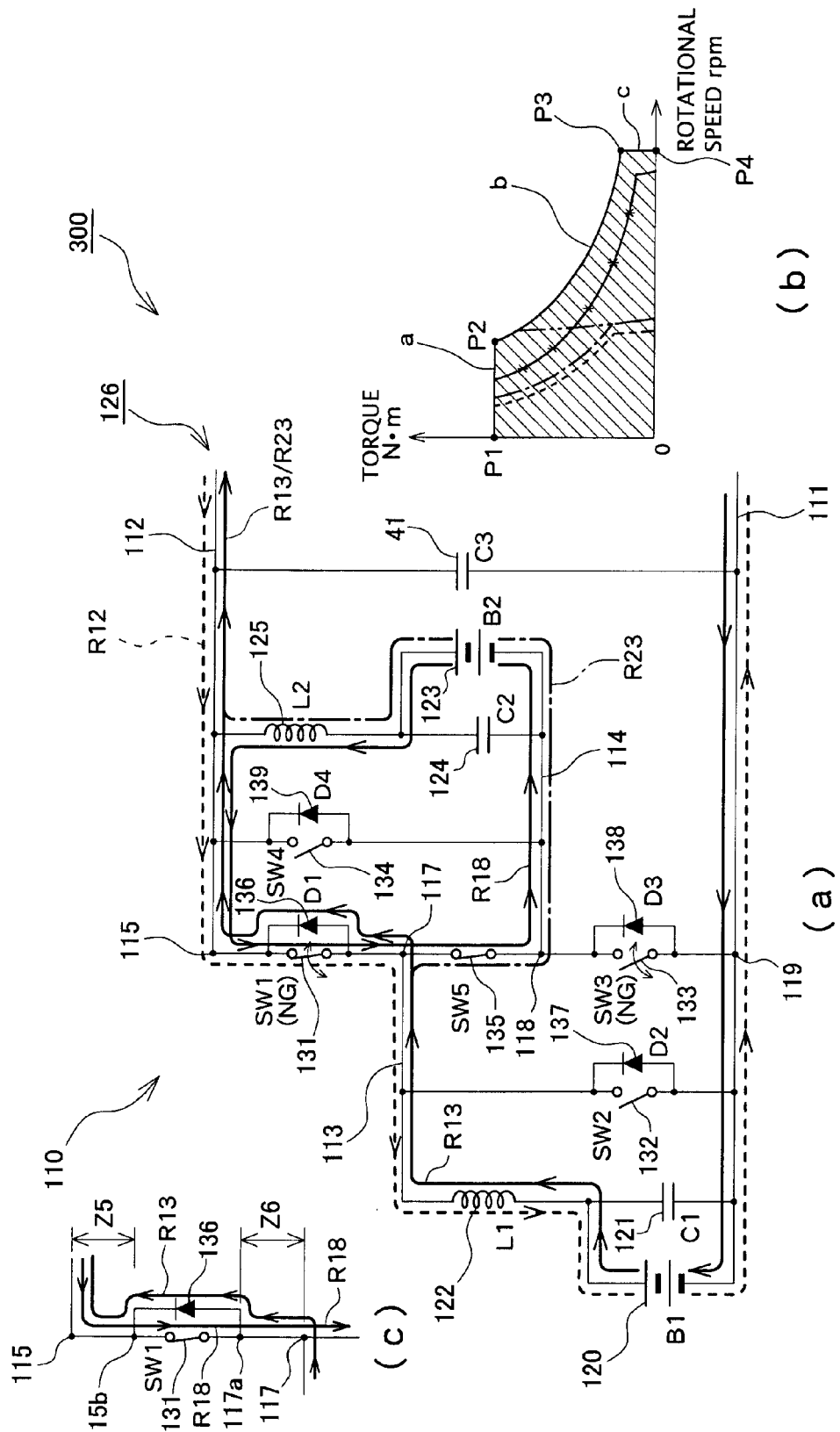

[Fig. 40]
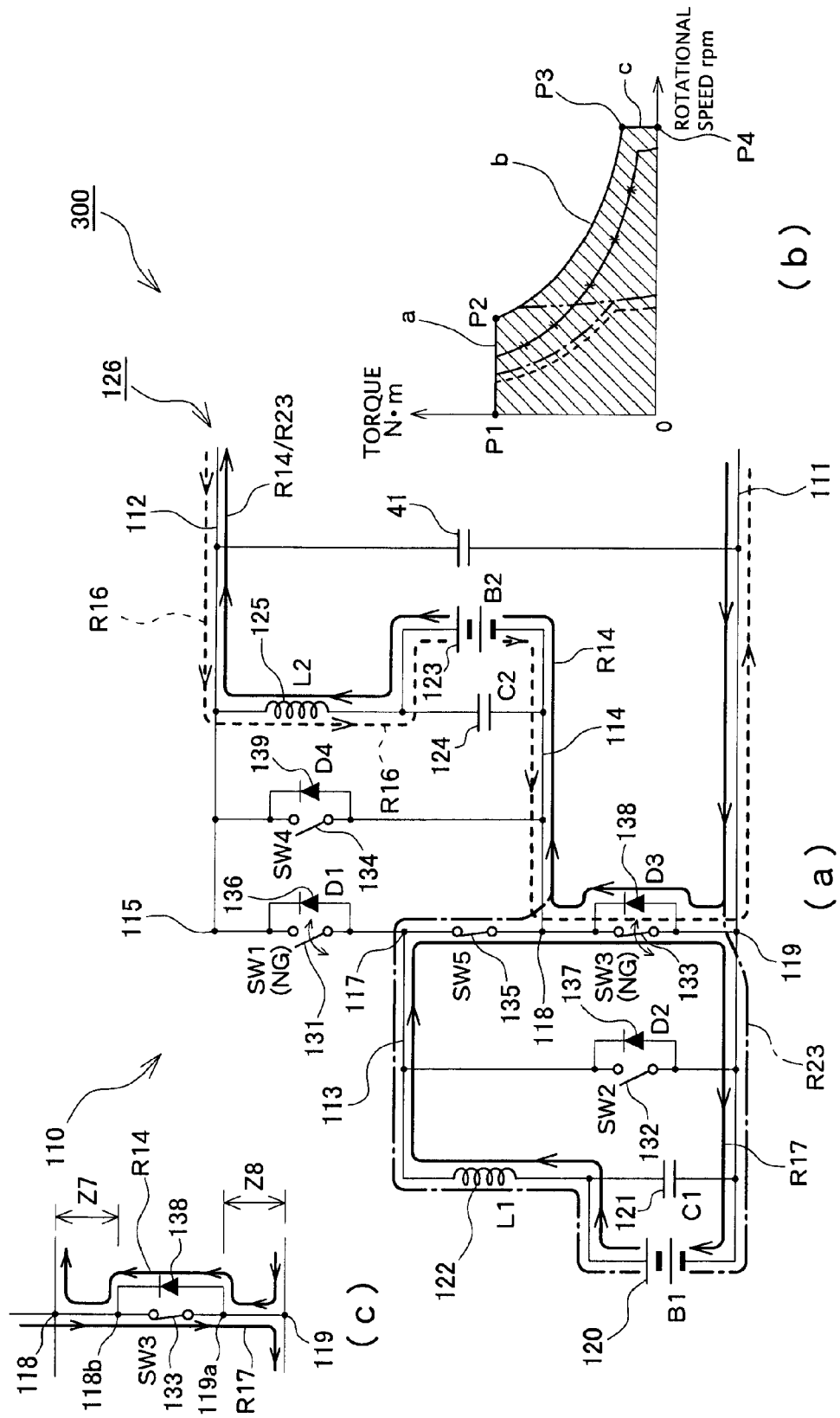

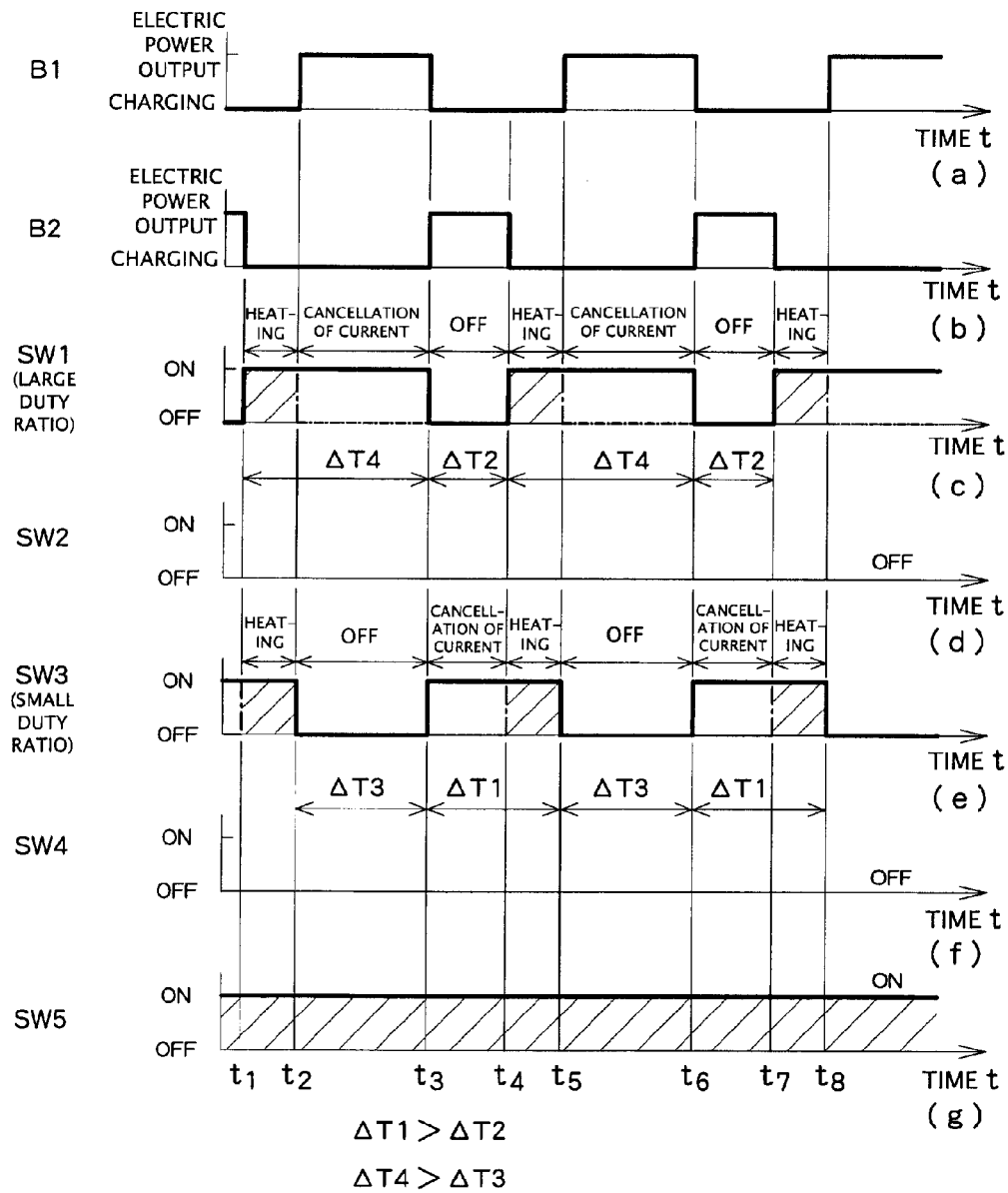

[Fig. 42]
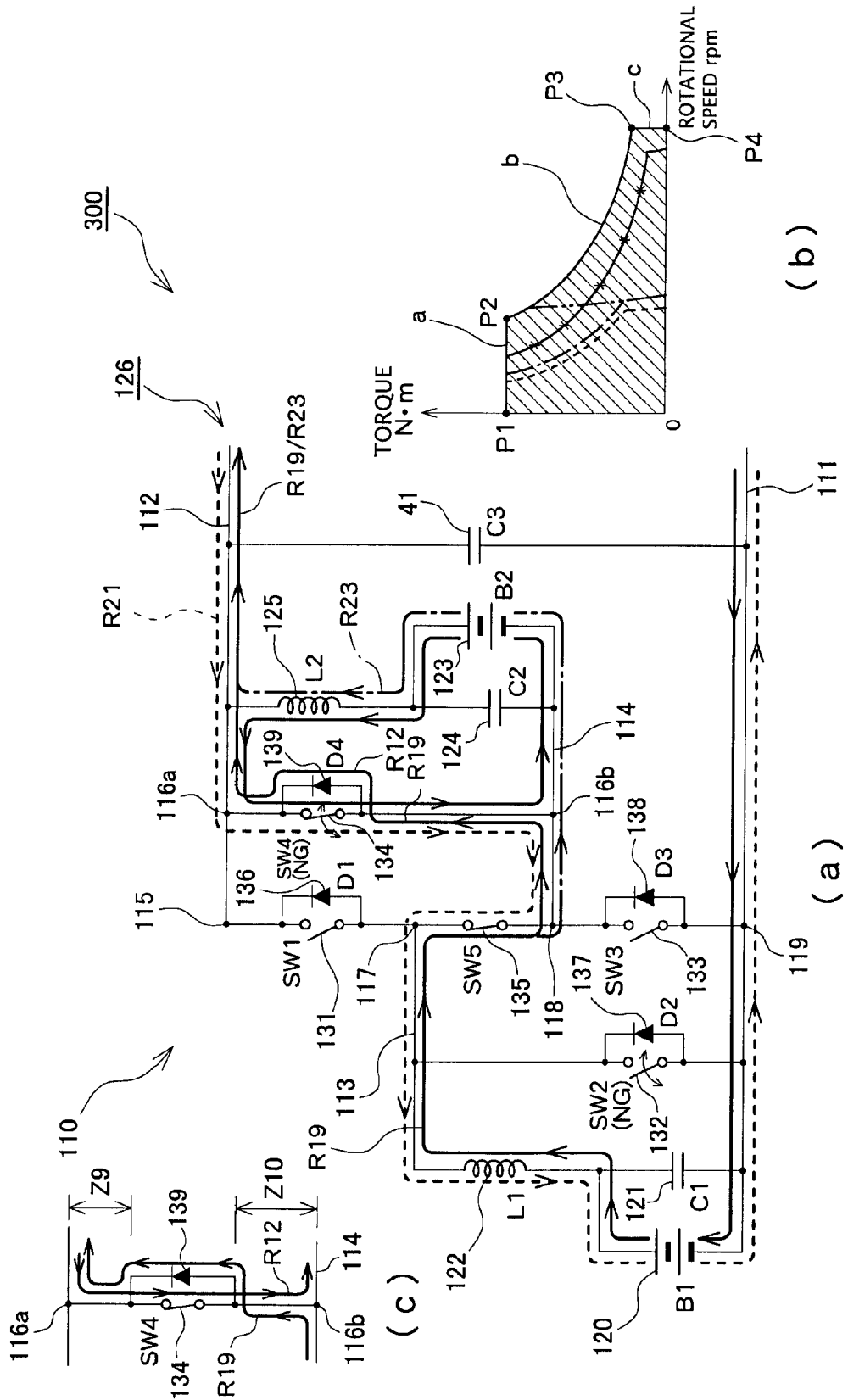

[Fig. 43]
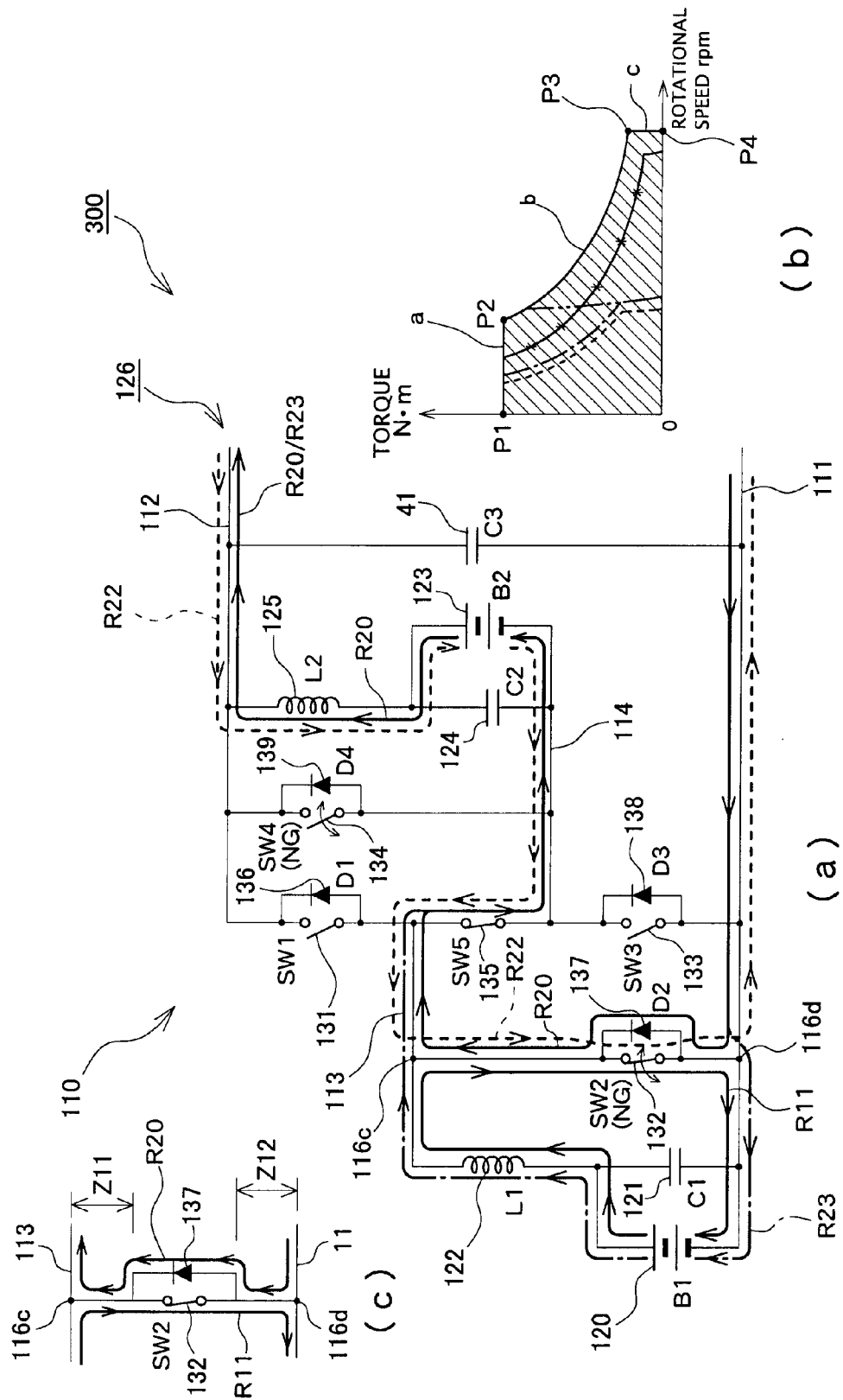

[Fig. 44]
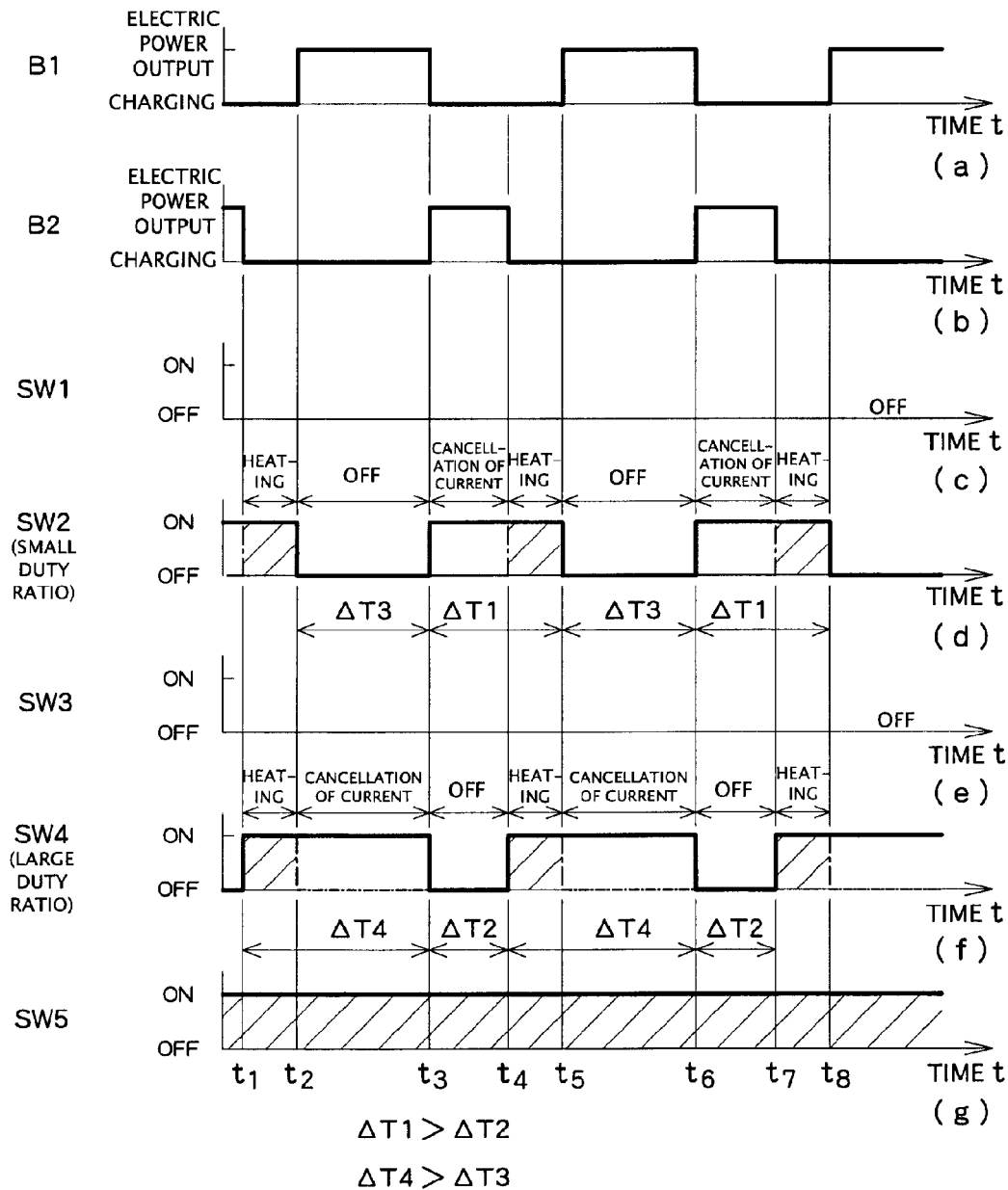

MOTOR-DRIVEN VEHICLE

TECHNICAL FIELD

The present invention relates to a motor-driven vehicle, particularly to a motor-driven vehicle in which a voltage converter is mounted.

BACKGROUND ART

In recent years, many motor-driven vehicles such as a hybrid vehicle and an electric vehicle have been used. In many cases, such a motor-driven vehicle uses a system in which an inverter converts the direct current electric power of a battery into alternating current electric power, and a motor or a motor-generator is driven with the converted alternating current electric power. Lately, there have been many attempts to improve the driveability (speed and acceleration performance) of a motor-driven vehicle by boosting the voltage of a battery using a boost converter (voltage converter), supplying a boosted voltage to a motor, and thus increasing the range of the rotational speed and the operational torque of the motor. Lately, there has also been a motor-driven vehicle in use, in which a plurality of batteries connected in parallel are mounted so that the capacity of the batteries is increased and the motor-driven vehicle travels with a motor alone; in other words, a motor-driven vehicle which has a long EV driving range. In recent years, there has been proposed a power supply system that can switch the connection of a plurality of batteries between an in-series connection and an in-parallel connection, and enable various operation modes such as series boosting and parallel boosting by changing in various manners the on/off operation pattern of four switching elements (for example, refer to PTL 1).

The boost converter (voltage converter) adopts a boost chopper circuit that is configured to boost an input voltage by turning on and off the switching elements such as IGBTs, and thus storing electric power in a reactor or discharging electric power from the reactor. In many cases, since the temperature of the switching elements is increased due to a current passing through the switching elements, a cooler is provided in the boost converter (voltage converter) so that overheating of the elements can be prevented. However, the switching elements may be overheated depending on conditions such as the operation mode of the boost converter (voltage converter), the passing current, and the like. A reduction in the amount of current flowing via the switching elements is required so that overheating of the switching elements can be prevented, and thus input/output electric power of the battery is limited when the elements are overheated (for example, refer to PTL2). However, if input/output electric power of the battery is limited, electric power supplied to the motor is limited, thereby causing deterioration in the power performance or the driveability of the motor-driven vehicle, which is problematic.

CITATION LIST

Patent Literature

PTL 1: JP-A-2012-70514
PTL 2: JP-A-2012-51515

SUMMARY OF INVENTION

Technical Problem

An object of the present invention is to prevent the temperature of each switching element from increasing beyond a predetermined operation temperature range without limiting the input/output electric power of a battery and impairing the power performance or the driveability of a motor-driven vehicle in which a voltage converter is mounted.

Solution to Problem

According to an aspect of the present invention, there is provided a motor-driven vehicle including: a first battery; a second battery; a voltage converter that includes a plurality of switching elements configured to perform bi-directional voltage conversion between an electric power output path and either one or both of the first battery and the second battery, and to switch the connection of the first battery and the second battery to the electric power output path between an in-series connection and an in-parallel connection; a vehicle drive motor connected to the electric power output path; and a control device configured to turn on and off the switching elements. The electric power output path includes a first electric path, and a second electric path having an electric potential lower than that of the first electric path. The plurality of switching elements are configured as first to fourth switching elements which are provided in series from the first electric path toward the second electric path. The first battery is connected in parallel to the third switching element and the fourth switching element. The second battery is connected in parallel to the second switching element and the third switching element. The control device switches connection to at least one of connection between the electric power output path and the first battery, connection between the electric power output path and the second battery, and connection between the first battery and the second battery, based on the switching element from the plurality of switching elements, the temperature of which exceeds a predetermined threshold, and the operating point of the motor.

As such, it is possible to prevent an increase in the temperature of each of the switching elements, without decreasing the power performance or the driveability of the motor-driven vehicle by switching the connection of the batteries based on the position of the switching element, the temperature of which exceeds a predetermined temperature, and the operating point of the motor.

In the motor-driven vehicle according to the aspect of the present invention, the voltage of the second battery is preferably lower than or equal to the voltage of the first battery. When the operating point of the motor is positioned in a first region on a torque characteristic diagram relative to the rotational speed of the motor, the first region being surrounded by a first equi-power output line that defines torque relative to a rotational speed when the power output of the motor becomes constant at the maximum electric power output of the second battery, a maximum torque line that defines the maximum torque of the motor, and a first limit rotational speed line that defines a limit rotational speed relative to torque based on the voltage of the second battery, and when the temperature of either one of the second switching element and the fourth switching element exceeds the predetermined threshold value, the control device preferably performs the switching of connection such that electric power is transmitted and received between the electric power output path and only the battery connected in parallel to one of the second switching element and the fourth switching element, the temperature of which exceeds the predetermined threshold value.

As such, when the operating point of the motor is positioned in the first region, and the temperature of the second switching element or the fourth switching element exceeds the predetermined threshold value, the motor is driven by turning off the second switching element or the fourth switching element and directly connecting either one of the first battery and the second battery to the electric power output path, and thus it is possible to prevent the temperature of the second switching element or the fourth switching element from increasing beyond a predetermined operation temperature range, without limiting the input/output electric power of the first battery or the second battery.

In the motor-driven vehicle according to the aspect of the present invention, the voltage of the second battery is preferably lower than or equal to the voltage of the first battery. When the operating point of the motor is positioned in a second region on a torque characteristic diagram relative to the rotational speed of the motor, the second region being surrounded by a second equi-power output line that defines torque relative to a rotational speed when the power output of the motor becomes constant at the maximum electric power output of the first battery and the second battery connected in series, a maximum torque line that defines the maximum torque of the motor, and a second limit rotational speed line that defines a limit rotational speed relative to torque based on the total voltage of the first battery and the second battery, and when the temperature of either one or both of the second switching element and the fourth switching element exceeds the predetermined threshold value, preferably, the control device connects the first battery and the second battery in series, and performs the switching of connection such that electric power is transmitted and received between both the batteries and the electric power output path.

As such, when the operating point of the motor is positioned in the second region, and the temperature of either one or both of the second switching element and the fourth switching element exceeds the predetermined threshold value, the second switching element and the fourth switching element are turned off, the first switching element and the third switching element are turned on, and the first battery and the second battery are directly connected in series to the electric power output path. Therefore, it is possible to prevent the temperature of the second switching element or the fourth switching element from increasing beyond the predetermined operation temperature range without limiting the input/output electric power of the first battery and the second battery.

In the motor-driven vehicle according to the aspect of the present invention, when the operating point of the motor is positioned in a maximum region on a torque characteristic diagram relative to the rotational speed of the motor, the maximum region being surrounded by a maximum equi-power output line that defines torque relative to a rotational speed when the power output of the motor becomes a constant maximum power output, a maximum torque line that defines the maximum torque of the motor, and a maximum limit rotational speed line that defines the limit rotational speed of the motor, and when the temperature of either one or both of the second switching element and the fourth switching element exceeds the predetermined threshold value, preferably, the control device connects the first battery and the second battery in parallel, and performs the switching of connection such that electric power is transmitted and received between both the batteries and the electric power output path.

As such, when the temperature of either one or both of the second switching element and the fourth switching element exceeds a predetermined temperature, the first battery and the second battery are connected in parallel, and thus current flowing via the second switching element and the fourth switching element can be cancelled out. As a result, it is possible to reduce current passing via the second switching element and the fourth switching element, and to prevent an increase in the temperature of the second switching element and the fourth switching element, without limiting the input/output electric power of the first battery or the second battery.

In the motor-driven vehicle according to the aspect of the present invention, the voltage of the second battery is preferably lower than or equal to the voltage of the first battery. When the operating point of the motor is positioned in a first region on a torque characteristic diagram relative to the rotational speed of the motor, the first region being surrounded by a first equi-power output line that defines torque relative to a rotational speed when the power output of the motor becomes constant at the maximum electric power output of the second battery, a maximum torque line that defines the maximum torque of the motor, and a first limit rotational speed line that defines a limit rotational speed relative to torque based on the voltage of the second battery, and when the temperature of the third switching element exceeds the predetermined threshold value, the control device preferably performs the switching of connection such that electric power is transmitted and received between the electric power output path and either one of the first battery and the second battery.

As such, when the operating point of the motor is positioned in the first region, and the temperature of the third switching element exceeds the predetermined threshold value, the motor is driven by turning off the third switching element, and directly connecting either one of the second battery and the first battery to the electric power output path, and thus it is possible to prevent the temperature of the third switching element from increasing beyond a predetermined operation temperature range, without limiting the input/output electric power of the first battery or the second battery.

In the motor-driven vehicle according to the aspect of the present invention, when the operating point of the motor is positioned in a maximum region on a torque characteristic diagram relative to the rotational speed of the motor, the maximum region being surrounded by a maximum equi-power output line that defines torque relative to a rotational speed when the power output of the motor becomes a constant maximum power output, a maximum torque line that defines the maximum torque of the motor, and a maximum limit rotational speed line that defines the limit rotational speed of the motor, and when the temperature of the third switching element exceeds the predetermined threshold value, preferably, the control device connects the first battery and the second battery in parallel, and performs the switching of connection such that electric power is transmitted and received between both the batteries and the electric power output path.

As such, when the temperature of the third switching element exceeds a predetermined temperature, the first battery and the second battery are connected in parallel, and thus it is possible to eliminate the switching operation of the third switching element, and to prevent an increase in the temperature of the third switching element.

In the motor-driven vehicle according to the aspect of the present invention, when the voltage of the first battery is substantially equal to the voltage of the second battery, when the operating point of the motor is positioned in a third region on a torque characteristic diagram relative to the rotational speed of the motor, the third region being surrounded by a maximum equi-power output line that defines torque relative to a rotational speed when the power output of the motor becomes a constant maximum power output, a maximum torque line that defines the maximum torque of the motor, and a third limit rotational speed line that defines a limit rotational speed relative to torque based on the voltage of the second battery, and when the temperature of the third switching element exceeds the predetermined threshold value, preferably, the control device turns off the third switching element, and turns on the other switching elements.

As such, when the operating point of the motor is positioned in the third region, the temperature of the third switching element is higher than the predetermined threshold value, and the voltage of the first battery is substantially equal to the voltage of the second battery, the third switching element is turned off, the other switching elements are turned on, and the first battery and the second battery are directly connected in parallel to a load. Therefore, it is possible to prevent the temperature of the third switching element from increasing beyond the predetermined operation temperature range, without limiting the input/output electric power of the first battery or the second battery.

In the motor-driven vehicle according to the aspect of the present invention, the voltage of the second battery is preferably lower than or equal to the voltage of the first battery. When the operating point of the motor is positioned in a first region on a torque characteristic diagram relative to the rotational speed of the motor, the first region being surrounded by a first equi-power output line that defines torque relative to a rotational speed when the power output of the motor becomes constant at the maximum electric power output of the second battery, a maximum torque line that defines the maximum torque of the motor, and a first limit rotational speed line that defines a limit rotational speed relative to torque based on the voltage of the second battery, and when the temperature of either one or both of the second switching element and the third switching element exceeds the predetermined threshold value, preferably, the control device turns on the first switching element, turns off the second switching element and the third switching element, and turns on the fourth switching element, and thus the motor is driven with the second battery.

As such, when the operating point of the motor is positioned in the first region, and the temperature of either one or both of the second switching element and the third switching element exceeds the predetermined threshold value, the second switching element and the third switching element are turned off, the first switching element and the fourth switching element are turned on, and the second battery is directly connected to the electric power output path. Therefore, it is possible to prevent the temperature of the second switching element and the third switching element from increasing beyond the predetermined operation temperature range, without limiting the input/output electric power of the second battery.

In the motor-driven vehicle according to the aspect of the present invention, the voltage of the second battery is preferably lower than or equal to the voltage of the first battery. When the operating point of the motor is positioned in a first region on a torque characteristic diagram relative to the rotational speed of the motor, the first region being surrounded by a first equi-power output line that defines torque relative to a rotational speed when the power output of the motor becomes constant at the maximum electric power output of the second battery, a maximum torque line that defines the maximum torque of the motor, and a first limit rotational speed line that defines a limit rotational speed relative to torque based on the voltage of the second battery, and when the temperature of either one or of both the third switching element and the fourth switching element exceeds the predetermined threshold value, preferably, the control device turns on the first switching element and the second switching element, and turns off the third switching element and the fourth switching element, and thus the motor is driven with the first battery.

As such, when the operating point of the motor is positioned in the first region, and the temperature of either one of the third switching element and the fourth switching element exceeds the predetermined threshold value, the third switching element and the fourth switching element are turned off, the first switching element and the second switching element are turned on, and the first battery is directly connected to the electric power output path. Therefore, it is possible to prevent the temperature of the third switching element and the fourth switching element from increasing beyond the predetermined operation temperature range without limiting the input/output electric power of the first battery.

In the motor-driven vehicle according to the aspect of the present invention, when the operating point of the motor is positioned in the first region, and the temperature of either one of the second switching element and the fourth switching element exceeds the predetermined threshold value, preferably, the control device turns on the first switching element, turns off the third switching element, turns off one of the second switching element and the fourth switching element, the temperature of which exceeds the predetermined threshold value, and turns on the other switching element.

As such, when the operating point of the motor is positioned in the first region, and the temperature of either one of the second switching element and the fourth switching element exceeds the predetermined threshold value, the first switching element is turned on, the third switching element is turned off, only one of the second switching element and the fourth switching element is turned on, the temperature of which does not exceed the predetermined threshold value, and either one of the first first battery and the second battery is directly connected to the electric power output path. Therefore, it is possible to prevent the temperature of the second switching element or the fourth switching element from increasing beyond the predetermined operation temperature range, without limiting the input/output electric power of the first battery or the second battery.

In the motor-driven vehicle according to the aspect of the present invention, when the operating point of the motor is positioned in the second region, and the temperature of either one or both of the second switching element and the fourth switching element exceeds the predetermined threshold value, preferably, the control device turns off the second switching element and the fourth switching element, and turns on the first switching element and the third switching element.

As such, when the operating point of the motor is positioned in the second region, and the temperature of either one or both of the second switching element and the fourth switching element exceeds the predetermined threshold value, the second switching element and the fourth switching element are turned off, the first switching element and the third switching element are turned on, and the first battery and the second battery are directly connected in series to the electric power output path. Therefore, it is possible to prevent the temperature of the second switching element or the fourth switching element from increasing beyond the predetermined operation temperature range, without limiting the input/output electric power of the first battery and the second battery.

In the motor-driven vehicle according to the aspect of the present invention, when the operating point of the motor is positioned in the maximum region, and the temperature of either one or both of the second switching element and the fourth switching element exceeds the predetermined threshold value, preferably, the control device turns on the third switching element, turns on and off each of the second switching element and the fourth switching element at a predetermined duty ratio in such a manner that the turn-on time of the switching element operated at a small duty ratio includes the turn-off time of the switching element operated at a large duty ratio, turns on the first switching element while either one of the second switching element and the fourth switching element is turned off, and turns off the first switching element while both the second switching element and the fourth switching element are turned on or off.

As such, when the temperature of either one or both of the second switching element and the fourth switching element exceeds the predetermined temperature, the first battery and the second battery are connected in parallel, and thus current flowing via the second switching element and the fourth switching element is cancelled out. As a result, it is possible to reduce current passing via the second switching element and the fourth switching element, and to prevent an increase in the temperature of the second switching element and the fourth switching element, without limiting the input/output electric power of the first battery or the second battery.

In the motor-driven vehicle according to the aspect of the present invention, when the operating point of the motor is positioned in the first region, and the temperature of the third switching element exceeds the predetermined threshold value, preferably, the control device turns on the first switching element, turns off the third switching element, turns on one of the second switching element and the fourth switching element, and turns off the other switching element.

As such, when the operating point of the motor is positioned in the first region, and the temperature of the third switching element exceeds the predetermined threshold value, the first switching element is turned on, the third switching element is turned off, one of the second switching element and the fourth switching element is turned on, the other of the second switching element and the fourth switching element is turned off, and the first battery or the second battery is directly connected to the electric power output path. Therefore, it is possible to prevent the temperature of the third switching element from increasing beyond the predetermined operation temperature range, without limiting the input/output electric power of the first battery or the second battery.

In the motor-driven vehicle according to the aspect of the present invention, when the operating point of the motor is positioned in the maximum region, and the temperature of the third switching element exceeds the predetermined threshold value, preferably, the control device turns on the third switching element, turns on and off each of the second switching element and the fourth switching element at a predetermined duty ratio in such a manner that the turn-on time of the switching element operated at a small duty ratio includes the turn-off time of the switching element operated at a large duty ratio, turns on the first switching element while either one of the second switching element and the fourth switching element is turned off, and turns off the first switching element while both the second switching element and the fourth switching element are turned on or off.

As such, when the temperature of the third switching element exceeds the predetermined temperature, the first battery and the second battery are connected in parallel, and thus it is possible to eliminate the switching operation of the third switching element, and to prevent an increase in the temperature of the third switching element.

According to another aspect of the present invention, there is provided a motor-driven vehicle including: a first battery; a second battery; a voltage converter that includes a plurality of switching elements configured to perform bi-directional voltage conversion between an electric power output path and either one or both of the first battery and the second battery, and to switch the connection of the first battery and the second battery to the electric power output path between an in-series connection and an in-parallel connection; a vehicle drive motor connected to the electric power output path; and a control device configured to turn on and off the switching elements. The electric power output path includes a first electric path, and a second electric path having an electric potential lower than that of the first electric path. The plurality of switching elements are configured as a switching element (1A), a switching element (2A), a switching element (3A), a switching element (4A), and a switching element (5A), which are provided between the first electric path and the second electric path. The switching element (1A), the switching element (5A), and the switching element (3A) are provided in series from the first electric path toward the second electric path. The switching element (2A) is connected in parallel to the switching element (5A) and the switching element (3A). The switching element (4A) is connected in parallel to the switching element (1A) and the switching element (5A). The first battery is connected in parallel to the switching element (2A). The second battery is connected in parallel to the switching element (4A). The control device switches connection to at least one of connection between the electric power output path and the first battery, connection between the electric power output path and the second battery, and connection between the first battery and the second battery based on the switching element from the plurality of switching elements, the temperature of which exceeds a predetermined threshold, and the operating point of the motor.

In the motor-driven vehicle according to the other aspect of the present invention, the voltage of the second battery is preferably lower than or equal to the voltage of the first battery. When the operating point of the motor is positioned in a first region on a torque characteristic diagram relative to the rotational speed of the motor, the first region being surrounded by a first equi-power output line that defines torque relative to a rotational speed when the power output of the motor becomes constant at the maximum electric power output of the second battery, a maximum torque line that defines the maximum torque of the motor, and a first limit rotational speed line that defines a limit rotational speed relative to torque based on the voltage of the second battery, and when the temperature of at least one of the switching element (2A), the switching element (4A), and the switching element (5A) exceeds a predetermined threshold value, the control device preferably performs the switching of connection such that an electric power is transmitted and received between only one of the first battery and the second battery and the electric power output path. In addition, in the motor-driven vehicle according to the other aspect of the present invention, the voltage of the second battery is preferably lower than or equal to the voltage of the first battery. When the operating point of the motor is positioned in a second region on a torque characteristic diagram relative to the rotational speed of the motor, the second region being surrounded by a second equi-power output line that defines torque relative to a rotational speed when the power output of the motor becomes constant at the maximum electric power output of the first battery and the second battery connected in series, a maximum torque line that defines the maximum torque of the motor, and a second limit rotational speed line that defines a limit rotational speed relative to torque based on the total voltage of the first battery and the second battery, and when the temperature of at least one of the switching element (1A) to the switching element (4A) exceeds the predetermined threshold value, preferably, the control device connects the first battery and the second battery in series, and performs the switching of connection such that electric power is transmitted and received between both the batteries and the electric power output path. In addition, in the motor-driven vehicle according to the other aspect of the present invention, when the operating point of the motor is positioned in a maximum region on a torque characteristic diagram relative to the rotational speed of the motor, the maximum region being surrounded by a maximum equi-power output line that defines torque relative to a rotational speed when the power output of the motor becomes a constant maximum power output, a maximum torque line that defines the maximum torque of the motor, and a maximum limit rotational speed line that defines the limit rotational speed of the motor, and when the temperature of either one or both of the switching element (1A) and the switching element (3A) exceeds the predetermined threshold value, or the temperature of either one or both of the switching element (2A) and the switching element (4A) exceeds the predetermined threshold value, preferably, the control device connects the first battery and the second battery in parallel, and performs the switching of connection such that electric power is transmitted and received between both the batteries and the electric power output path. In addition, in the motor-driven vehicle according to the other aspect of the present invention, when the voltage of the first battery is substantially equal to the voltage of the second battery, when the operating point of the motor is positioned in a third region on a torque characteristic diagram relative to the rotational speed of the motor, the third region being surrounded by a maximum equi-power output line that defines torque relative to a rotational speed when the power output of the motor becomes a constant maximum power output, a maximum torque line that defines the maximum torque of the motor, and a third limit rotational speed line that defines a limit rotational speed relative to torque based on the voltage of the second battery, and when the temperature of at least one of the switching element (2A), the switching element (4A), and the switching element (5A) exceeds the predetermined threshold value, preferably, the control device turns on the switching element (1A) and the switching element (3A), and turns off the switching element (2A), the switching element (4A), and the switching element (5A).

As such, it is possible to prevent an increase in the temperature of each of the switching elements without decreasing the power performance or the driveability of the motor-driven vehicle by switching the connection of the batteries based on the position of the switching element, the temperature of which exceeds the predetermined temperature, and the operating point of the motor.

Advantageous Effects Of Invention

According to the present invention, it is possible to prevent the temperature of each switching element from increasing beyond a predetermined operation temperature range, without limiting the input/output electric power of batteries and decreasing the power performance or the driveability of a motor-driven vehicle in which a voltage converter is mounted.

BRIEF DESCRIPTION OF DRAWINGS

FIG. 25 is a flowchart (1) illustrating transition to each operation mode when the temperature of the third switching element of the control device of the motor-driven vehicle of the present invention, in which the first voltage converter is mounted, exceeds the predetermined threshold value.

FIG. 26 is a flowchart (2) illustrating transition to each operation mode when the temperature of the third switching element of the control device of the motor-driven vehicle of the present invention, in which the first voltage converter is mounted, exceeds the predetermined threshold value.

FIG. 27 is a system diagram illustrating the configuration of a motor-driven vehicle in which a second voltage converter is mounted in another embodiment of the present invention.

FIG. 28 is a diagram illustrating the flow of current when reactors are charged and the electric power of first and second batteries is output with the first and second batteries connected in series in the basic operation of the second voltage converter that is mounted in the motor-driven vehicle of the present invention.

FIG. 29 is a diagram illustrating the flow of current when a first reactor is charged, and the electric power of the first and second batteries is output with the first and second batteries connected in parallel in the basic operation of the second voltage converter that is mounted in the motor-driven vehicle of the present invention.

FIG. 30 is a diagram illustrating the flow of current when a second reactor is charged, and the electric power of the first and second batteries is output with the first and second batteries connected in parallel in the basic operation of the second voltage converter that is mounted in the motor-driven vehicle of the present invention.

FIG. 31 is a flowchart illustrating the transition of the control device to the single direct-connection operation mode in the motor-driven vehicle of the present invention in which the second voltage converter is mounted.

FIG. 32 is a diagram illustrating the flow of current in the single battery direct-connection operation mode (operation mode in which the second battery is used) of the second voltage converter mounted in the motor-driven vehicle of the present invention.

FIG. 33 is a diagram illustrating the flow of current in the single battery direct-connection operation mode (operation mode in which the first battery is used) of the second voltage converter mounted in the motor-driven vehicle of the present invention.

FIG. 34 is a flowchart illustrating the transition of the control device to the in-series direct-connection operation mode in the motor-driven vehicle of the present invention in which the second voltage converter is mounted.

FIG. 35 is a diagram illustrating the flow of current in the in-series direct-connection operation mode of the second voltage converter mounted in the motor-driven vehicle of the present invention.

FIG. 36 is a flowchart illustrating the transition of the control device to the in-parallel direct-connection operation mode in the motor-driven vehicle of the present invention in which the second voltage converter is mounted.

FIG. 37 is a diagram illustrating the flow of current in the in-parallel direct-connection operation mode of the second voltage converter mounted in the motor-driven vehicle of the present invention.

FIG. 38 is a flowchart illustrating the transition of the control device to the in-parallel boost operation mode in the motor-driven vehicle of the present invention in which the second voltage converter is mounted.

FIG. 39 is a diagram (1) illustrating the flow of current in the in-parallel boost operation mode of the second voltage converter mounted in the motor-driven vehicle of the present invention.

FIG. 40 is a diagram (2) illustrating the flow of current in the in-parallel boost operation mode of the second voltage converter mounted in the motor-driven vehicle of the present invention.

FIG. 41 is a diagram (3) illustrating the flow of current in the in-parallel boost operation mode of the second voltage converter mounted in the motor-driven vehicle of the present invention.

FIG. 42 is a diagram (1) illustrating the flow of current in another in-parallel boost operation mode of the second voltage converter mounted in the motor-driven vehicle of the present invention.

FIG. 43 is a diagram (2) illustrating the flow of current in the other in-parallel boost operation mode of the second voltage converter mounted in the motor-driven vehicle of the present invention.

FIG. 44 is a diagram (3) illustrating the flow of current in the other in-parallel boost operation mode of the second voltage converter mounted in the motor-driven vehicle of the present invention.

DESCRIPTION OF EMBODIMENTS

<System Configuration of Motor-driven Vehicle in Which First Voltage Converter is Mounted>

Figure 1:
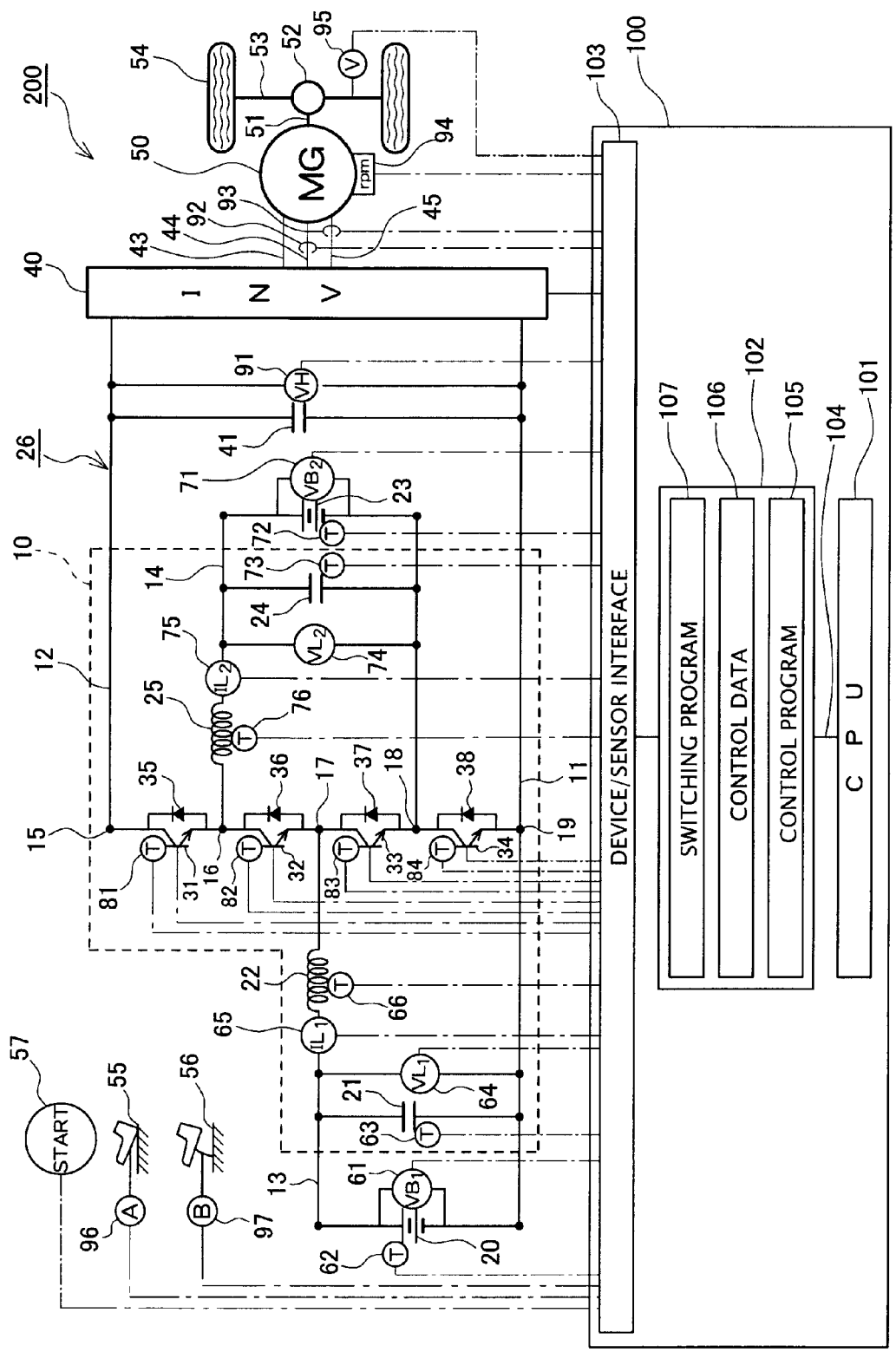
FIG. 1 is a system diagram illustrating the configuration of a motor-driven vehicle in which a first voltage converter is mounted in an embodiment of the present invention.

Hereinafter, an embodiment of the present invention is described with reference to the accompanying drawings. As illustrated in FIG. 1, a motor-driven vehicle 200 of an embodiment includes a first battery 20; a second battery 23; a first voltage converter 10 including a plurality of switching elements 31 to 34, a first reactor 22, a second reactor 25, a first capacitor 21, and a second capacitor 24; an electric power output path 26 of the first voltage converter 10; a smoothing capacitor 41 connected to the electric power output path 26; an inverter 40; a motor-generator 50 that is connected to the inverter 40 and drives the motor-driven vehicle 200; and a control device 100 that turns on and off each of the switching elements 31 to 34 of the first voltage converter 10. The alternate long and short dash lines in FIG. 1 represent signal lines. In the example of the embodiment, the motor-driven vehicle 200 is driven with the motor-generator 50; however, the present invention can also be applied to a so-called hybrid vehicle that is driven with an internal combustion engine and a motor-generator.

The electric power output path 26 of the first voltage converter 10 includes a high voltage electric path 12 that is a first electric path to which a high voltage obtained by boosting via the first voltage converter 10 is output, and a reference electric path 11 that is connected to a negative pole of each of the batteries 20 and 23, and is a second electric path having an electric potential lower than that of the first electric path. The plurality of switching elements 31 to 34 are connected in series from the high voltage electric path 12 toward the reference electric path 11, and diodes 35 to 38 are respectively connected in inverse parallel to the switching elements 31 to 34. The first voltage converter 10 has an electric path (I) 13 and an electric path (II) 14. The electric path (I) 13 connects the reference electric path 11 to a second connection point 17 between the switching elements 32 and 33, and the electric path (II) 14 connects a first connection point 16 between the switching elements 31 and 32 to a third connection point 18 between the switching elements 33 and 34. The first battery 20 and the first reactor 22 are disposed in series on the electric path (I) 13, and the second battery 23 and the second reactor 25 are disposed in series on the electric path (II) 14. The first capacitor 21 is connected in parallel to the first battery 20, and the second capacitor 24 is connected in parallel to the second battery 23. The smoothing capacitor 41 is connected to the high voltage electric path 12 and the reference electric path 11 while being disposed therebetween. As such, the first battery 20 is connected in parallel to the switching elements 33 and 34, and the second battery 23 is connected in parallel to the switching elements 32 and 33.

The switching element 31 of the first voltage converter 10 is a first switching element that is turned on when electric power stored in (charged into) the first reactor 22 is output to the electric power output path 26, or when electric power stored in (charged into) the second reactor 25 is output to the electric power output path 26. The switching element 32 is a second switching element that is turned on when the electric power of the second battery 23 is stored in (charged into) the second reactor 25, or when electric power stored in (charged into) the first reactor 22 is output to the electric power output path 26. The switching element 33 is a third switching element that is turned on when the electric power of the first battery 20 is stored in (charged into) the first reactor 22, or when the electric power of the second battery 23 is stored in (charged into) the second reactor 25. The switching element 34 is a fourth switching element that is turned on when the electric power of the first battery 20 is stored in (charged into) the first reactor 22, or when an electric power stored in (charged into) the second reactor 25 is output to the electric power output path 26.

Temperature sensors 81 to 84 for detecting temperatures TS1 to TS4 are respectively attached to the switching elements 31 to 34. A voltage sensor 61 for detecting a voltage VB1 and a temperature sensor 62 for detecting a temperature TB1 are attached to the first battery 20, and a voltage sensor 71 for detecting a voltage VB2 and a temperature sensor 72 for detecting a temperature TB2 are attached to the second battery 23. A temperature sensor 63 for detecting a temperature TC1 and a temperature sensor 73 for detecting a temperature TC2 are respectively attached to the first capacitor 21 and the second capacitor 24. A temperature sensor 66 for detecting a temperature TL1 and a temperature sensor 76 for detecting a temperature TL2 are respectively attached to the first reactor 22 and the second reactor 25. A current sensor 65 for detecting a current IL1 of the electric path 13 and a current sensor 75 for detecting a current IL2 of the electric path 14 are respectively attached to the electric path (I) 13 and the electric path (II) 14. A voltage sensor 64 for detecting a voltage VL1 between the two ends of the first capacitor 21 is attached between the electric path (I) 13 and the reference electric path 11, a voltage sensor 74 for detecting a voltage VL2 between the two ends of the second capacitor 24 is attached to the electric path (II) 14, and a voltage sensor 91 for detecting a voltage VH between the two ends of the smoothing capacitor 41 is attached to the high voltage electric path 12 and the reference electric path 11 while being disposed therebetween.

The inverter 40 includes a plurality of switching elements (not illustrated) therein, and converts a direct current electric power from the electric power output path 26 (made up of the reference electric path 11 and the high voltage electric path 12) of the first voltage converter 10 into three U-, V-, and W-phase alternating current electric powers by turning on and off the switching elements, and outputs the converted three U-, V-, and W-phase alternating current electric powers to a U-phase electric power output line 43, a V-phase electric power output line 44, and a W-phase electric power output line 45, respectively. The U-phase electric power output line 43, the V-phase electric power output line 44, and the W-phase electric power output line 45 are connected to the motor-generator 50, and a current sensor 92 for detecting a V-phase current and a current sensor 93 for detecting a W-phase current are respectively attached to the V-phase electric power output line 44 and the W-phase electric power output line 45. A resolver 94 for detecting the rotational speed and the rotational angle of a rotor is attached to the motor-generator 50. A power output shaft 51 of the motor-generator 50 is connected to a gear apparatus 52, an axle 53 is connected to the gear apparatus 52, and wheels 54 are attached to the axle 53. A speed sensor 95 is attached to the axle 53 so that a vehicle speed can be detected based on the rotational speed of the axle 53. An accelerator pedal 55, a brake pedal 56, and a starter switch 57 are attached to a passenger compartment of the motor-driven vehicle 200. An accelerator pedal position sensor 96 is attached to the accelerator pedal 55 so that the amount of depression of the accelerator pedal 55 can be detected, and a brake pedal position sensor 97 is attached to the brake pedal 56 so that the amount of depression of the brake pedal 56 can be detected.

The control device 100 is a computer which includes a CPU 101 configured to perform computational and information processing; a storage unit 102 configured to store a switching program 107 (to be described later) along with a control program 105 and control data 106; and a device/sensor interface 103 connected to devices and sensors, and in which the CPU 101, the storage unit 102, and the device/sensor interface 103 are connected to each other via a data bus 104. The switching elements 31 to 34 of the first voltage converter 10 and the switching elements of the inverter 40 are connected to the control device 100 via the device/sensor interface 103, and are turned on and off in accordance with a command from the CPU 101. The control device 100 is connected to the following sensors via the device/sensor interface 103: the voltage sensors 61, 64, 71, 74, and 91; the current sensors 65, 75, 92, and 93; the temperature sensors 62, 63, 66, 72, 73, 76, and 81 to 84; the resolver 94; the speed sensor 95; the accelerator pedal position sensor 96; the brake pedal position sensor 97; and the starter switch 57, and data detected by each of these sensors is input to the control device 100.

<Basic Operation of First Voltage Converter 10>

The first voltage converter 10 can perform bi-directional voltage conversion between the electric power output path 26 and either one or both of the first battery 20 and the second battery 23 by switching the on/off operation pattern of the four switching elements 31 to 34 such that the voltage of the first battery 20 or the second battery 23 is boosted and the boosted voltage is output to the electric power output path 26, or the voltage of the electric power output path 26 is bucked and the first battery 20 or the second battery 23 is charged with the bucked voltage, and the first voltage converter 10 can switch the connection of the first battery 20 and the second battery 23 to the electric power output path 26 between an in-series connection and an in-parallel connection. Hereinafter, the basic operation of the first voltage converter 10 is briefly described with reference to FIGS. 2 to 5. In the following description, S1 (31), S2 (32), S3 (33), and S4 (34) denote the first switching element 31 to the fourth switching element 34, respectively. D1 (35) to D4 (38) denote the diodes 35 to 38 which are connected in inverse parallel to the switching elements 31 to 34, respectively. Similarly, B1 (20) and B2 (23) denote the first battery 20 and the second battery 23, respectively, C1 (21) and C2 (24) denote the first capacitor 21 and the second capacitor 24, respectively, and L1 (22) and L2 (25) denote the first reactor 22 and the second reactor 25, respectively. Each of the switching elements 31 to 34 is configured as a semiconductor element such as an IGBT, which allows current to flow therethrough only in the direction of an arrow in FIG. 1, and does not allow current to flow therethrough in the opposite direction to the arrow when being turned on. In FIGS. 2 to 5 and 8 to 20, each of the switching elements 31 to 34 is illustratively simplified as a simple on/off switch such that the on/off state of S1 (31) to S4 (34) can be displayed.

<Boost/Buck Operation When B1 (20) and B2 (23) are Connected in Series>

Figure 2:
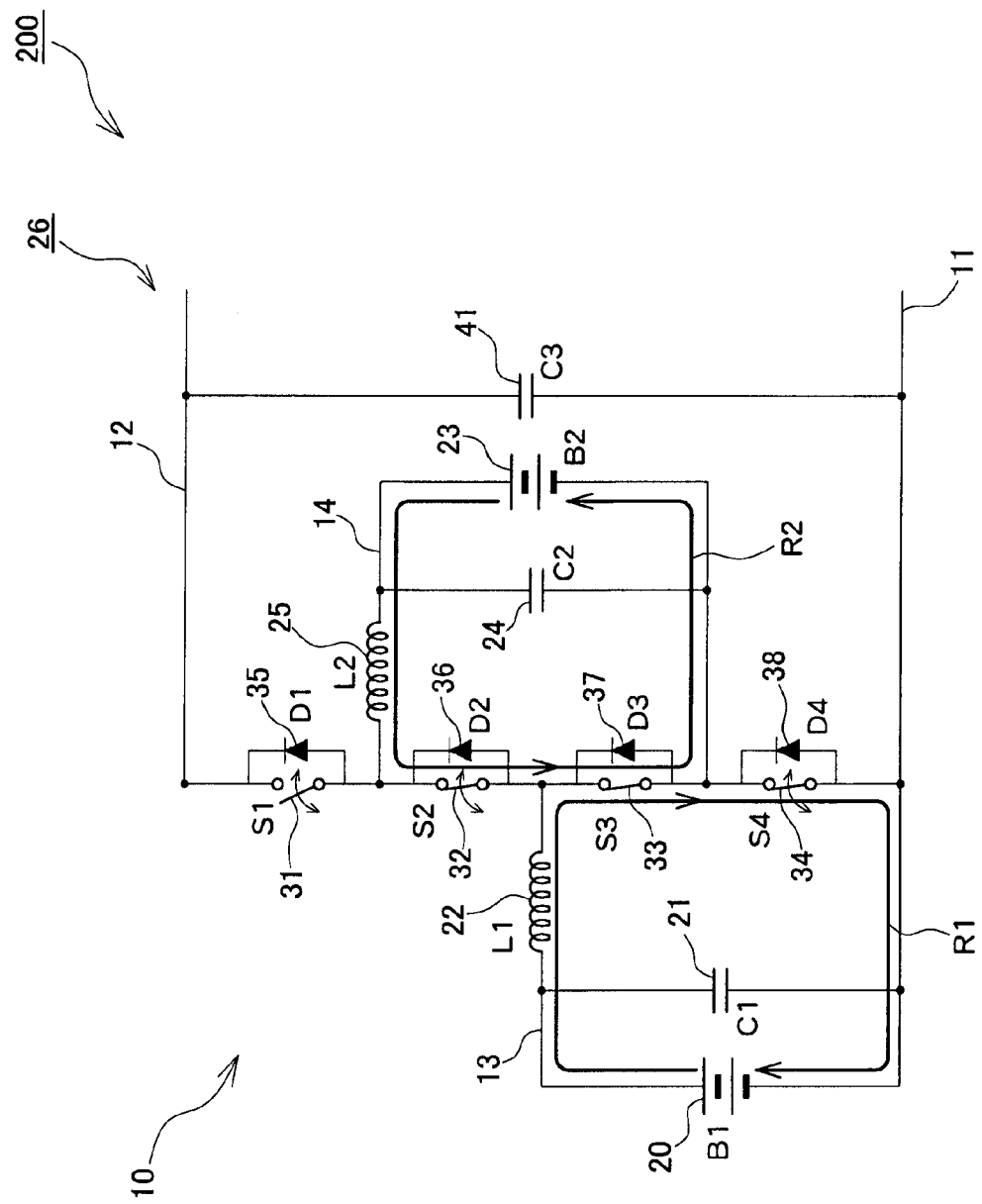
FIG. 2 is a diagram illustrating the flow of current when reactors are respectively charged with first and second batteries in the basic operation of the first voltage converter that is mounted in the motor-driven vehicle of the present invention.

A boost/buck operation is described with reference to FIGS. 2 and 3 when B1 (20) and B2 (23) are connected in series. As illustrated in FIG. 2, the control device 100 fixes S3 (33) in an on state, and turns on and off S1 (31), S2 (32), and S4 (34). As illustrated in FIG. 2, when S1 (31) is turned off, and S2 (32) and S4 (34) are turned on, a circuit R1, in which current flows [from B1 (20), to L1 (22), S3 (33), S4 (34), and B1 (20)], is formed, and a circuit R2, in which current flows [from B2 (23), to L2 (25), S2 (32), S3 (33), and B2 (23)], is formed. An electric power from B1 (20) flows in the circuit R1, and then L1 (22) is charged with this electric power, and an electric power from B2 (23) flows in the circuit R2, and then L2 (25) is charged with this electric power.

Figure 3:
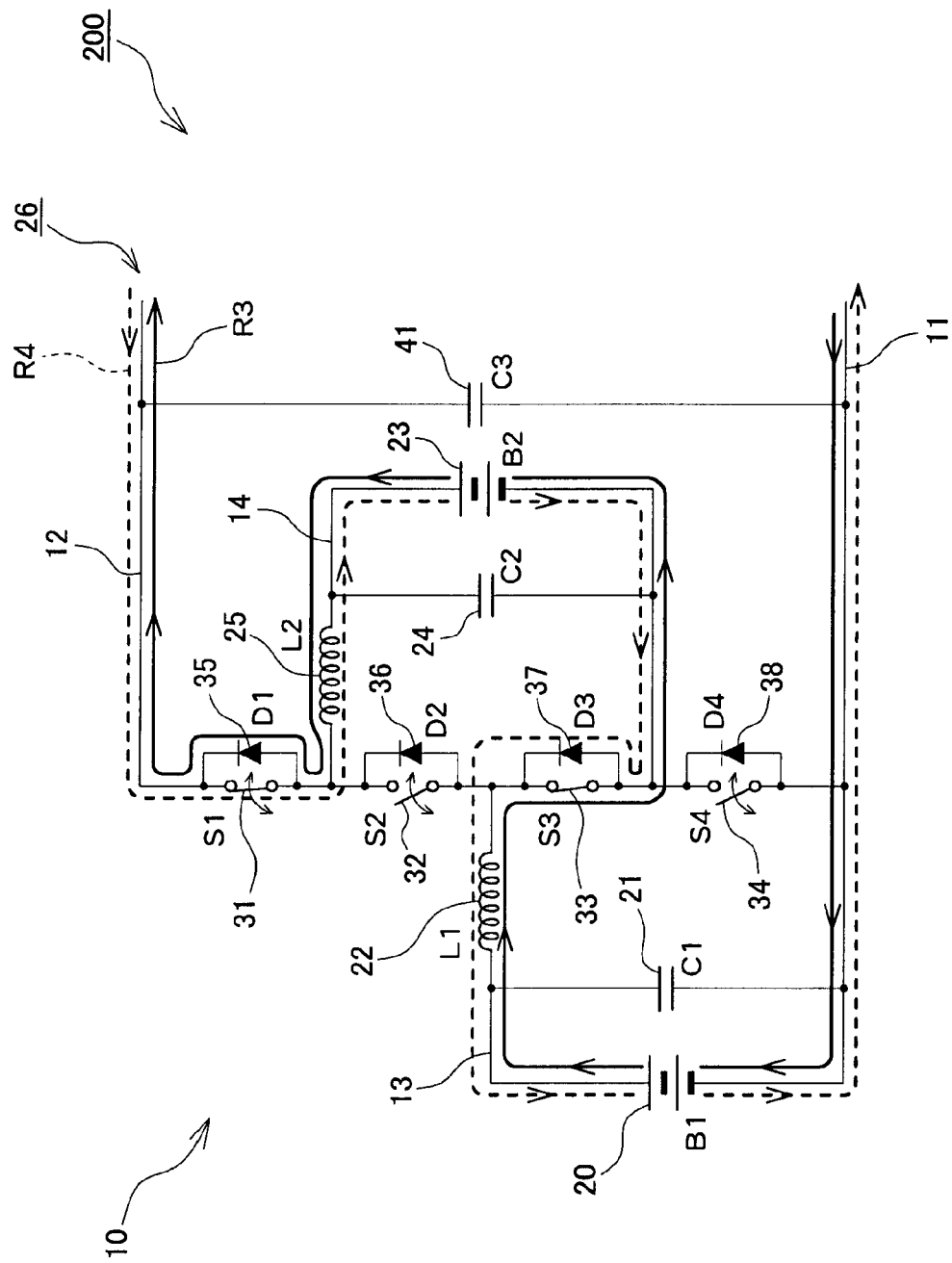
FIG. 3 is a diagram illustrating the flow of current when the electric power of the first and second batteries is output with the first and second batteries connected in series in the basic operation of the first voltage converter that is mounted in the motor-driven vehicle of the present invention.

Subsequently, as illustrated in FIG. 3, when S1 (31) is turned on, and S2 (32) and S4 (34) are turned off, a circuit R3, in which current flows [from B1 (20), to L1 (22), S3 (33), B2 (23), L2 (25), D1 (35), the high voltage electric path 12, the reference electric path 11, and B1 (20)], is formed, and an electric power charged into each of L1 (22) and L2 (25) is output to the high voltage electric path 12 via the circuit R3 (illustrated by the solid line). When a regenerative electric power is generated by the motor-generator 50 while S1 (31) is turned on, as illustrated in FIGS. 3, B2 (23) and B1 (20) are charged with the regenerative electric power via a circuit R4 (illustrated by the dotted line) in which current flows [from the high voltage electric path 12, to S1 (31), L2 (25), B2 (23), D3 (37), L1 (22), B1 (20), the reference electric path 11, and the high voltage electric path 12].

As described above, the control device 100 fixes S3 (33) in an on state, and turns on or off S1 (31), S2 (32), and S3 (33) such that the voltage of B1 (20) and B2 (23) is boosted, B1 (20) and B2 (23) are connected in series, the boosted voltage is output to the electric power output path 26 (the high voltage electric path 12 and the reference electric path 11), and B1 (20) and B2 (23) are charged with the regenerative electric power of the electric power output path 26.

<Boost/Buck Operation When B1 (20) and B2 (23) are Connected in Parallel>

Figure 4:
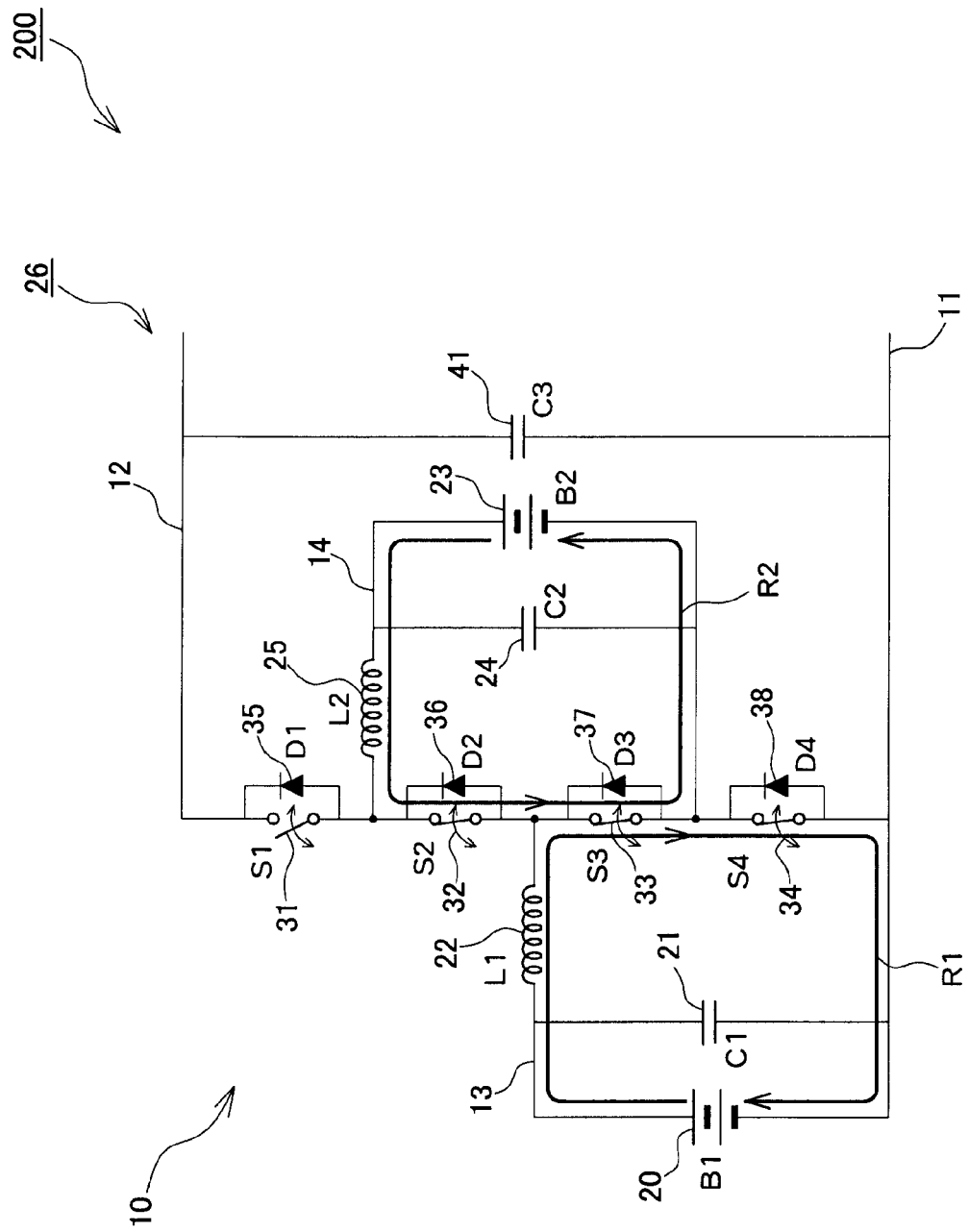
FIG. 4 is a diagram illustrating the flow of current when the reactors are respectively charged with the first and second batteries in the basic operation of the first voltage converter that is mounted in the motor-driven vehicle of the present invention.
Figure 5:
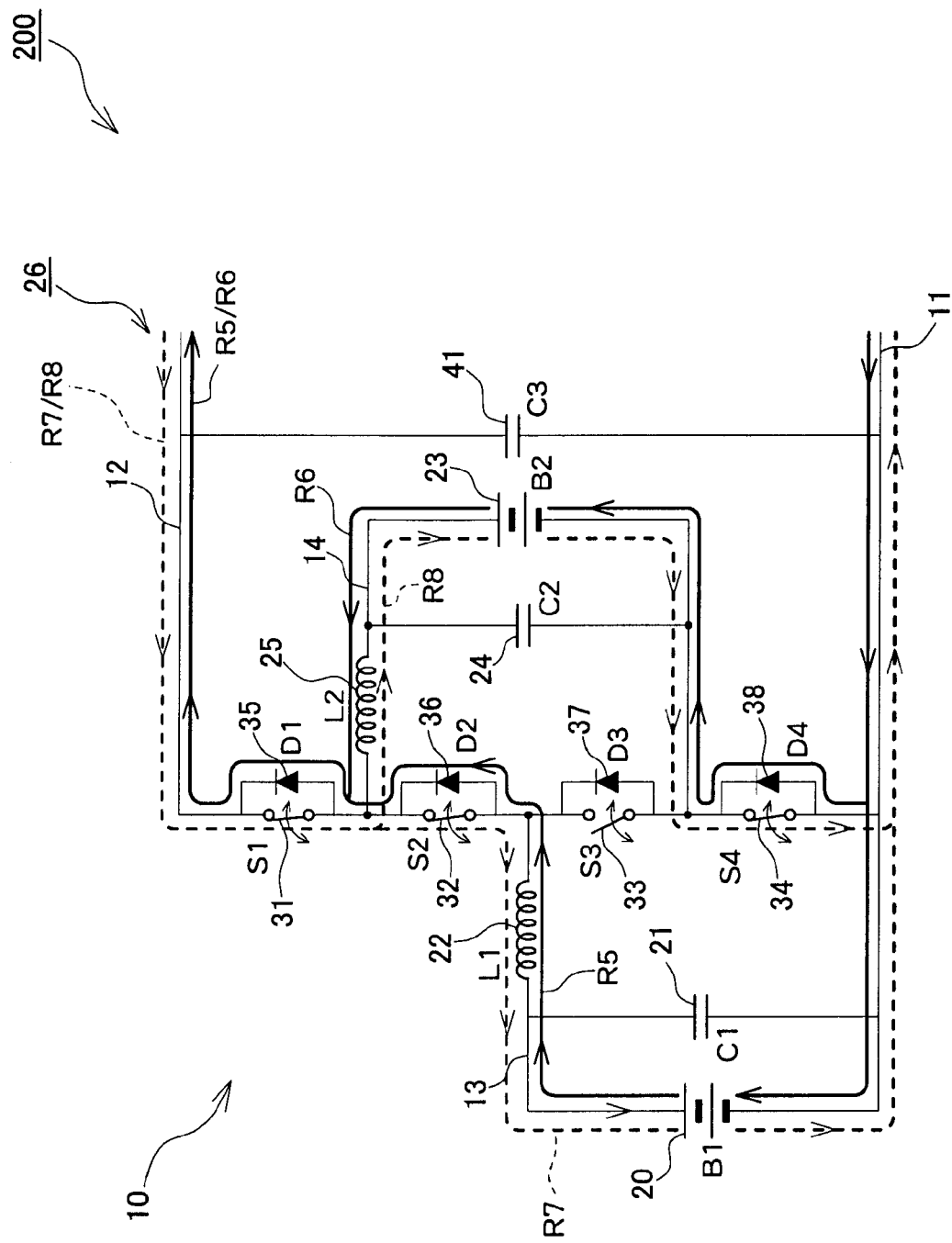
FIG. 5 is a diagram illustrating the flow of current when the electric power of the first and second batteries is output with the first and second batteries connected in parallel in the basic operation of the first voltage converter that is mounted in the motor-driven vehicle of the present invention.

A boost/buck operation is described with reference to FIGS. 4 and 5 when B1 (20) and B2 (23) are connected in parallel. In this case, as illustrated in FIGS. 4 and 5, the control device 100 turns on and off S1 (31) to S4 (34). As illustrated in FIG. 4, when S1 (31) is turned off, and S2 (32) to S4 (34) are turned on, similar to the description given with reference to FIG. 2, an electric power from B1 (20) flows in the circuit R1, and then L1 (22) is charged with this electric power, and an electric power from B2 (23) flows in the circuit R2, and then L2 (25) is charged with this electric power. Subsequently, as illustrated in FIG. 5, when S3 (33) is turned off, and S1 (31), S2 (32), and S4 (34) are turned on, a circuit R5 (illustrated by a solid line), in which current flows [from B1 (20), to L1 (22), D2 (36), D1 (35), the high voltage electric path 12, the reference electric path 11, and B1 (20)], is formed, and a circuit R6 (illustrated by a solid line), in which current flows [from B2 (23), to L2 (25), D1 (35), the high voltage electric path 12, the reference electric path 11, D4 (38), and B2 (23)], is formed. An electric power charged into L1 (22) is output via the circuit R5, and an electric power charged into L2 (25) is output to the high voltage electric path 12 via the circuit R6. When a regenerative electric power is generated by the motor-generator 50 at that time, as illustrated in FIG. 5, B1 (20) is charged with the regenerative electric power via a circuit R7 (illustrated by a dotted line) in which current flows [from the high voltage electric path 12, to S1 (31), S2 (32), L1 (22), B1 (20), the reference electric path 11, and the high voltage electric path 12], and B2 (23) is charged with the regenerative electric power via a circuit R8 (illustrated by a dotted line) in which current flows [from the high voltage electric path 12, to S1 (31), L2 (25), B2 (23), S4 (34), the reference electric path 11, and the high voltage electric path 12].

As described above, the control device 100 turns on or off S1 (31) to S4 (34) such that the voltage of B1 (20) and B2 (23) is boosted, B1 (20) and B2 (23) are connected in parallel, the boosted voltage is output to the electric power output path 26 (the high voltage electric path 12 and the reference electric path 11), and B1 (20) and B2 (23) are charged with the regenerative electric power of the electric power output path 26.

<Operational Range of Motor-Generator 50 on Torque-Rotational Speed Diagram>

Subsequently, the operational range and the power output region of the motor-generator 50 on a torque-rotational speed diagram are described with reference to FIG. 6. The operational range and the power output range of the motor-generator 50 on the torque-rotational speed diagram are defined by the magnitude of a voltage, a current, or an electric power supplied to the motor-generator 50. In the embodiment, the description is given based on the assumption that the voltage VB2 of B2 (23) is lower than or equal to the voltage VB1 of B1 (20).

When a rated voltage, a rated current, or a rated electric power can be supplied to the motor-generator 50, for example, when the first voltage converter 10 can boost the voltage VB1 of B1 (20) and the voltage VB2 of B2 (23) to a predetermined rated voltage, connect B1 (20) and B2 (23) in parallel, and supply the total current of B1 (20) and B2 (23) to the motor-generator 50, the maximum power output (=rotational speed×torque) of the motor-generator 50 is determined by the size of a stator and the rotor, and the allowable current, the allowable voltage, the strength, and the like of the motor-generator 50. A relationship between torque and the rotational speed when the motor-generator 50 is operated at a constant maximum power output is defined by a maximum equi-power output line b on the torque-rotational speed diagram illustrated in FIG. 6. Accordingly, when the rated voltage, the rated current, or the rated electric power can be supplied to the motor-generator 50, the range of the rotational speed and the torque of the motor-generator 50 is limited to a region on a left side of the maximum equi-power output line b. The maximum torque outputable from the motor-generator 50 is determined by the strength of the rotor, the shaft, and the like, and is defined by a maximum torque line a illustrated in FIG. 6. Accordingly, the range of the operating point of the motor-generator 50 is limited to a region below the maximum torque line a illustrated in FIG. 6. In addition, the maximum value of the rotational speed of the motor-generator 50 is determined by the strength of the rotor, the shaft, and the like, and is defined by a maximum limit rotational speed line c illustrated in FIG. 6. Accordingly, when the rated voltage, the rated current, or the rated electric power can be supplied to the motor-generator 50, the range of the operating point of the motor-generator 50 is defined as an inside range surrounded by the maximum torque line a, the maximum equi-power output line b, and the maximum limit rotational speed line c; that is, as illustrated in FIG. 6, a range surrounded by a line that connects together a zero-rotational speed point P1 on the maximum torque line a, an intersection point P2 between the maximum torque line a and the maximum equipower output line b, an intersection point P3 between the maximum equi-power output line b and the maximum limit rotational speed line c, a zero-torque point P4 on the maximum limit rotational speed line c, and an origin O. This range is the maximum region of the operating point of the motor-generator 50. As described above, since the power output of the motor-generator 50 is determined by a rotational speed and torque (power output=rotational speed× torque), the maximum region of the operating point is the maximum power output region of the motor-generator 50.

When a voltage and current supplied to the motor-generator 50 are lower than the rated voltage, the rated current, or the rated electric power, the operating range of the motor-generator 50 becomes smaller than the maximum range corresponding to the supply voltage, the supply current, or the supply electric power. For example, when B1 (20) and B2 (23) are connected in series to the electric power output path 26 by the first voltage converter 10, and a direct current electric power is supplied to the electric power output path 26 without being boosted, a voltage, current, and an electric power supplied to the motor-generator 50 are respectively lower than the rated voltage, the rated current, and the rated electric power, and thus the power output (rotational speed x torque) of the motor-generator 50 becomes a second power output, a limit value of which is smaller than that of the maximum power output. Accordingly, in this case, the operating range of the motor-generator 50 is limited to a region on a left side of a second equi-power output line h (illustrated by a line with asterisks in FIG. 6) on which the power output of the motor-generator 50 is constant at the second power output smaller than the maximum power output. When a voltage supplied to the motor-generator 50 is lower than the rated voltage, a limit rotational speed is decreased. Therefore, when a voltage supplied to the motor-generator 50 is lower than the rated voltage, the limit rotational speed relative to torque is defined by a second limit rotational speed line j (illustrated by a line with asterisks in FIG. 6) biased to the left (rotational speed is more limited) further than the maximum limit rotational speed line c illustrated in FIG. 6. Accordingly, when B1 (20) and B2 (23) are connected in series to the electric power output path 26 by the first voltage converter 10, and the direct current electric power is supplied to the electric power output path 26 without being boosted, the operating range of the motor-generator 50 is defined as an inside range surrounded by the maximum torque line a, the second equi-power output line h, and the second limit rotational speed line j; that is, as illustrated in FIG. 6, a range surrounded by a line that connects together the zero-rotational speed point P1 on the maximum torque line a, an intersection point P12 between the maximum torque line a and the second equi-power output line h, an intersection point P13 between the second equi-power output line h and the second limit rotational speed line j, a zero-torque point P14 on the second limit rotational speed line j, and the origin O. Hereinafter, this operating range is referred to as a second region.

When only B1 (20) is directly connected to the electric power output path 26 by the first voltage converter 10, and a direct current electric power is supplied to the electric power output path 26 without being boosted, a voltage supplied to the motor-generator 50 is the voltage VB1 of B1 (20), and the supply voltage along with a current and an electric power are lower than those when B1 (20) and B2 (23) are connected to the electric power output path 26 in series, and thus the power output (=rotational speed×torque) of the motor-generator 50 is a power output, the maximum value of which is smaller than that of the second power output (smaller than the maximum power output). Accordingly, in this case, the operation range of the motor-generator 50 is limited to a region on a left side of an equi-power output line f (illustrated by the alternate long and short dash line in FIG. 6) of B1 biased to the left further than the second equi-power output line h (illustrated by the line with asterisks in FIG. 6). Since the voltage supplied to the motor-generator 50 is lower than that when B1 (20) and B2 (23) are connected in series to the electric power output path 26, the limit rotational speed relative to torque is defined by a limit rotational speed line g (illustrated by the alternate long and two short dashes line in FIG. 6) of B1 biased to the left (rotational speed is more limited) further than the second limit rotational speed line j (illustrated by the line with asterisks in FIG. 6) illustrated in FIG. 6. Accordingly, when only B1 (20) is directly connected to the electric power output path 26 by the first voltage converter 10, and the direct current electric power is supplied to the electric power output path 26 without being boosted, the operating range of the motor-generator 50 is defined as an inside range surrounded by the maximum torque line a, the equi-power output line f of B1, and the limit rotational speed line g of B1; that is, as illustrated in FIG. 6, a range surrounded by a line that connects together the zero-rotational speed point P1 on the maximum torque line a, an intersection point P8 between the maximum torque line a and the equi-power output line f of B1, an intersection point P9 between the equi-power output line f of B1 and the limit rotational speed line g of B1, a zero-torque point P10 on the limit rotational speed line g of B1, and the origin O. Hereinafter, this operating range is referred to as a region B1.

Similarly, when only B2 (23) with a voltage lower than that of B1 (20) is directly connected to the electric power output path 26 by the first voltage converter 10, and a direct current electric power is supplied to the electric power output path 26 without being boosted, a voltage supplied to the motor-generator 50 is the voltage BV2 of B2 (23) lower than the voltage VB1 of B1 (20), and the supply voltage along with a current and an electric power are lower than those when only B1 (20) is directly connected to the electric power output path 26, and thus the power output (=rotational speed×torque) of the motor-generator 50 is a power output, the maximum value of which is smaller than that of the power output when B1 (20) is directly connected to the electric power output path 26. Accordingly, the operation range of the motor-generator 50 is limited to a region on a left side of an equi-power output line d (illustrated by a dotted line in FIG. 6) of B2 biased to the left further than the equipower output line f (illustrated by the alternate long and short dash line in FIG. 6) of B1. Since a voltage supplied to the motor-generator 50 is the voltage VB2 of B2 (23), and is lower than the voltage VB1 of B1 (20), as illustrated in FIG. 6, the limit rotational speed relative to torque is defined by a limit rotational speed line e (illustrated by a dotted line in FIG. 6) of B2 biased to the left (rotational speed is more limited) further than the limit rotational speed line g (illustrated by the alternate one long and two short dashes line in FIG. 6) of B1 illustrated in FIG. 6. Accordingly, when only B2 (23) is directly connected to the electric power output path 26 by the first voltage converter 10, and the direct current electric power is supplied to the electric power output path 26 without being boosted, the operating range of the motor-generator 50 is defined as an inside range surrounded by the maximum torque line a, the equi-power output line d of B2, and the limit rotational speed line e of B2; that is, as illustrated in FIG. 6, a range surrounded by a line that connects together the zero-rotational speed point P1 on the maximum torque line a, an intersection point P5 between the maximum torque line a and the equi-power output line d of B2, an intersection point P6 between the equi-power output line d of B2 and the limit rotational speed line e of B2, a zero-torque point P7 on the limit rotational speed line e of B2, and the origin O. Hereinafter, this operating range is referred to as a region B2.

Figure 6:
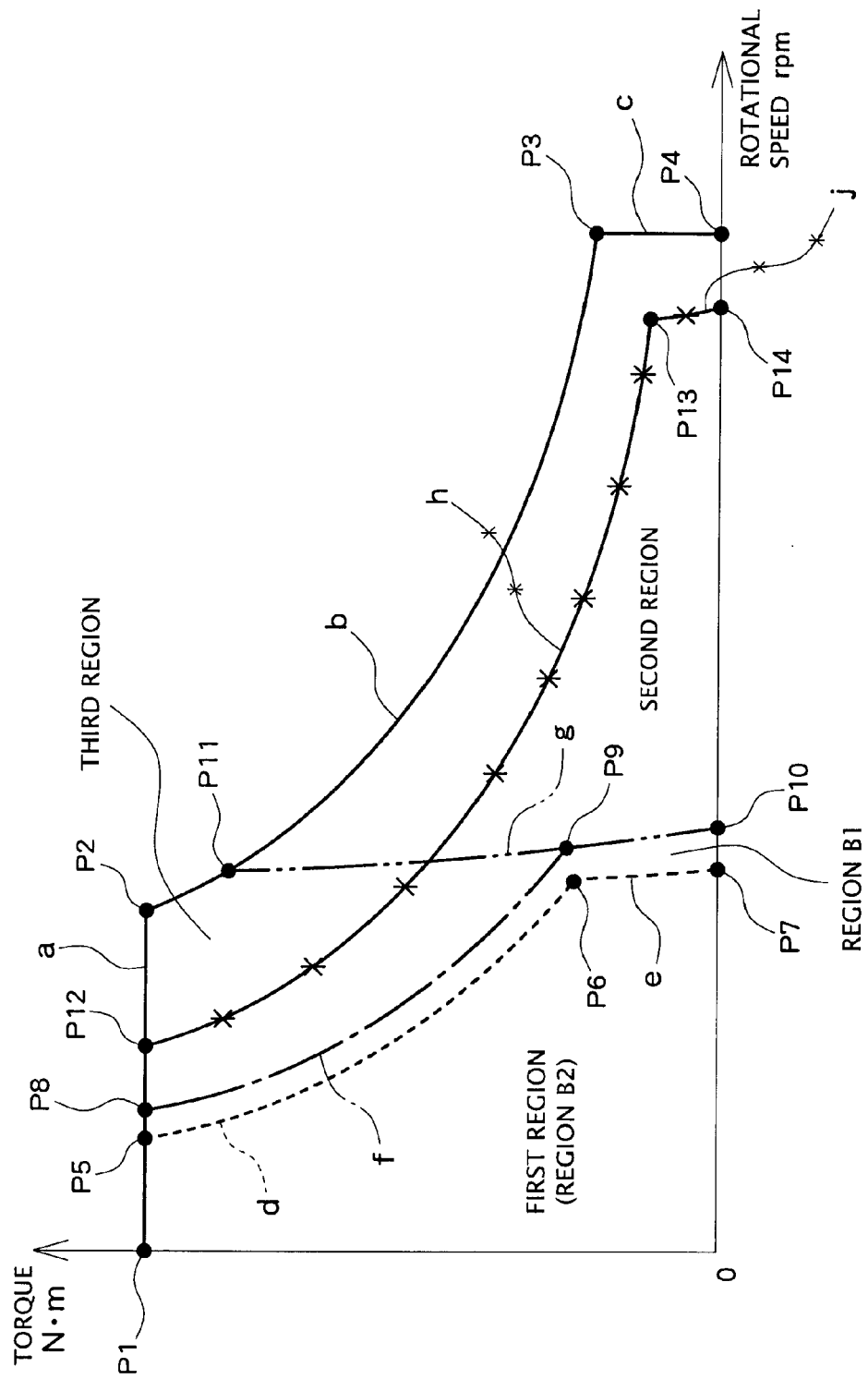
FIG. 6 is a graph illustrating the operation region of a motor on a torque characteristic diagram relative to the rotational speed of the motor that is mounted in the motor-driven vehicle of the present invention.

As described above, when the voltage VB2 of B2 (23) is lower than the voltage VB1 of B1 (20); in other words, when the voltage VB1 of B1 (20) is higher than the voltage VB1 of B2 (23), as illustrated in FIG. 6, the region B1 is larger than the region B2, and is a region that includes the region B2. When the operating point of the motor-generator 50 is positioned in the region B2, it is possible to drive the motor-generator 50 by directly connecting either of the batteries B1 (20) and B2 (23) to the motor-generator 50. In contrast, in a case where the operating point of the motor-generator 50 is positioned outside the region B2 and in the region B1, when B1 (20) is used as a power supply, it is possible to drive the motor-generator 50 by directly connecting the battery to the motor-generator 50, and when B2 (23) is used as a power supply, it may not be able to drive the motor-generator 50. Hereinafter, in the specification, a first region refers to the region B2 when the voltage VB2 of B2 (23) is lower than or equal to the voltage VB1 of B1 (20).

When the voltage VB1 of B1 (20) is substantially equal to the voltage VB2 of B2 (23) (hereinafter, the embodiment is described on the assumption that both voltages are equal to VB1), the first voltage converter 10 directly connects B1 (20) and B2 (23) in parallel to the electric power output path 26, and a direct current electric power can be supplied to the motor-generator 50. In this case, current supplied to the motor-generator 50 is the total output current of B1 (20) and B2 (23). The voltage is lower than a voltage when boosting is performed; however, the current is the total current of B1 (20) and B2 (23), and is substantially equal to the current when booting is performed. For this reason, in this case, the feasible power output (=rotational speed×torque) of the motor-generator 50 is defined by the maximum equi-power output line b. In contrast, since the voltage is VB1 lower than the voltage when boosting is performed, the limit rotational speed relative to torque is defined by the limit rotational speed line g (illustrated by the alternate one long and two short dashes line in FIG. 6) of B1 illustrated in FIG. 6. Accordingly, when B1 (20) and B2 (23) are directly connected in parallel to the electric power output path 26 by the first voltage converter 10, and a direct current electric power is supplied to the electric power output path 26, the operation range of the motor-generator 50 is defined by an inside range surrounded by the maximum torque line a, the maximum equi-power output line b, and the limit rotational speed line g of B1; that is, as illustrated in FIG. 6, a range surrounded by a line that connects together the zero-rotational speed point P1 on the maximum torque line a, the intersection point P2 between the maximum torque line a and the maximum equi-power output line b, an intersection point P11 between the maximum equi-power output line b and the limit rotational speed line g of B1, a zero-torque point P10 on the limit rotational speed line g of B1, and the origin O. Hereinafter, this operating range is referred to as a third region.

Operation pattern switching control, when the temperature of each of S1 (31) to S4 (34) exceeds a predetermined threshold value in the motor-driven vehicle 200 in which the first voltage converter 10 with the aforementioned configuration is mounted, is described with reference to FIGS. 7 to 26. The temperature of the predetermined threshold value referred to here is a temperature lower than the maximum temperature in a predetermined operation temperature range of each of the switching elements 31 to 34, and is a temperature determined by the characteristics of each of the switching elements 31 to 34. The temperature threshold value may be approximately 100° C. or the like.

<Transition to Single Battery Direct-Connection Operation Mode When Temperature of S2 (32) or S4 (34) Exceeds Predetermined Threshold Value>

Figure 7:
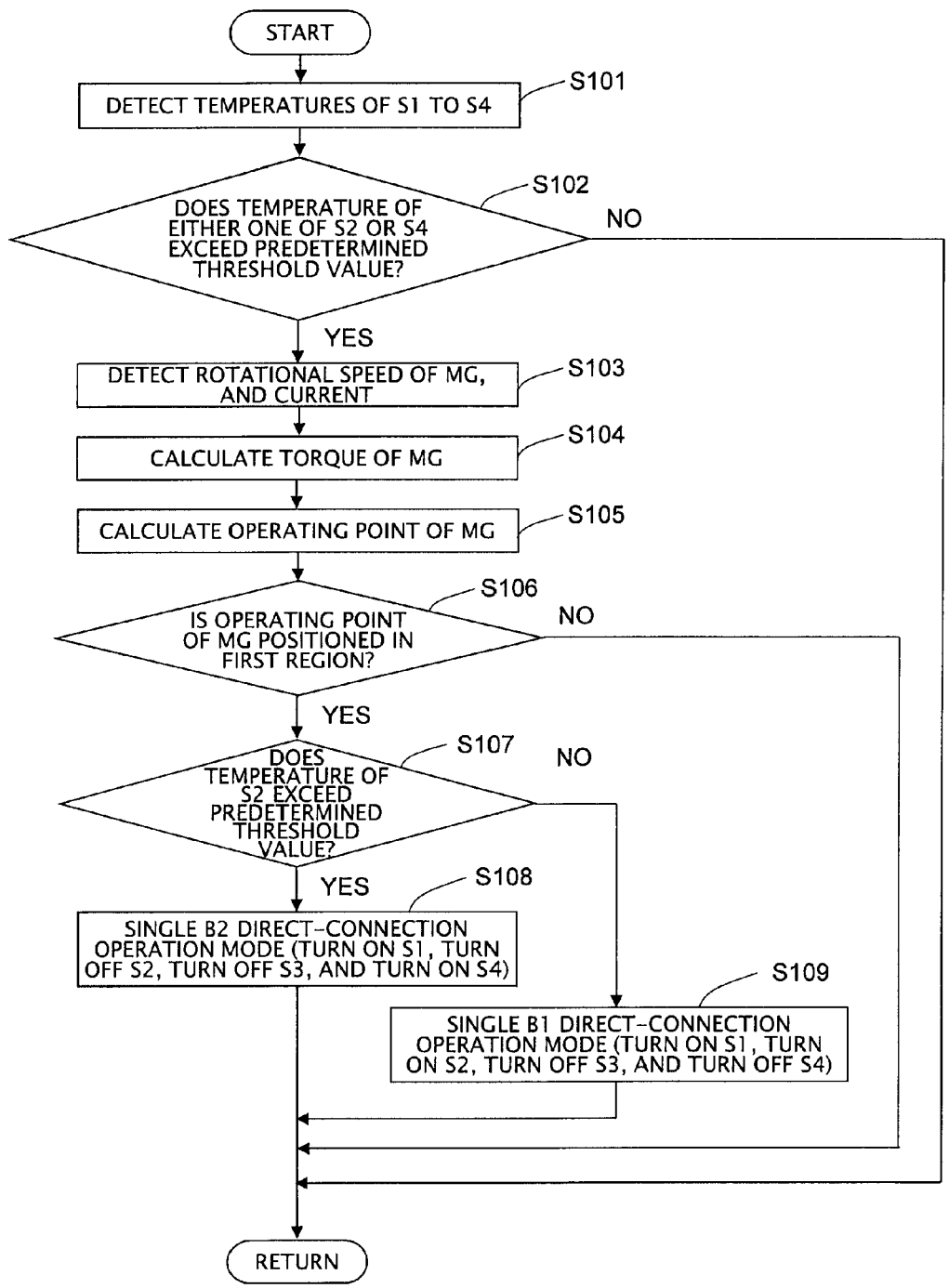
FIG. 7 is a flowchart illustrating transition to a single battery direct-connection operation mode when the temperature of a second or fourth switching element of a control device of the motor-driven vehicle of the present invention, in which the first voltage converter is mounted, exceeds a predetermined threshold value.

As illustrated in step S101 in FIG. 7, the control device 100 detects the respective temperatures TS1 to TS4 of S1 (31) to S4 (34) using the respective temperature sensors 81 to 84 illustrated in FIG. 1. Subsequently, as illustrated in step S102 in FIG. 7, the control device 100 determines whether either one of the respective temperatures TS2 and TS4 of S2 (32) and S4 (34) exceeds the predetermined threshold value, and when in step S102 in FIG. 7 the control device 100 determines that either one of the temperature TS2 of S2 (32) and the temperature TS4 of S4 (34) exceeds the predetermined threshold value (YES in step S102 in FIG. 7), the process proceeds to step S103 in FIG. 7, and the resolver 94 illustrated in FIG. 1 detects the rotational speed of the motor-generator (MG) 50 and the rotational angle of the rotor, and the current sensors 92 and 93 illustrated in FIG. 1 detect a V-phase current and a W-phase current, respectively. As illustrated in step S104 in FIG. 7, the control device 100 calculates the torque of the motor-generator (MG) 50 based on the detected rotational angle of the rotor and the detected current. Subsequently, as illustrated in step S105 in FIG. 7, the control device 100 calculates the position of the operating point of the motor-generator 50 on the torque-rotational speed characteristic diagram illustrated in FIG. 6 based on the detected rotational speed and the calculated torque, and the process proceeds to step S106 in FIG. 7.

Figure 8:
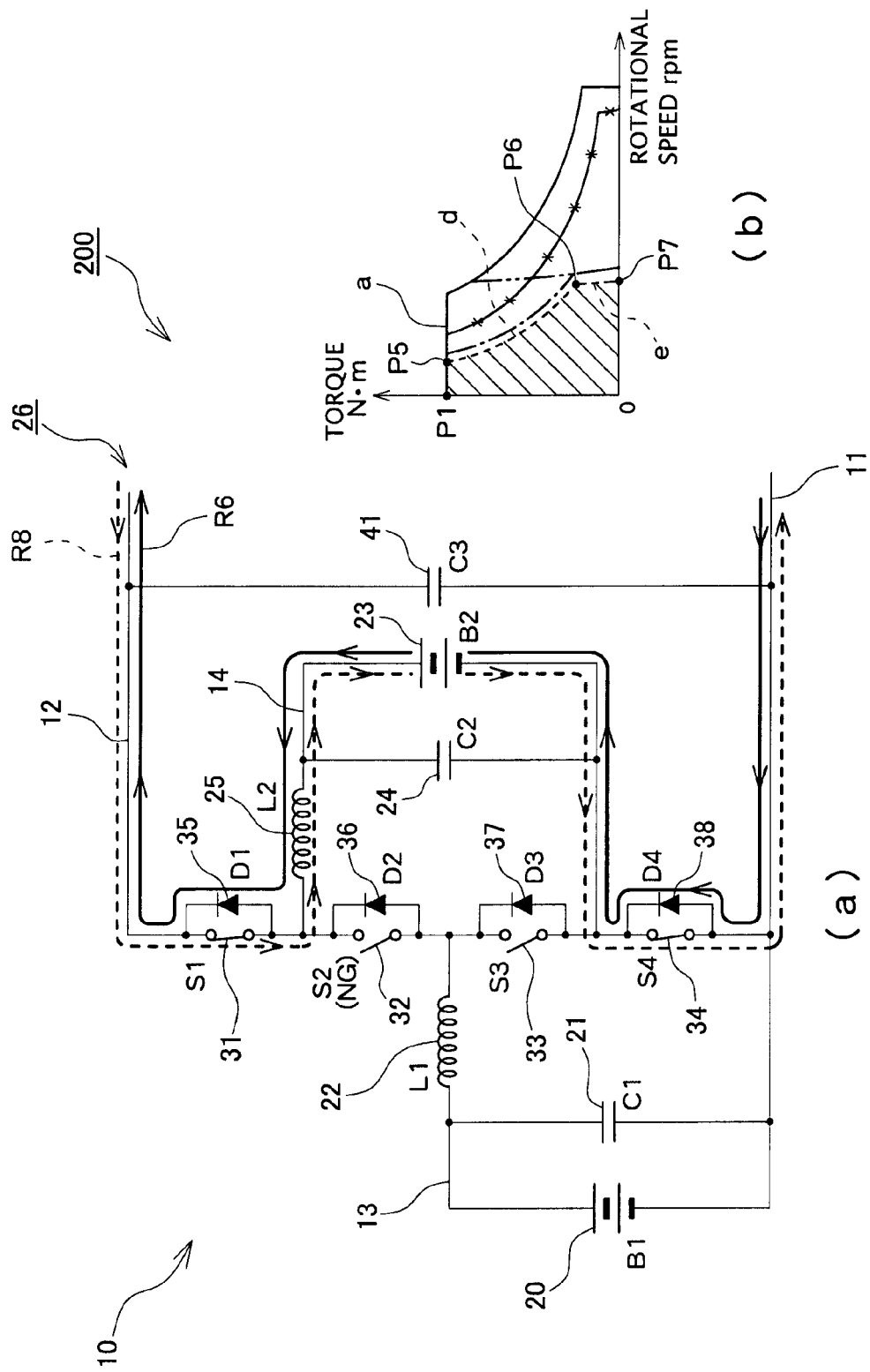
FIG. 8 is a diagram illustrating the flow of current in the single battery direct-connection operation mode in which the second battery is used, when the temperature of the second or fourth switching element of the first voltage converter mounted in the motor-driven vehicle of the present invention exceeds the predetermined threshold value.

As illustrated in step S106 in FIG. 7, the control device 100 determines whether the operating point of the motor-generator 50 is positioned in the first region (inside region surrounded by the maximum torque line a, the equi-power output line d of B2, and the limit rotational speed line e of B2 illustrated in FIG. 6; that is, the hatched region illustrated in FIGS. 8(*b*) and 9(*b*)) on the torque-rotational speed characteristic diagram illustrated in FIG. 6. When the control device 100 determines that the operating point of the motor-generator 50 is positioned in the first region, the control device 100 determines that it is possible to drive the motor-generator 50 by directly connecting either of the batteries B1 (20) and B2 (23) to the motor-generator 50, and the process proceeds to step S107 in FIG. 7. In contrast, when the control device 100 determines that the operating point of the motor-generator 50 is not positioned in the first region (is positioned outside the first region), the control device 100 determines that it may not be able to drive the motor-generator 50 when either of the batteries B1 (20) and B2 (23) is directly connected to the motor-generator 50, and the control device 100 ends a program without allowing the first voltage converter 10 to make the transition to a single battery direct-connection operation mode.

After the process proceeds to step S107 in FIG. 7, the control device 100 determines whether the temperature TS2 of S2 (32) exceeds the predetermined threshold value. When the temperature TS2 of S2 (32) exceeds the predetermined threshold value, the process proceeds to step S108 in FIG. 7, and the control device 100 allows the first voltage converter 10 to make the transition to the single battery direct-connection operation mode in which B2 (23) is used, S1 (31) and S4 (34) are turned on, and S2 (32) and S3 (33) are turned off as illustrated in FIG. 8(*a*).

As illustrated in FIG. 8(*a*), in the single battery direct-connection operation mode in which B2 (23) is used, the electric power of B2 (23) is output to the electric power output path 26 via the circuit R6 (illustrated by the solid line in FIG. 8(*a*)) in which current flows [from B2 (23), to L2 (25), D1 (35), the high voltage electric path 12, the reference electric path 11, D4 (38), and B2 (23)], and B2 (23) is charged with the regenerative electric power of the motor-generator 50 via the circuit R8 (illustrated by the dotted line in FIG. 8(*a*)) in which current flows [from the high voltage electric path 12, to S1 (31), L2 (25), B2 (23), S4 (34), the reference electric path 11, and the high voltage electric path 12]. Since the motor-generator 50 of the motor-driven vehicle 200 is operated in the first region (the hatched region in FIG. 8(*b*)) in which the motor-driven vehicle 200 can travel with the voltage VB2 and the outputable current of B2 (23), even if the temperature of S2 (32) exceeds the predetermined threshold value, it is possible to restrict the flow of current to S2 (32) to zero without limiting the input/output electric power of B2 (23) and impairing driveability by switching the operation mode to the single battery direct-connection operation mode, and thus, it is possible to prevent the temperature of S2 (32) from increasing beyond the predetermined operation temperature range.

Figure 9:
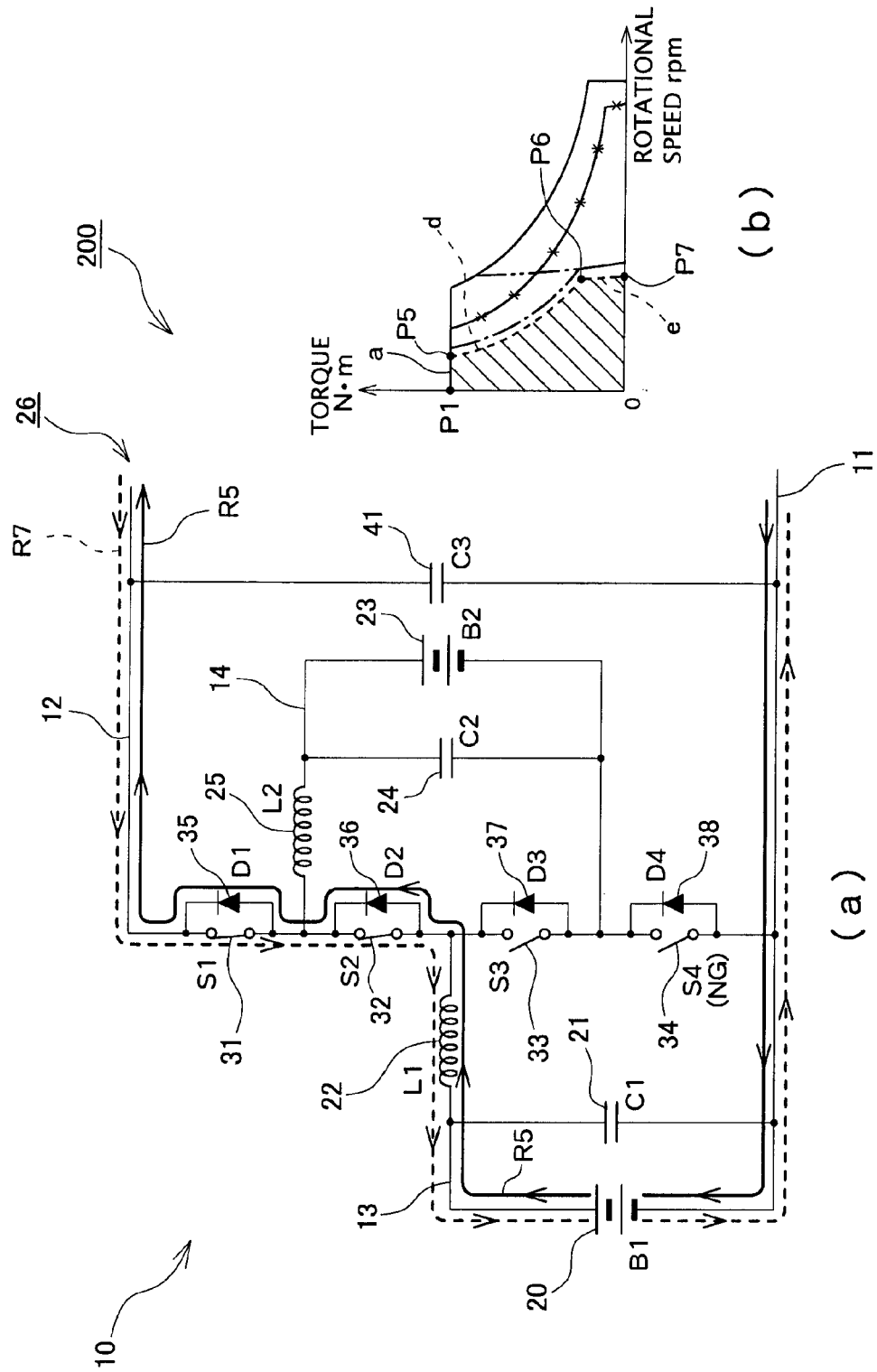
FIG. 9 is a diagram illustrating the flow of current in the single battery direct-connection operation mode in which the first battery is used, when the temperature of the second or fourth switching element of the first voltage converter mounted in the motor-driven vehicle of the present invention exceeds the predetermined threshold value.

In contrast, when the temperature TS2 of S2 (32) does not exceed the predetermined threshold value in step S107 in FIG. 7, the control device 100 determines that the temperature TS4 of S4 (34) exceeds the predetermined threshold value, the process proceeds to step S109 in FIG. 7, and the control device 100 allows the first voltage converter 10 to make the transition to the single battery direct-connection operation mode in which B1 (20) is used, S1 (31) and S2 (32) are turned on, and S3 (33) and S4 (34) are turned off as illustrated in FIG. 9(*a*).

As illustrated in FIG. 9(*a*), in the single battery direct-connection operation mode in which B1 (20) is used, the electric power of B1 (20) is output to the electric power output path 26 via the circuit R5 (illustrated by the solid line in FIG. 9(a)) in which current flows [from B1 (20), to L1 (22), D2 (36), D1 (35), the high voltage electric path 12, the reference electric path 11, and B1 (20)], and B1 (20) is charged with the regenerative electric power of the motor-generator 50 via the circuit R7 (illustrated by the dotted line in FIG. 9(a)) in which current flows [from the high voltage electric path 12, to S1 (31), S2 (32), L1 (22), B1 (20), the reference electric path 11, and the high voltage electric path 12]. Since the motor-generator 50 of the motor-driven vehicle 200 is operated in the first region (region included in the region B2, and the hatched region in FIG. 9(b)) smaller than the region B1, even if the temperature of S4 (34) exceeds the predetermined threshold value, it is possible to restrict the flow of current to S4 (34) to zero without limiting the input/output electric power of B1 (20) and impairing driveability by switching the operation mode to the single battery direct-connection operation mode, and thus it is possible to prevent the temperature of S4 (34) from increasing beyond the predetermined operation temperature range.

When either one of the respective temperatures TS2 and TS4 of S2 (32) and S4 (34) does not exceed the predetermined threshold value in step S102 in FIG. 7, the control device 100 ends the program without allowing the first voltage converter 10 to make the transition to the single battery direct-connection operation mode.

In step S107 in FIG. 7, the control device 100 may determine whether the temperature TB2 of B2 (23) is in a normal operation range (temperature range in which the temperature is not at a high or low alarm level), each of the respective temperatures TC2 and TL2 of C2 (24) and L2 (25) is lower than or equal to a predetermined upper limit temperature, and the state of charge (SOC) of B2 (23) required to be able to travel a predetermined distance is a predetermined value or greater, and thereafter, the control device 100 may allow the first voltage converter 10 to make the transition to the single battery direct-connection operation mode in which B2 (23) is used, and when the aforementioned conditions are not satisfied, the control device 100 may end the program without allowing the first voltage converter 10 to make the transition to the single battery direct-connection operation mode. Similarly, in step S107 in FIG. 7, the control device 100 may determine whether the temperature TB1 of B1 (20) is in a normal operation range (temperature range in which the temperature is not at a high or low alarm level), each of the respective temperatures TC1 and TL1 of C1 (21) and L1 (22) is lower than or equal to a predetermined upper limit temperature, and the state of charge (SOC) of B1 (20) is a predetermined value or greater required to travel a predetermined distance, and thereafter, the control device 100 may allow the first voltage converter 10 to make the transition to the single battery direct-connection operation mode in which B1 (20) is used, and when the aforementioned conditions are not satisfied, the control device 100 may end the program without allowing the first voltage converter 10 to make the transition to the single battery direct-connection operation mode.

<Transition to In-Series Direct-Connection Operation Mode When Temperature of

Second or Fourth Switching Element Exceeds Predetermined Threshold Value>

Figure 10:
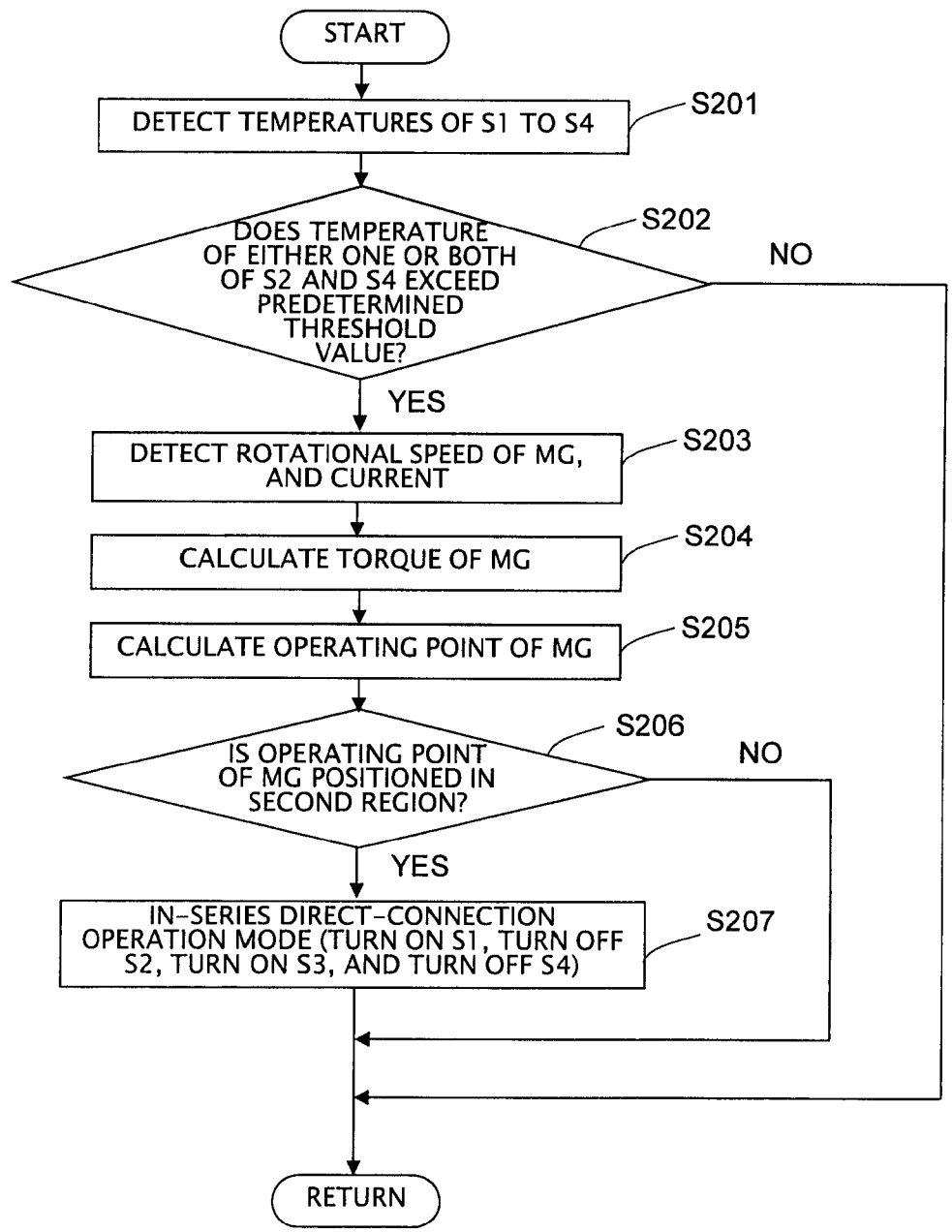
FIG. 10 is a flowchart illustrating transition to an in-series direct-connection operation mode when the temperature of the second or fourth switching element of the control device of the motor-driven vehicle of the present invention, in which the first voltage converter is mounted, exceeds the predetermined threshold value.
Figure 11:
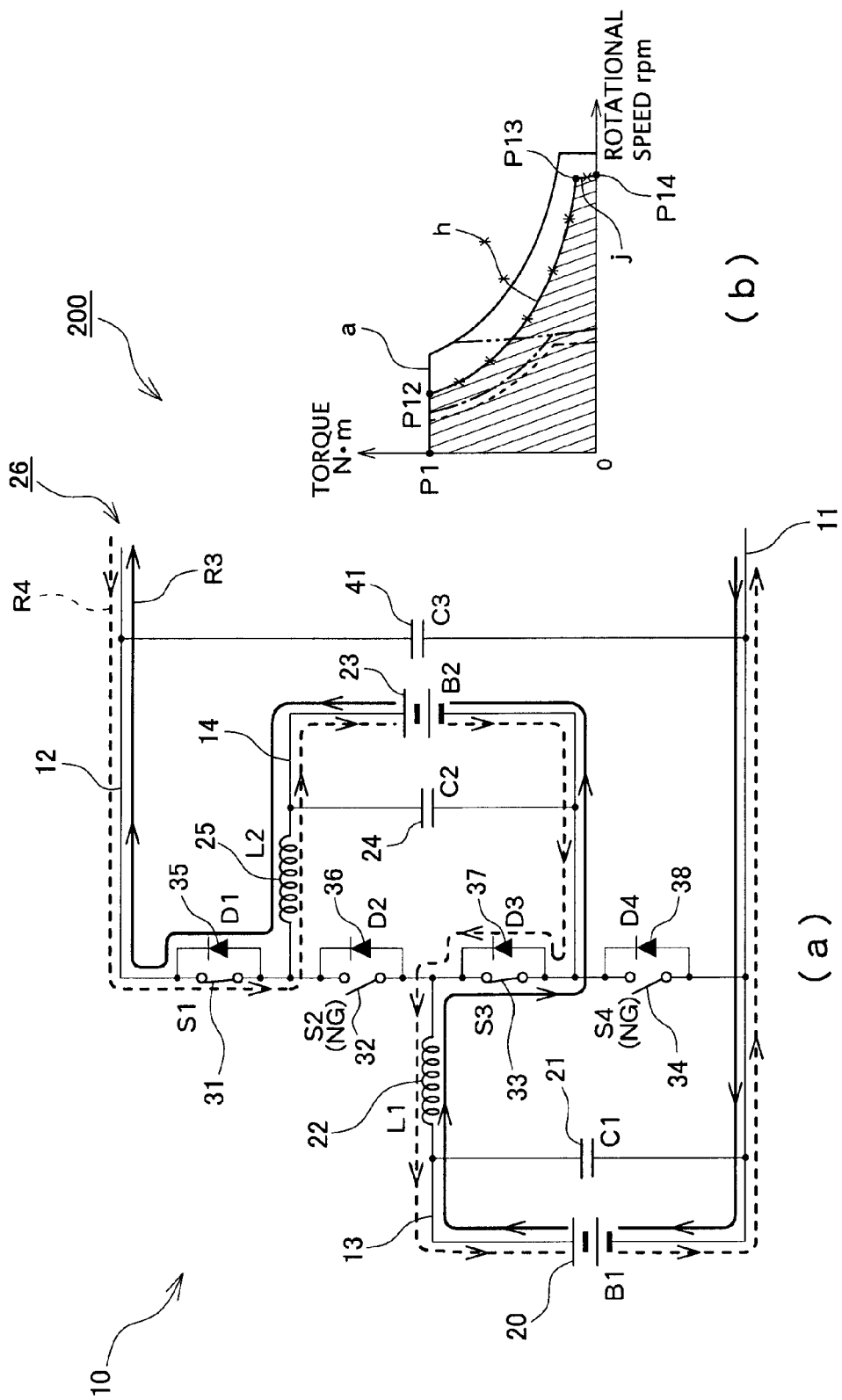
FIG. 11 is a diagram illustrating the flow of current in the in-series direct-connection operation mode when the temperature of the second or fourth switching element of the first voltage converter mounted in the motor-driven vehicle of the present invention exceeds the predetermined threshold value.

As illustrated in step S201 in FIG. 10, the control device 100 detects the respective temperatures TS1 to TS4 of S1 (31) to S4 (34) using the respective temperature sensors 81 to 84 illustrated in FIG. 1. Subsequently, as illustrated in step S202 in FIG. 10, the control device 100 determines whether either one or both of the respective temperatures TS2 and TS4 of S2 (32) and S4 (34) exceeds the predetermined threshold value, and when in step S202 in FIG. 10 the control device 100 determines that either one or both of the respective temperatures TS2 and TS4 of S2 (32) and S4 (34) exceeds the predetermined threshold value (YES in step S202 in FIG. 10), the process proceeds to step S203 in FIG. 10, and similar to the description given with reference to FIG. 7, the control device 100 detects the rotational speed of the motor-generator (MG) 50 and the rotational angle of the rotor, and a V-phase current and a W-phase current, and calculates the torque of the motor-generator (MG) 50 as illustrated in step S204 in FIG. 10, and the position of the operating point of the motor-generator 50 on the torque-rotational speed characteristic diagram illustrated in FIG. 6 as illustrated in step S205 in FIG. 10, and the process proceeds to step S206 in FIG. 10.

As illustrated in step S206 in FIG. 10, the control device 100 determines whether the operating point of the motor-generator 50 is positioned in the second region (the region surrounded by the maximum torque line a, the second equi-power output line h, and the second limit rotational speed line j illustrated in FIG. 6; that is, the hatched region illustrated in FIG. 11(b)) on the torque-rotational speed characteristic diagram illustrated in FIG. 6. When the control device 100 determines that the operating point of the motor-generator 50 is positioned in the second region, the control device 100 determines that it is possible to drive the motor-generator 50 by directly connecting B1 (20) and B2 (23) in series to the motor-generator 50, the process proceeds to step S207 in FIG. 10, and as illustrated in FIG. 11(a), the control device 100 allows the first voltage converter 10 to make the transition to an in-series direct-connection operation mode in which S1 (31) and S3 (33) are turned on, and S2 (32) and S4 (34) are turned off. In contrast, when the control device 100 determines that the operating point of the motor-generator 50 is not positioned in the second region (is positioned outside the second region), the control device 100 determines that it may not be able to drive the motor-generator 50 even if B1 (20) and B2 (23) are directly connected in series to the motor-generator 50, and the control device 100 ends a program without allowing the first voltage converter 10 to make the transition to the in-series direct-connection operation mode.

As illustrated in FIG. 11(a), in the in-series direct-connection operation mode, the electric power of B1 (20) and B2 (23) is output to the electric power output path 26 via the circuit R3 (illustrated by the solid line in FIG. 11(a)) in which current flows [from B1 (20), to L1 (22), S3 (33), B2 (23), L2 (25), D1 (35), the high voltage electric path 12, the reference electric path 11, and B1 (20)], and B1 (20) and B2 (23) are charged with the regenerative electric power of the motor-generator 50 via the circuit R4 (illustrated by the dotted line in FIG. 11(a)) in which current flows [from the high voltage electric path 12, to S1 (31), L2 (25), B2 (23), D3 (37), L1 (22), B1 (20), the reference electric path 11, and the high voltage electric path 12]. Since the motor-generator 50 of the motor-driven vehicle 200 is operated in the second region (the hatched region in FIG. 11(b)) in which the motor-driven vehicle 200 can travel with a total voltage (VB1+VB2) of B1 (20) and B2 (23) and the outputable current of B1 (20) or B2 (23), even if the temperature of S2 (32) or S4 (34) exceeds the predetermined threshold value, it is possible to restrict the flow of current to S2 (32) and S4 (34) (having a temperature exceeding the predetermined threshold value) to zero without limiting the input/output electric power of B1 (20) and B2 (23) and impairing driveability by switching the operation mode to the in-series direct-connection operation mode, and thus it is possible to prevent the temperature of S2 (32) and S4 (34) from increasing beyond the predetermined operation temperature range.

<Transition to In-Parallel Boost Operation Mode When Temperature of Second or Fourth Switching Element Exceeds Predetermined Threshold Value>

Figure 12:
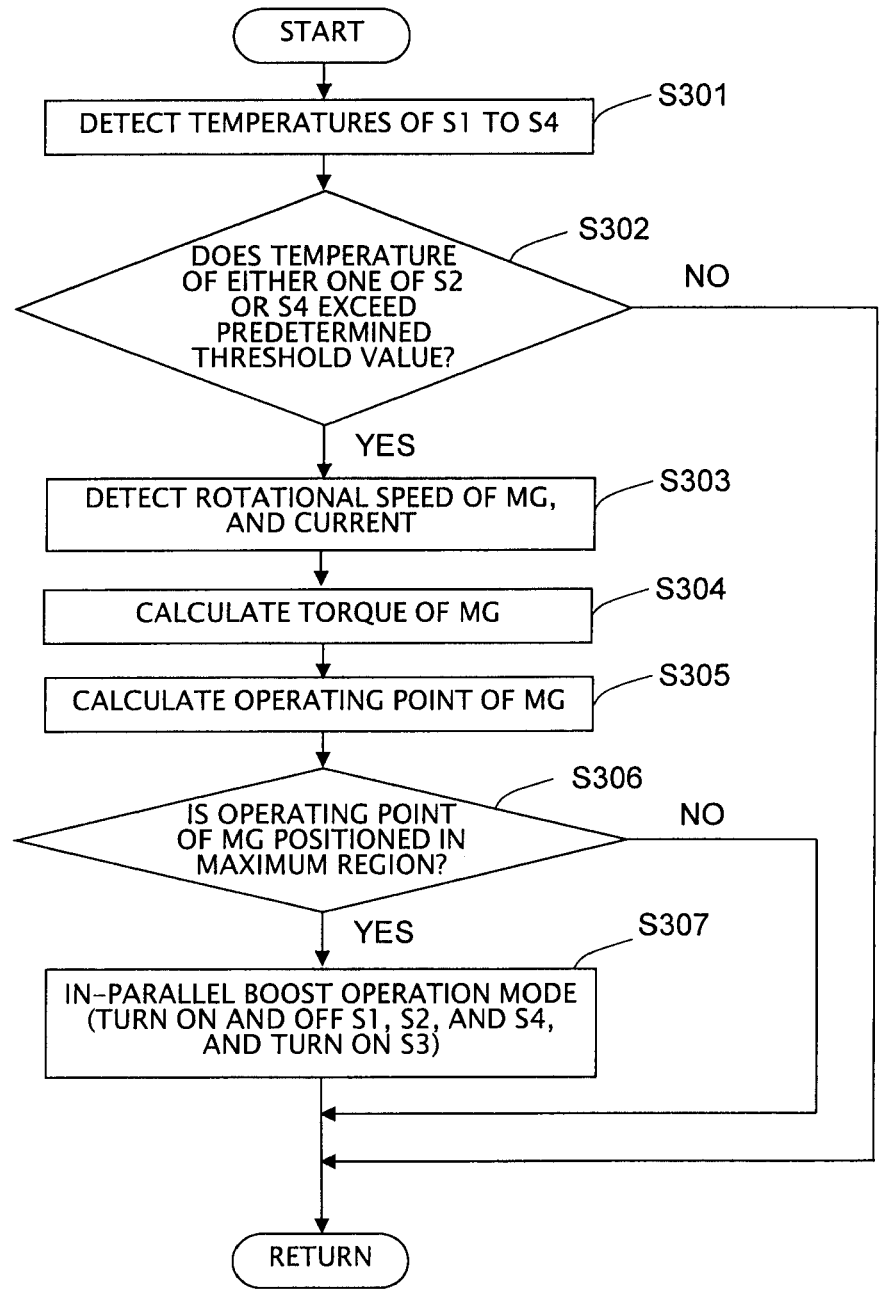
FIG. 12 is a flowchart illustrating transition to an in-parallel boost operation mode when the temperature of the second or fourth switching element of the control device of the motor-driven vehicle of the present invention, in which the first voltage converter is mounted, exceeds the predetermined threshold value.

As illustrated in step S301 in FIG. 12, the control device 100 detects the respective temperatures TS1 to TS4 of S1 (31) to S4 (34) using the respective temperature sensors 81 to 84 illustrated in FIG. 1. Subsequently, as illustrated in step S302 in FIG. 12, the control device 100 determines whether either one of the respective temperatures TS2 and TS4 of S2 (32) and S4 (34) exceeds the predetermined threshold value, and when in step S302 in FIG. 12 the control device 100 determines that either one of the respective temperatures TS2 and TS4 of S2 (32) and S4 (34) exceeds the predetermined threshold value (YES in step S302 in FIG. 12), the process proceeds to step S303 in FIG. 12, and similar to the description given with reference to FIG. 7, the control device 100 detects the rotational speed of the motor-generator (MG) 50 and the rotational angle of the rotor, and a V-phase current and a W-phase current, and calculates the torque of the motor-generator (MG) 50 as illustrated in step S304 in FIG. 12, and the position of the operating point of the motor-generator 50 on the torque-rotational speed characteristic diagram illustrated in FIG. 6 as illustrated in step S305 in FIG. 12, and the process proceeds to step S306 in FIG. 12.

As illustrated in step S306 in FIG. 12, the control device 100 determines whether the operating point of the motor-generator 50 is positioned in the maximum region (the region surrounded by the maximum torque line a, the maximum equi-power output line b, and the limit rotational speed line c illustrated in FIG. 6; that is, the hatched region illustrated in FIGS. 13(b) and 14(b)) on the torque-rotational speed characteristic diagram illustrated in FIG. 6. When the control device 100 determines that the operating point of the motor-generator 50 is positioned in the maximum region, the control device 100 determines that it is possible to drive the motor-generator 50 by connecting B1 (20) and B2 (23) in parallel, and boosting the voltage of B1 (20) and B2 (23), and the process proceeds to step S307 in FIG. 12, and as illustrated in FIGS. 13(a) and 14(a), the control device 100 allows the first voltage converter 10 to make the transition to an in-parallel boost operation mode in which S3 (33) is turned on, and S1 (31), S2 (32), and S4 (34) are turned on and turned off.

When in step S302 in FIG. 12 the control device 100 determines that either one of the respective temperatures TS2 and TS4 of S2 (32) and S4 (34) does not exceed the pre-determined threshold value, or when in step S306 in FIG. 12 the control device 100 determines that the operating point of the motor-generator 50 is not positioned in the maximum region, the control device 100 determines that it may not be able to drive the motor-generator 50 even in the in-parallel boost operation mode, and ends a program without allowing the first voltage converter 10 to make the transition to the in-parallel boost operation mode.

As illustrated in FIGS. 15(a) and 15(b), in the in-parallel boost operation mode, the control device 100 turns on and off S1 (31), S2 (32), and S4 (34) in such a manner that a time period (a period of times t3 to t5 and a period of times t6 to t8) for charging L1 (22) with B1 (20) is offset from a time period (a period of times t1 to t3 and a period of times t4 to t6) for charging L2 (25) with B2 (23), and a time period (a period of times t2 to t3 and a period of times t5 and t6) for outputting an electric power from B1 (20) is offset from a time period (a period of times t3 to t4 and a period of times t6 to t7) for outputting an electric power from B2 (23). At this time, S3 (33) is fixed in an on state (refer to FIGS. 15(c) to 15(f)). Since the respective voltages of the batteries 20 and 23 are boosted to the same high voltage VH, and the voltage VB2 of B2 (23) is lower than the voltage VB1 of B1 (20), the turn-on duty ratio of S2 (32) required to boost the voltage VB2 of B2 (23) to the high voltage VH is greater than that of S4 (34) required to boost the voltage VB1 of B1 (20) to the high voltage VH. As illustrated in FIG. 15(d), the duty ratio of S2 (32) is ($\Delta$T4/($\Delta$T4+$\Delta$T2)) with a turn-on time of $\Delta$T4 and a turn-off time of $\Delta$T2, and as illustrated in FIG. 15(f), the duty ratio of S4 (34) is ($\Delta$T1/($\Delta$T1+$\Delta$T3)) with a turn-on time of $\Delta$T1 and a turn-off time of $\Delta$T3. $\Delta$T4 is a turn-on time of S2 (32) required to boost the voltage VB1 of B1 (20) to the high voltage VH, and $\Delta$T1 is a turn-on time of S4 (34) required to boost the voltage VB2 of B2 (23) to the high voltage VH, in the in-parallel connection described with reference to FIGS. 4 and 5. Since a total of the turn-on time $\Delta$T4 and the turn-off time $\Delta$T2 is equal to a total of the turn-on time $\Delta$T1 and the turn-off time $\Delta$T3 (($\Delta$T4+$\Delta$T2)=($\Delta$T1+$\Delta$T3)), the turn-on time $\Delta$T4 of S2 (32) is longer than the turn-on time $\Delta$T1 of S4 (34) ($\Delta$T4>$\Delta$T1), and the turn-off time $\Delta$T3 of S4 (34) is longer than the turn-off time $\Delta$T2 of S2 (32). At the time t3 illustrated in FIGS. 15(a) and 15(b), when S2 (32) and S4 (34) are operated in such a manner that the timing for switching from the output of the electric power of B1 (20) to the charging of L1 (22) coincides with the timing for starting the output of the electric power of B2 (23), as illustrated in FIGS. 15(d) and 15(f), $\Delta$T1 is longer than $\Delta$T2, and $\Delta$T4 is longer than $\Delta$T3, the turn-on time $\Delta$T1 of S4 (34) operated at a small duty ratio includes the turn-off time $\Delta$T2 of S2 (32) operated at a large duty ratio, and in contrast, a turn-on time $\Delta$T4 of S2 (32) operated at a large duty ratio includes the turn-off time $\Delta$T3 of S4 (34) operated at a small duty ratio.

The flow of current in the first voltage converter 10, when S2 (32) and S4 (34) are turned on and off at the aforementioned duty ratios and timings, is as follows. When S2 (32) is turned on, and S4 (34) is turned off during a period of time t2 to t3 and a period of time t5 to t6 in FIG. 15, as illustrated in FIG. 13(a), the circuit R2 (illustrated by the solid line in FIG. 13(a)), in which current flows [from B2 (23), to L2 (25), S2 (32), S3 (33), and B2 (23)], is formed, and the circuit R5 (illustrated by the solid line in FIG. 13(a)), in which current flows [from B1 (20), to L1 (22), D2 (36), D1 (35), the high voltage electric path 12, the reference electric path 11, and B1 (20)], is formed. An electric power from B2 (23) flows in the circuit R2, and then L2 (25) is charged with this electric power, and an electric power from B1 (20) flows in the circuit R5, and then is output to the high voltage electric path 12. As illustrated in FIG. 13(c), the direction of current flow in the circuit R5 is opposite to the direction of current flow in the circuit R2, on an electric path Z1 between the first connection point 16 and a high voltage-side connection point 16b between S2 (32) and D2 (36), and on an electric path Z2 between the second connection point 17 and a low voltage-side connection point 17a between S2 (32) and D2 (36). For this reason, currents cancel each other out on the electric paths Z1 and Z2 illustrated in FIG. 13(c), and current flowing between the first connection point 16 and the second connection point 17 is decreased, and thus the magnitude of current flowing via S2 (32) is decreased. In contrast, since S3 (33) is fixed in an on state while S2 (32) is turned on, and S4 (34) is turned off, as illustrated in FIG.

Figure 15:
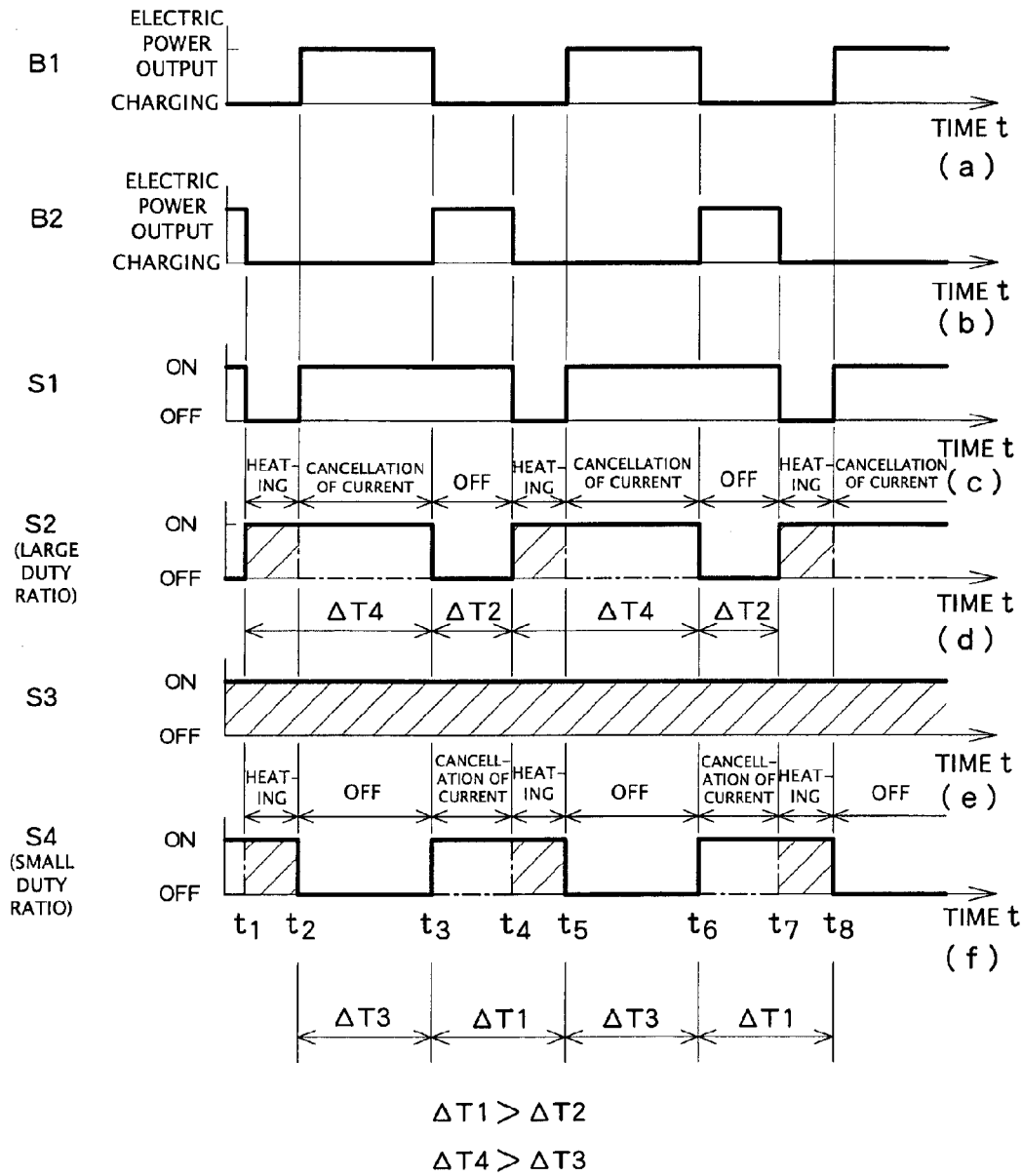
FIG. 15 is a diagram (3) illustrating the flow of current in the in-parallel boost operation mode when the temperature of the second or fourth switching element of the first voltage converter mounted in the motor-driven vehicle of the present invention exceeds the predetermined threshold value.

13(a), the circuit R3 (illustrated by the alternate long and short dash line and solid line in FIG. 13(a)), in which current flows [from B1 (20), to L1 (22), S3 (33), B2 (23), L2 (25), D1 (35), the high voltage electric path 12, the reference electric path 11, and B1 (20)], is also formed at the same time, and thus current from the high voltage electric path 12 flows mainly via the circuit R3. Accordingly, current flowing via S2 (32) during a period of time t2 to t3 and a period of time t5 to t6 in FIG. 15 is lower than current flowing via S2 (32) in the basic boost/buck operation of the first voltage converter 10 described with reference to FIGS. 4 and 5 when B1 (20) and B2 (23) are connected in parallel. During these periods, S4 (34) is turned off, and thus current does not flow via S4 (34).

When S2 (32) is turned off, and S4 (34) is turned on during a period of time t3 to t4 and a period of time t6 to t7 in FIG. 15, as illustrated in FIG. 14(a), the circuit R1 (illustrated by a solid line in FIG. 14(a)), in which current flows [from B1 (20), to L1 (22), S3 (33), S4 (34), and B1 (20)], is formed, and the circuit R6 (illustrated by a solid line in FIG. 14(a)), in which current flows [from B2 (23), to L2 (25), D1 (35), the high voltage electric path 12, the reference electric path 11, D4 (38), and B2 (23)], is formed. An electric power from B1 (20) flows in the circuit R1, and L1 (22) is charged with this electric power, and an electric power from B2 (23) flows in the circuit R6, and is output to the high voltage electric path 12. As illustrated in FIG. 14(c), the direction of current flow in the circuit R6 is opposite to the direction of current flow in the circuit R1, on an electric path Z3 between the third connection point 18 and a high voltage-side connection point 18b between S4 (34) and D4 (38), and on an electric path Z4 between the reference electric path 11 and a low voltage-side connection point 19a between S4 (34) and D2 (36). For this reason, currents cancel each other out on the electric paths Z3 and Z4 illustrated in FIG. 14(c), and current flowing between the third connection point 18 and the reference electric path 11 is decreased, and thus the magnitude of current flowing via S4 (34) is decreased. In contrast, since S3 (33) is fixed in an on state while S2 (32) is turned off, and S4 (34) is turned on, as illustrated in FIG. 14(a), the circuit R3 (illustrated by the alternate long and short dash line and solid line in FIG. 14(a)), in which current flows [from B1 (20), to L1 (22), S3 (33), B2 (23), L2 (25), D1 (35), the high voltage electric path 12, the reference electric path 11, and B1 (20)], is also formed at the same time, and thus current from the high voltage electric path 12 flows mainly via the circuit R3. Accordingly, current flowing via S4 (34) during a period of time t3 to t4 and a period of time t6 to t7 in FIG. 15 is lower than current flowing via S4 (34) in the basic boost/buck operation of the first voltage converter 10 described with reference to FIGS. 4 and 5 when B1 (20) and B2 (23) are connected in parallel. During this period, S2 (32) is turned off, and thus current does not flow via S2 (32).

As illustrated in FIGS. 15(d) and 15(f), during a period of time t1 to t2, a period of time t4 to t5, and a period of time t7 to t8; that is, during a period (a period illustrated by hatching in FIGS. 15(d) and 15(f)) during which S2 (32) and S4 (34) are turned on at the same time, the circuits R1 and R2 described with reference to FIG. 4 are formed, and the magnitude of current flowing via S2 (32) and S4 (34) is equal to the magnitude of current when L1 (22) and L2 (25) are respectively charged with the electric powers of B1 (20) and B2 (23) at the same time in the basic boost/buck operation mode of the first voltage converter 10 when B1 (20) and B2 (23) are connected in parallel. Accordingly, during these periods, the current flowing via S2 (32) and S4 (34) is not cancelled out, and S2 (32) and S4 (34) are heated by the passing current.

As described above, in the in-parallel boost operation mode, the time, during which current flows via S2 (32) and S2 (32) is heated, is a time (ΔT4−ΔT3) obtained by subtracting the turn-off time ΔT3 of S4 (34) from the turn-on time ΔT4 of S2 (32) as illustrated in FIG. 15(d), or a time (ΔT1−ΔT2) obtained by subtracting the turn-off time ΔT2 of S2 (32) from the turn-on time ΔT1 of S4 (34). As described above, since ΔT4 and ΔT1 are respectively equal to the turn-on times of S2 (32) and S4 (34) required to boost the respective voltages VB1 and VB2 of B1 (20) and B2 (23) to the high voltage VH in the in-parallel connection described with reference to FIGS. 4 and 5, times for heating of S2 (32) and S4 (34) in the in-parallel boost operation mode are respectively considerably shorter than the time ΔT4 for heating of S2 (32) and the time ΔT1 for heating of S4 (34) in the basic boost/buck operation for the in-parallel connection, and as a result, it is possible to effectively prevent an increase in the temperature of S2 (32) and S4 (34).

As illustrated in FIG. 15(e), since S3 (33) is in a turn-on state all the time, and the switching of S3 (33) is not performed, there is no switching loss in S3 (33), and thus it is possible to reduce an increase in the temperature of S3 (33) more than in the basic boost/buck operation mode for the in-parallel connection, which is described with reference to FIGS. 4 and 5.

As illustrated in FIG. 15(c), since S1 (31) is turned on when the electric power of either one of B1 (20) and B2 (23) is output to the high voltage electric path 12, and S1 (31) is turned off when neither B1 (20) nor B2 (23) is output to the high voltage electric path 12 (while L1 (22) and L2 (25) are respectively charged with the electric powers of B1 (20) and B2 (23)), as illustrated in FIG. 15(c), S1 (31) is turned on during a period of time t2 to t4 and a period of time t5 to t7, and is turned off during a period of time t1 to t2, a period of time t4 to t5, and a period of time t7 to t8. As illustrated in FIG. 13(a), in a case where a regenerative electric power is generated by the motor-generator 50, when S2 (32) is turned on, S4 (34) is turned off, B1 (20) is charged with this regenerative electric power via the circuit 7 (illustrated by the dotted line in FIG. 13(a)) in which current flows [from the high voltage electric path 12, to S1 (31), S2 (32), L1 (22), B1 (20), the reference electric path 11, and the high voltage electric path 12], and as illustrated in FIG. 14(a), when S2 (32) is turned off, and S4 (34) is turned on, B2 (23) is charged with this regenerative electric power via the circuit R8 (illustrated by the dotted line in FIG. 14(a)) in which current flows [from the high voltage electric path 12, to S1 (31), L2 (25), B2 (23), S4 (34), the reference electric path 11, and the high voltage electric path 12].

As described above, since the in-parallel boost operation mode can cover the maximum region of the operating point of the motor-generator (MG) 50 on the torque-rotational speed characteristic diagram illustrated in FIG. 6, even if the temperature of either one of S2 (32) and S4 (34) exceeds the predetermined threshold value, it is possible to reduce the times for heating of S2 (32) and S4 (34) without limiting the input/output electric power of B1 (20) and B2 (23) and impairing driveability by switching the operation mode to the in-parallel boost operation mode, and thus, it is possible to prevent the temperature of S2 (32) and S4 (34) from increasing beyond the predetermined operation temperature range. It is possible to reduce an increase in the temperature of S3 (33) more than in the basic boost/buck operation mode for the in-parallel connection described with reference to FIGS. 4 and 5.

<Transition to Single Direct-Connection Operation Mode When Temperature of Third Switching Element Exceeds Predetermined Threshold Value>

Figure 16:
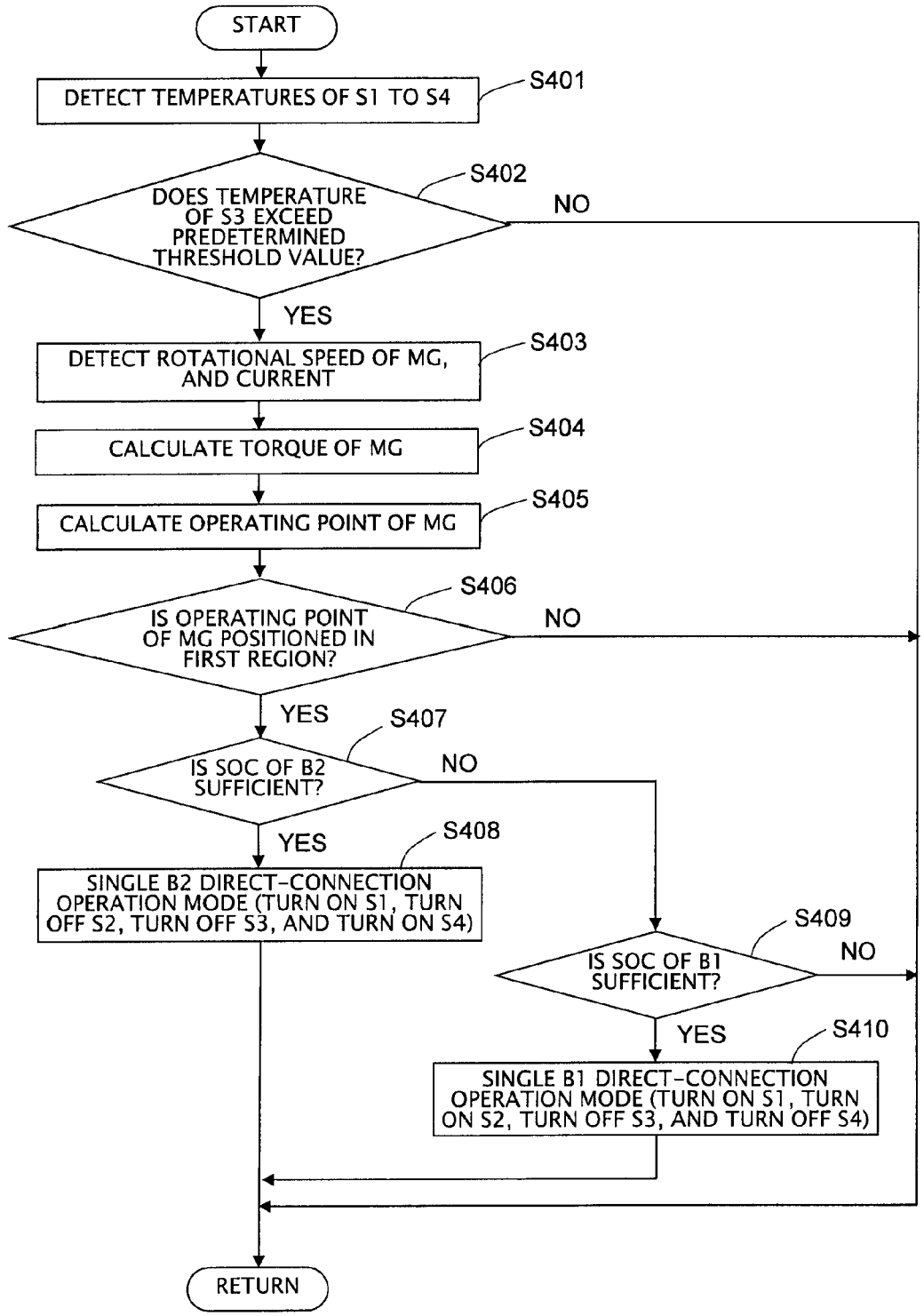
FIG. 16 is a flowchart illustrating transition to a single direct-connection operation mode when the temperature of a third switching element of the control device of the motor-driven vehicle of the present invention, in which the first voltage converter is mounted, exceeds a predetermined threshold value.
Figure 17:
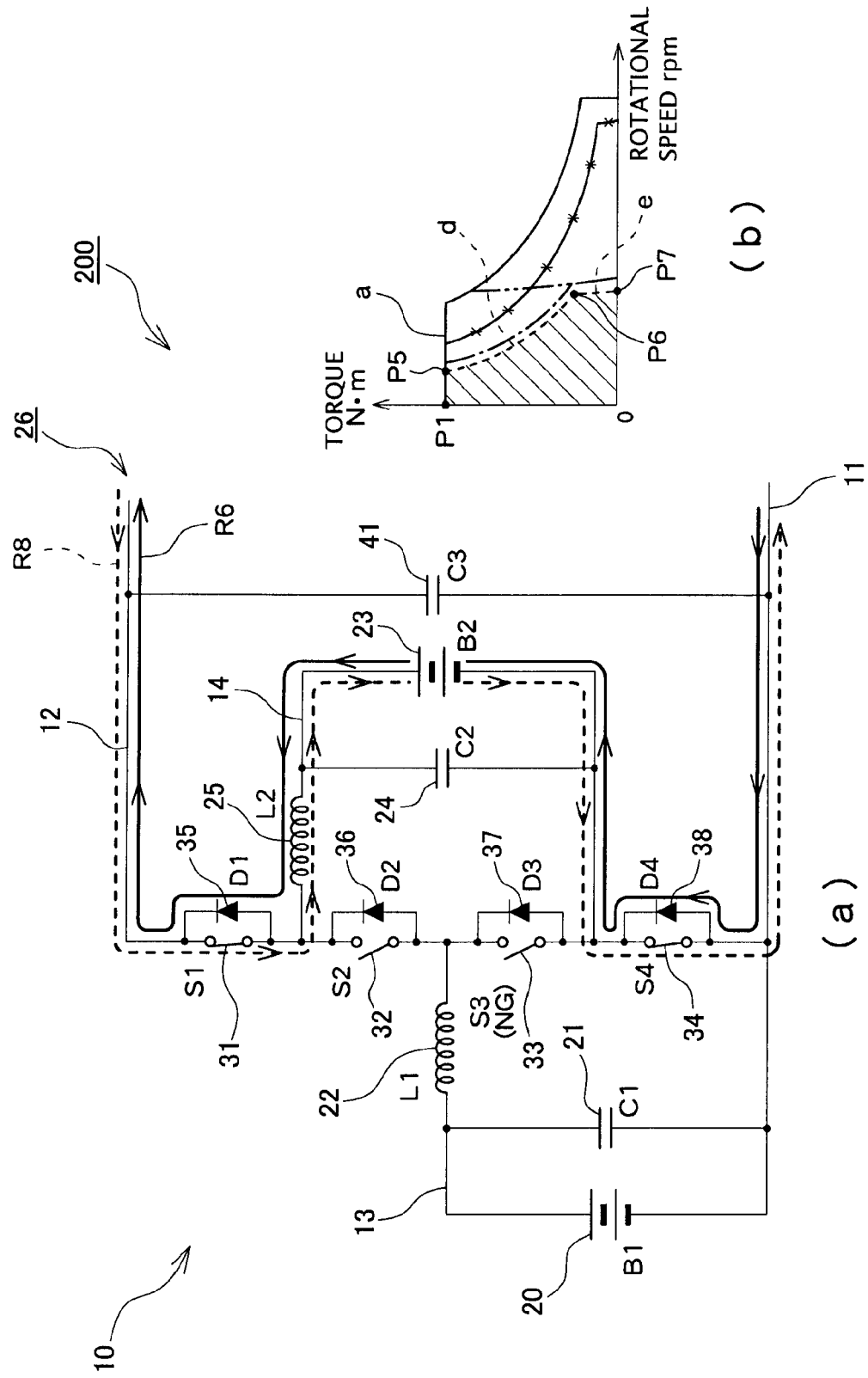
FIG. 17 is a diagram illustrating the flow of current in the single direct-connection operation mode in which the second battery is used, when the temperature of the third switching element of the first voltage converter mounted in the motor-driven vehicle of the present invention exceeds the predetermined threshold value.
Figure 18:
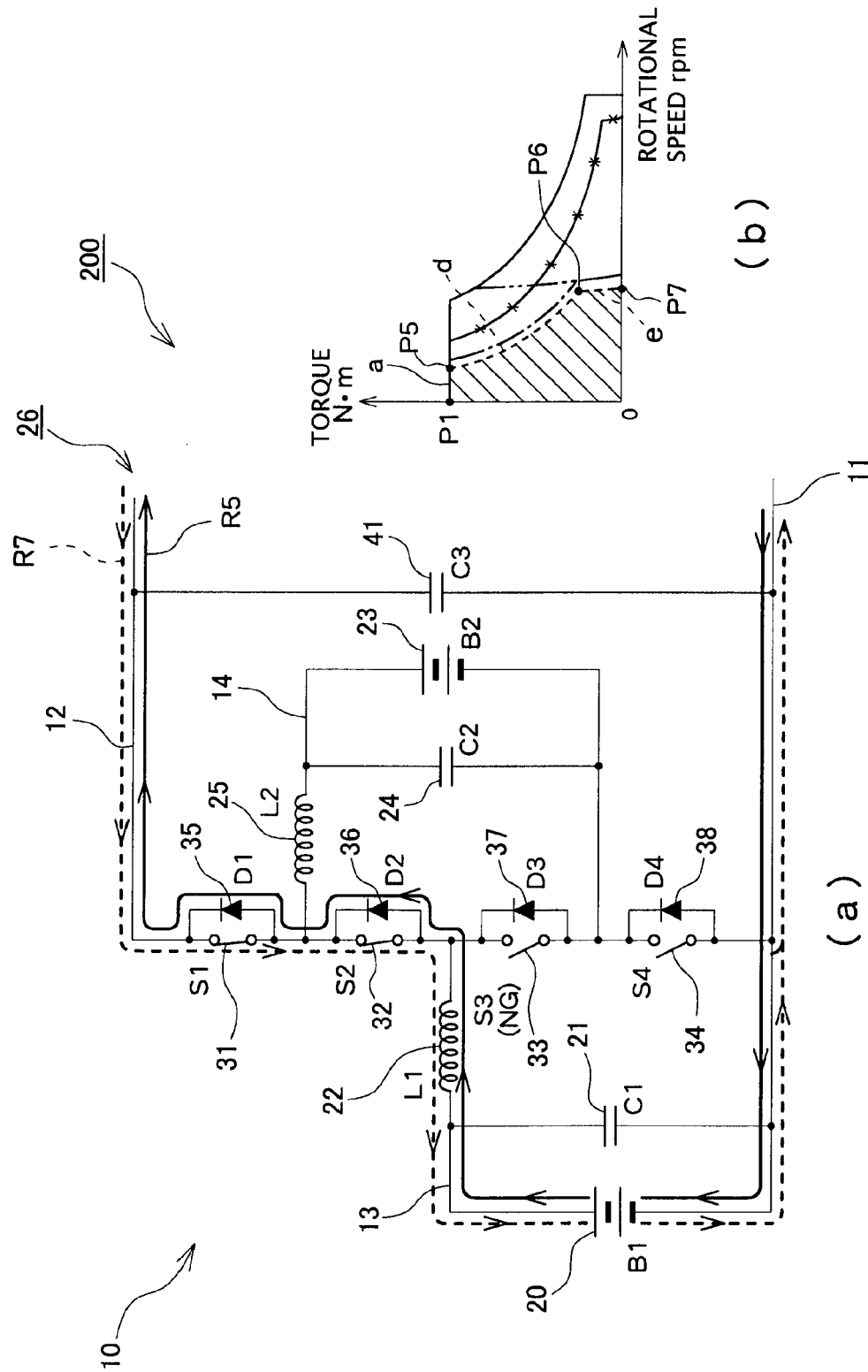
FIG. 18 is a diagram illustrating the flow of current in the single direct-connection operation mode in which the first battery is used, when the temperature of the third switching element of the first voltage converter mounted in the motor-driven vehicle of the present invention exceeds the predetermined threshold value.

As illustrated in step S401 in FIG. 16, the control device 100 detects the respective temperatures TS1 to TS4 of S1 (31) to S4 (34), and as illustrated in step S402 in FIG. 16, the control device 100 determines whether the temperature TS3 of S3 (33) exceeds the predetermined threshold value. When the control device 100 determines that the temperature TS3 of S3 (33) exceeds the predetermined threshold value (YES in step S402 in FIG. 16), similar to the description given with reference to FIG. 7, in steps S403 to 5405 in FIG. 16, the control device 100 detects the rotational speed of the motor-generator (MG) 50, and U-, V-, and W-phase currents using the respective sensors, and calculates the torque of the motor-generator (MG) 50, and the position of the operating point of the motor-generator 50 on the torque-rotational speed characteristic diagram illustrated in FIG. 6, and the process proceeds to step S406 in FIG. 16. In contrast, when in step S402 in FIG. 16 the temperature TS3 of S3 (33) does not exceed the predetermined threshold value, the control device 100 ends a program without allowing the first voltage converter 10 to make the transition to the single battery direct-connection operation mode.

As illustrated in step S406 in FIG. 16, the control device 100 determines whether the operating point of the motor-generator 50 is positioned in the first region (the hatched region illustrated in FIGS. 17(b) and 18(b)) on the torque-rotational speed characteristic diagram illustrated in FIG. 6. When the control device 100 determines that the operating point of the motor-generator 50 is positioned in the first region, the process proceeds to step S407 in FIG. 16, and the control device 100 determines whether the state of charge (SOC) of B2 (23) required to be able to travel a predetermined distance is a predetermined value or greater. In contrast, when in step S406 in FIG. 16 the control device 100 determines that the operating point of the motor-generator 50 is not positioned in the first region (is positioned outside the first region), the control device 100 determines that it may not be able to drive the motor-generator 50 when either of the batteries B1 (20) and B2 (23) is directly connected to the motor-generator 50, and the control device 100 ends the program without allowing the first voltage converter 10 to make the transition to the single battery direct-connection operation mode.

When the control device 100 determines that the state of charge (SOC) of B2 (23) is sufficient, the process proceeds to step S408 in FIG. 16, and the control device 100 allows the first voltage converter 10 to make the transition to the single battery direct-connection operation mode in which B2 (23) is used, S1 (31) and S4 (34) are turned on, and S2 (32) and S3 (33) are turned off.

In contrast, when in step S407 in FIG. 16 the control device 100 determines that the state of charge (SOC) of B2 (23) is not sufficient, the control device 100 determines that the motor-driven vehicle 200 cannot travel a sufficient distance when the control device 100 allows the first voltage converter 10 to make the transition to the single battery direct-connection operation mode in which B2 (23) is used, the process proceeds to step S409 in FIG. 16, and the control device 100 determines whether the state of charge (SOC) of B1 (20) is sufficient. When the control device 100 determines that the state of charge (SOC) of B1 (20) is sufficient, the process proceeds to step S410 in FIG. 16, and the control device 100 allows the first voltage converter 10 to make the transition to the single battery direct-connection operation mode in which B1 (20) is used, S1 (31) and S2 (32) are turned on, and S3 (33) and S4 (34) are turned off. In contrast, when the control device 100 determines that the state of charge (SOC) of B1 (20) is not sufficient, the control device 100 determines that the motor-driven vehicle 200 cannot travel a sufficient distance in the single battery direct-connection operation mode in which either of the batteries B1 (20) and B2 (23) is used, and the control device 100 ends the program without allowing the first voltage converter 10 to make the transition to the single battery direct-connection operation mode.

When the temperature TS3 of S3 (33) exceeds the predetermined threshold value, FIG. 17(a) illustrates the flow of current in the single battery direct-connection operation mode in which B2 (23) is used, and FIG. 18(a) illustrates the flow of current in the single battery direct-connection operation mode in which B1 (20) is used. The flow of current in each case is identical to that in the single battery direct-connection operation mode when either one of the respective temperatures TS2 and TS4 of S2 (32) and S4 (34) exceeds the predetermined threshold value, which is described with reference to FIGS. 8(a) and 9(a), and there are differences in the points that the temperature TS2 of S2 (32) exceeds the predetermined threshold value in FIG. 8(a), and the temperature TS4 of S4 (34) exceeds the predetermined threshold value in FIG. 9(a), and in contrast, the temperature TS3 of S3 (33) exceeds the predetermined threshold value in FIG. 17(a) and FIG. 18(a). Therefore, a description will be omitted. In this operation mode, even if the temperature of S3 (33) exceeds the predetermined threshold value, it is possible to restrict the flow of current to S3 (33) to zero without limiting the input/output electric power of B1 (20) and B2 (23) and impairing driveability, and thus, it is possible to prevent the temperature of S3 (33) from increasing beyond the predetermined operation temperature range.

<Transition to In-Parallel Direct-Connection Operation Mode When Temperature of Third Switching Element Exceeds Predetermined Threshold Value>

Figure 19:
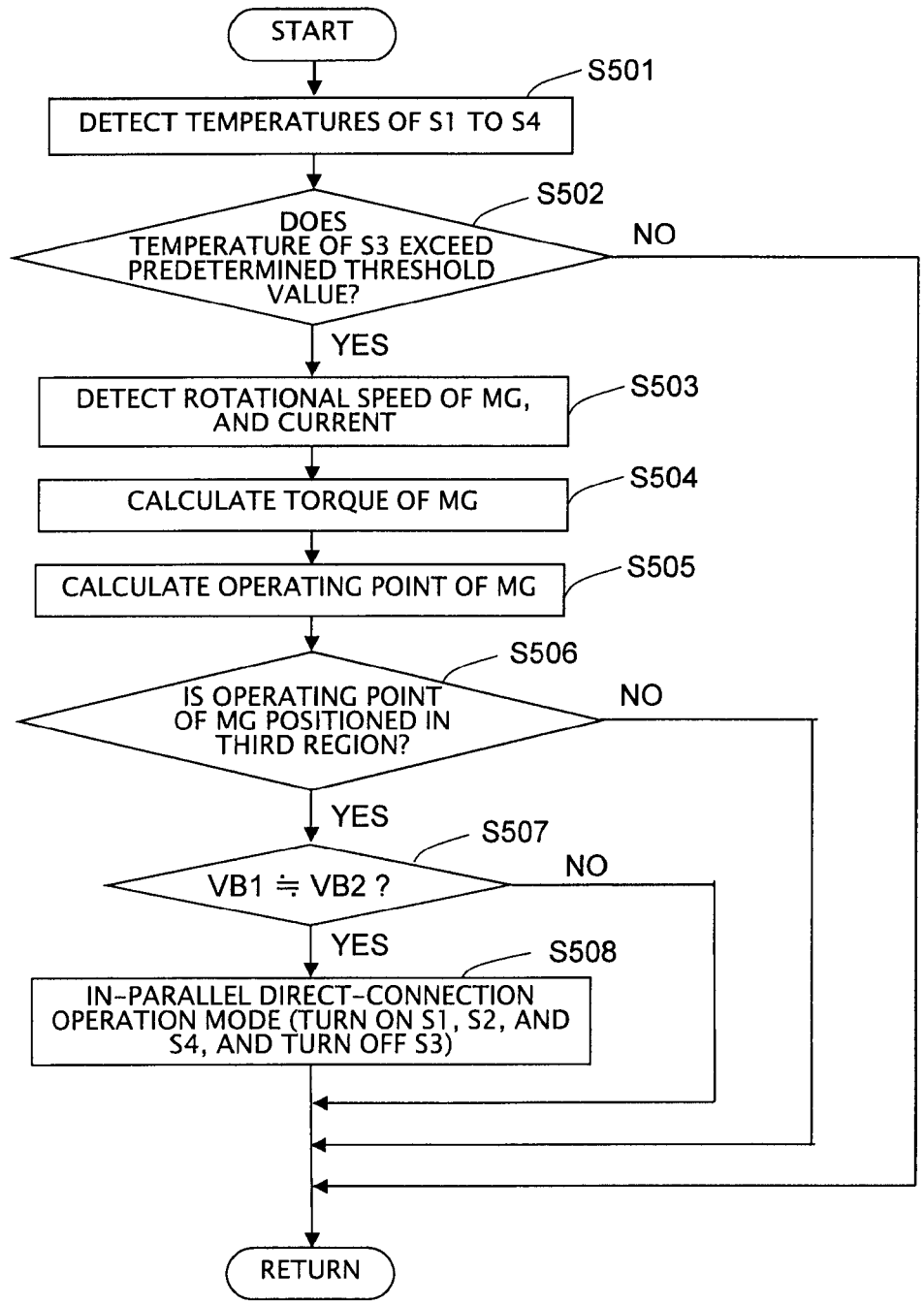
FIG. 19 is a flowchart illustrating transition to an in-parallel direct-connection operation mode when the temperature of the third switching element of the control device of the motor-driven vehicle of the present invention, in which the first voltage converter is mounted, exceeds the predetermined threshold value.

As illustrated in step S501 in FIG. 19, the control device 100 detects the respective temperatures TS1 to TS4 of S1 (31) to S4 (34), and as illustrated in step S502 in FIG. 19 the control device 100 determines whether the temperature TS3 of S3 (33) exceeds the predetermined threshold value. When the control device 100 determines that the temperature TS3 of S3 (33) exceeds the predetermined threshold value (YES in step S502 in FIG. 19), similar to the description given with reference to FIG. 7, in steps S503 to S505 in FIG. 19, the control device 100 detects the rotational speed of the motor-generator (MG) 50, and U-, V-, and W-phase currents using the respective sensors, and calculates the torque of the motor-generator (MG) 50, and the position of the operating point of the motor-generator 50 on the torque-rotational speed characteristic diagram illustrated in FIG. 6, and the process proceeds to step S506 in FIG. 19. In contrast, when the temperature TS3 of S3 (33) does not exceed the predetermined threshold value in step S502 in FIG. 19, the control device 100 ends a program without allowing the first voltage converter 10 to make the transition to the single battery direct-connection operation mode.

As illustrated in step S506 in FIG. 19, the control device 100 determines whether the operating point of the motor-generator 50 is positioned in the third region (the hatched region illustrated in FIG. 20(b)) on the torque-rotational speed characteristic diagram illustrated in FIG. 6. When the control device 100 determines that the operating point of the motor-generator 50 is positioned in the third region, the process proceeds to step S507 in FIG. 19. In contrast, when in step S506 in FIG. 19 the control device 100 determines that the operating point of the motor-generator 50 is not positioned in the third region (is positioned outside the third region), the control device 100 determines that it may not be able to drive the motor-generator 50 when B1 (20) and B2 (23) are directly connected in parallel to the motor-generator 50, and the control device 100 ends the program without allowing the first voltage converter 10 to make the transition to the in-parallel direct-connection operation mode.

After the process proceeds to step S507 in FIG. 19, the control device 100 determines whether the voltage VB1 of B1 (20) is substantially equal to the voltage VB2 of B2 (23). When the control device 100 determines that the voltage VB1 of B1 (20) is substantially equal to the voltage VB2 of B2 (23), the process proceeds to step S508 in FIG. 19, and the control device 100 allows the first voltage converter 10 to make the transition to the in-parallel direct-connection operation mode in which S1 (31), S2 (32), and S4 (34) are turned on, and S3 (33) is turned off. In contrast, when the control device 100 determines that the voltage VB1 of B1 (20) is not substantially equal to the voltage VB2 of B2 (23), the control device 100 determines that the first voltage converter 10 cannot make the transition to the in-parallel direct-connection operation mode, and ends the program without allowing the first voltage converter 10 to make the transition to the in-parallel direct-connection operation mode.

Figure 20:
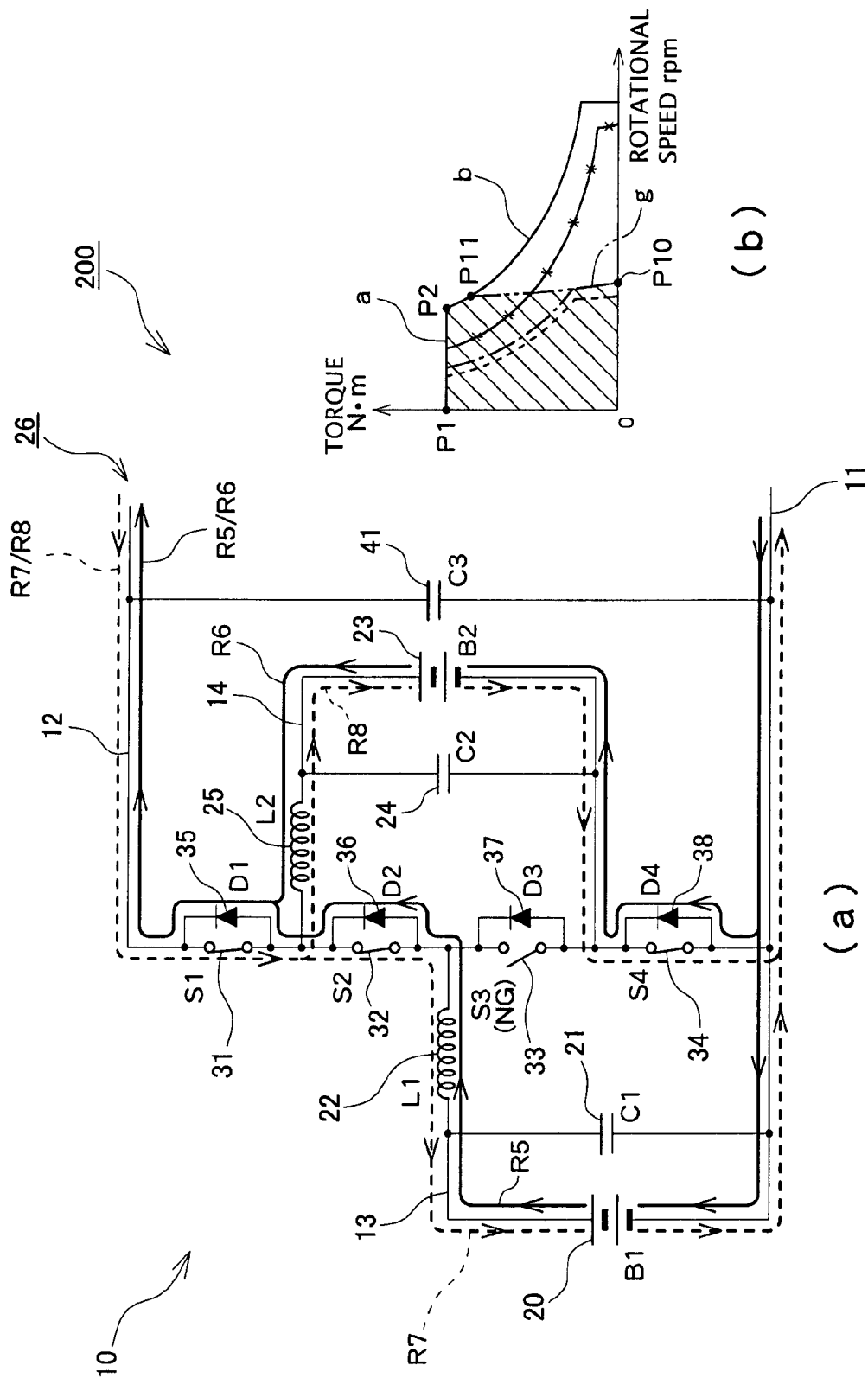
FIG. 20 is a diagram illustrating the flow of current in the in-parallel direct-connection operation mode when the temperature of the third switching element of the first voltage converter mounted in the motor-driven vehicle of the present invention exceeds the predetermined threshold value.

As illustrated in FIG. 20(*a*), in the in-parallel direct-connection operation mode, the circuit R5 (illustrated by a solid line in FIG. 20(*a*)) in which current flows [from B1 (20), to L1 (22), D2 (36), D1 (35), the high voltage electric path 12, the reference electric path 11, and B1 (20)], and the circuit R6 (illustrated by a solid line in FIG. 20(*a*)), in which current flows [from B2 (23), to L2 (25), D1 (35), the high voltage electric path 12, the reference electric path 11, D4 (38), and B2 (23)], is formed. The electric powers of B1 (20) and B2 (23) are output to the electric power output path 26 via the respective circuits R5 and R6. B1 (20) is charged with the regenerative electric power of the motor-generator 50 via the circuit R7 (illustrated by a dotted line in FIG. 20(*a*)) in which current flows [from the high voltage electric path 12, to S1 (31), S2 (32), L1 (22), B1 (20), the reference electric path 11, and the high voltage electric path 12]. B2 (23) is charged with the regenerative electric power of the motor-generator 50 via the circuit R8 (illustrated by a dotted line in FIG. 20(*a*)) in which current flows [from the high voltage electric path 12, to S1 (31), L2 (25), B2 (23), S4 (34), the reference electric path 11, and the high voltage electric path 12]. Since the motor-generator 50 of the motor-driven vehicle 200 is operated in the third region (the third power output region of the motor-generator 50) in which the motor-driven vehicle 200 can travel with the voltage VB1 of B1 (20) (substantially equal to the voltage VB2 of B2 (23)) and the outputable current of B1 (20) and B2 (23), even if the temperature of S3 (33) exceeds the predetermined threshold value, it is possible to restrict the flow of current to S3 (33) (having a temperature exceeding the predetermined threshold value) to zero without limiting the input/output electric power of B1 (20) and B2 (23) and impairing driveability by switching the operation mode to the in-parallel direct-connection operation mode, and thus, it is possible to prevent the temperature of S3 (33) from increasing beyond the predetermined operation temperature range.

<Transition to In-Parallel Boost Operation Mode When Temperature of Third Switching Element Exceeds Threshold Value>

Figure 21:
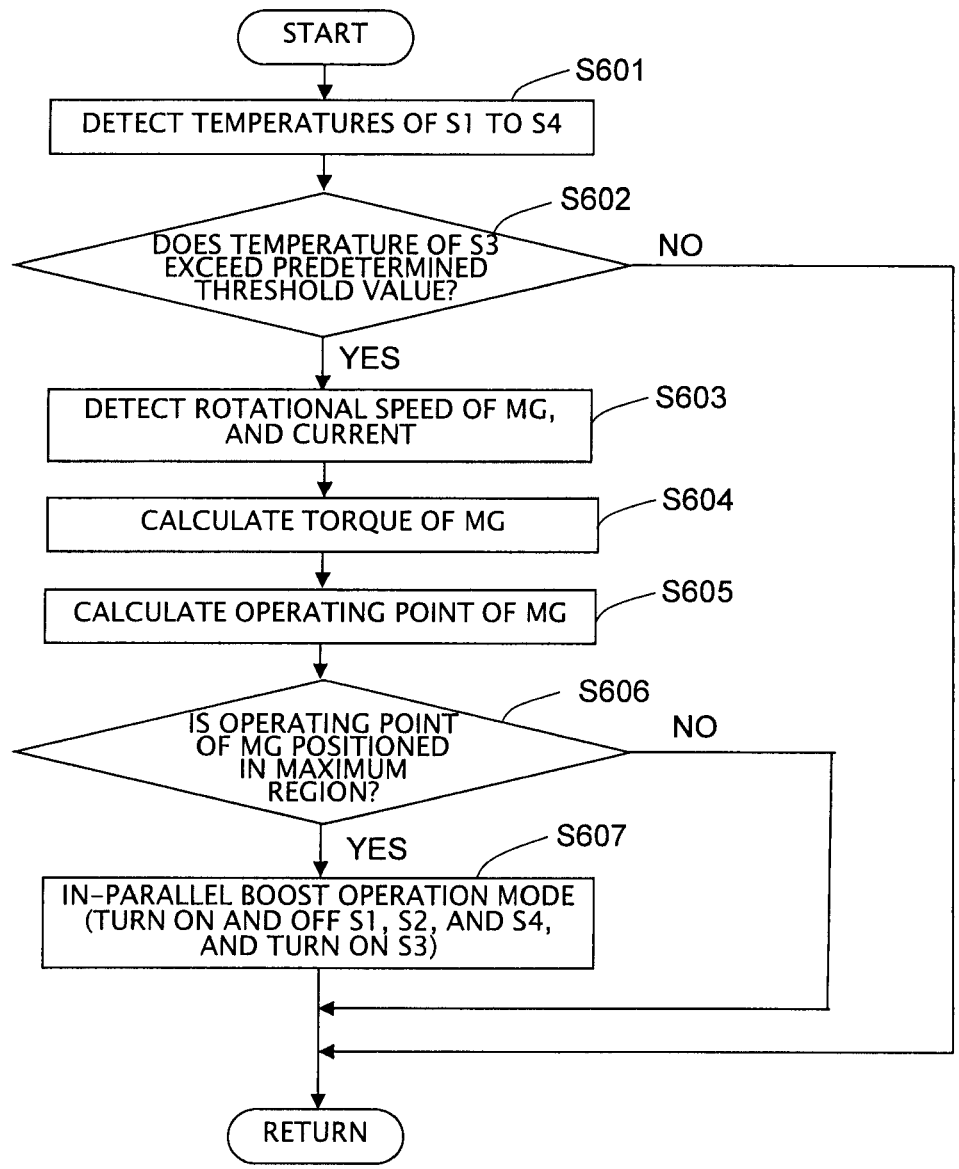
FIG. 21 is a flowchart illustrating transition to an in-parallel boost operation mode when the temperature of the third switching element of the control device of the motor-driven vehicle of the present invention, in which the first voltage converter is mounted, exceeds the predetermined threshold value.

As illustrated in step S601 in FIG. 21, the control device 100 detects the respective temperatures TS1 to TS4 of S1 (31) to S4 (34) using the respective temperature sensors 81 to 84 illustrated in FIG. 1. Subsequently, as illustrated in step S602 in FIG. 21 the control device 100 determines whether the temperature TS3 of S3 (33) exceeds the predetermined threshold value, and when the control device 100 determines that the temperature TS3 of S3 (33) exceeds the predetermined threshold value in step S602 in FIG. 21 (YES in step S602 in FIG. 21), similar to the description given with reference to FIG. 7, in steps S603 to S605 in FIG. 21, the control device 100 detects the rotational speed of the motor-generator (MG) 50, and a V-phase current and a W-phase current using the respective sensors, and calculates the torque of the motor-generator (MG) 50, and the position of the operating point of the motor-generator 50, and the process proceeds to step S606 in FIG. 21.

Figure 13:
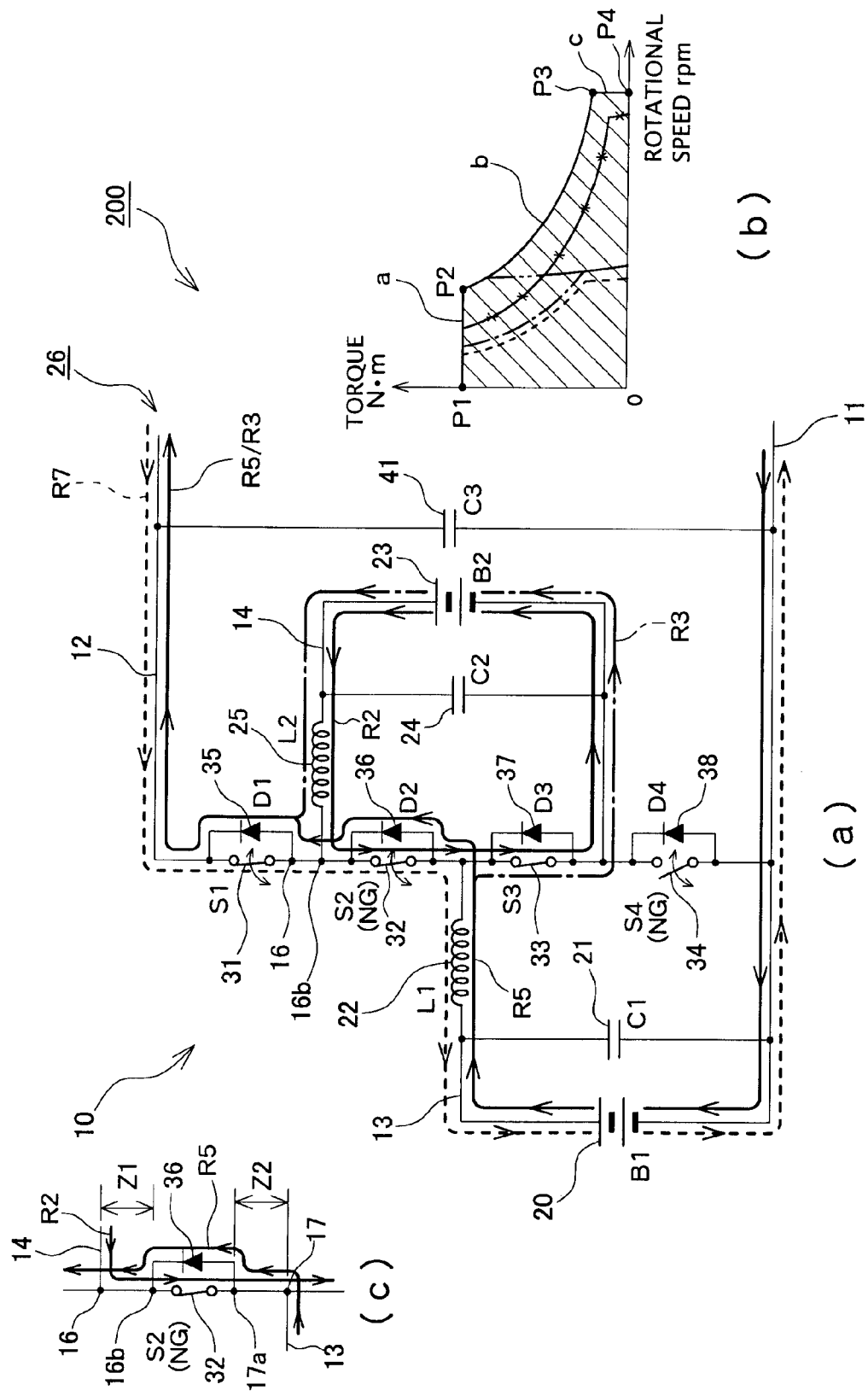
FIG. 13 is a diagram (1) illustrating the flow of current in the in-parallel boost operation mode when the temperature of the second or fourth switching element of the first voltage converter mounted in the motor-driven vehicle of the present invention exceeds the predetermined threshold value.

As illustrated in step S606 in FIG. 21, the control device 100 determines whether the operating point of the motor-generator 50 is positioned in the maximum region (the region surrounded by the maximum torque line a, the maximum equi-power output line b, and the limit rotational speed line c illustrated in FIG. 6, that is, the hatched region illustrated in FIGS. 13(*b*) and 14(*b*)) on the torque-rotational speed characteristic diagram illustrated in FIG. 6. When the control device 100 determines that the operating point of the motor-generator 50 is positioned in the maximum region, the process proceeds to step S607 in FIG. 21, and as illustrated in FIGS. 13(*a*) and 14(*a*), the control device 100 allows the first voltage converter 10 to make the transition to an in-parallel boost operation mode in which S3 (33) is turned on, and S1 (31), S2 (32), and S4 (34) are turned off. As described with reference to FIG. 15, since the switching of S3 (33) is not performed in this operation mode, it is possible to reduce an increase in the temperature of S3 (33) more than in the basic boost/buck operation mode for the in-parallel connection, which is described with reference to FIGS. 4 and 5.

When the temperature TS3 of S3 (33) does not exceed the predetermined threshold value in step S602 in FIG. 21, or when the control device 100 determines that the operating point of the motor-generator 50 is not positioned in the maximum region in step S606 in FIG. 21, the control device 100 ends a program without allowing the first voltage converter 10 to make the transition to the in-parallel boost operation mode.

<Transition to Single Direct-Connection Operation Mode in Which Second Battery is Used When Temperature of Second or Third Switching Element Exceeds Predetermined Threshold Value>

Figure 22:
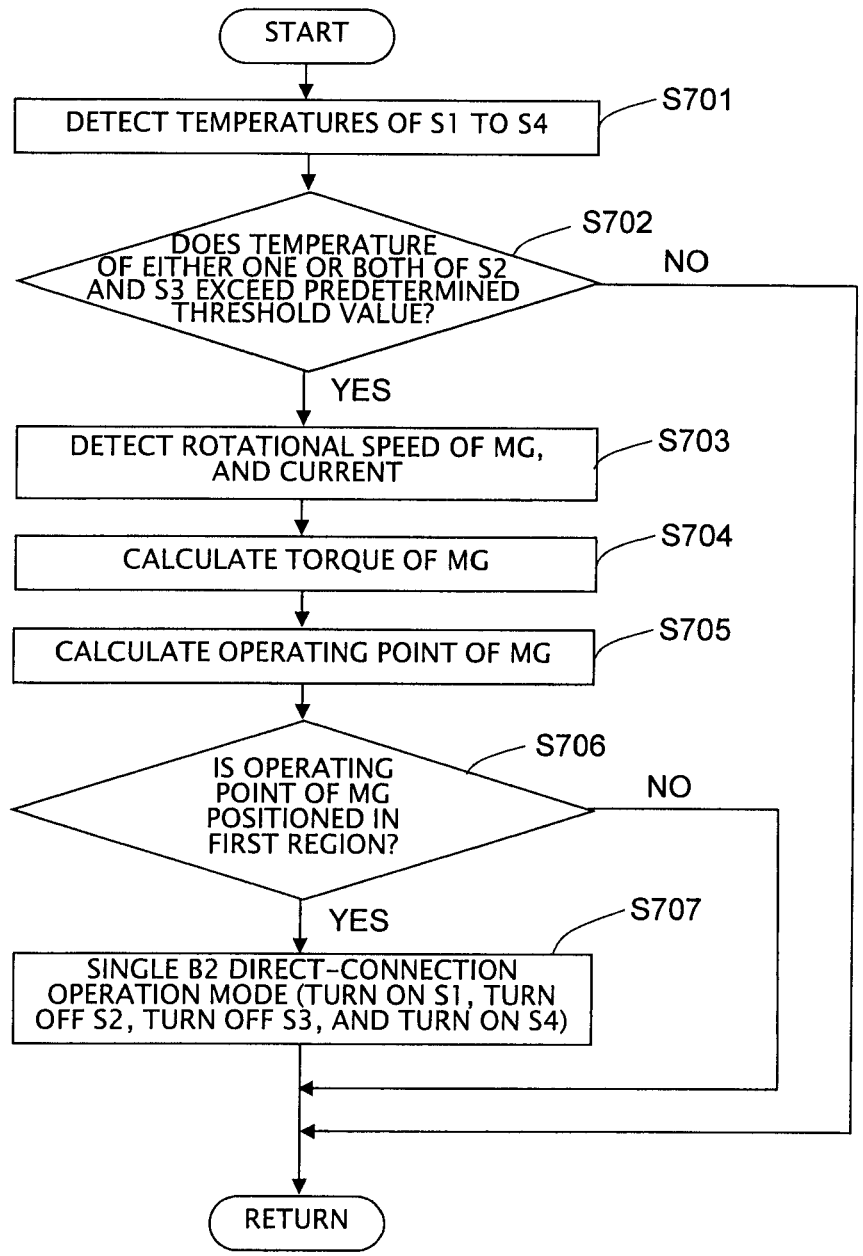
FIG. 22 is a flowchart illustrating transition to the single direct-connection operation mode in which the second battery is used, when the temperature of the second or third switching element of the control device of the motor-driven vehicle of the present invention, in which the first voltage converter is mounted, exceeds the predetermined threshold value.

When either one or both of the respective temperatures TS2 and TS3 of S2 (32) and S3 (33) exceeds the predetermined threshold value as illustrated in step S702 in FIG. 22, and the operating point of the motor-generator 50 is positioned in the first region as illustrated in step S706 in FIG. 22, the control device 100 allows the first voltage converter 10 to make the transition to the single battery direct-connection operation mode in which B2 (23) is used, S1 (31) and S4 (34) are turned on, and S2 (32) and S3 (33) are turned off as illustrated in step S707 in FIG. 22. The flow of current in the single battery direct-connection operation mode in which B2 (23) is used is identical to that illustrated in FIGS. 8(*a*) and 17(*a*). In this operation mode, the flow of current to S2 (32) and S3 (33) is restricted to zero, and thus it is possible to prevent the temperature of S2 (32) and S3 (33) from increasing beyond the predetermined operation temperature range.

<Transition to Single Direct-Connection Operation Mode in Which First Battery is Used When Temperature of Third or Fourth Switching Element Exceeds Predetermined Threshold Value>

Figure 23:
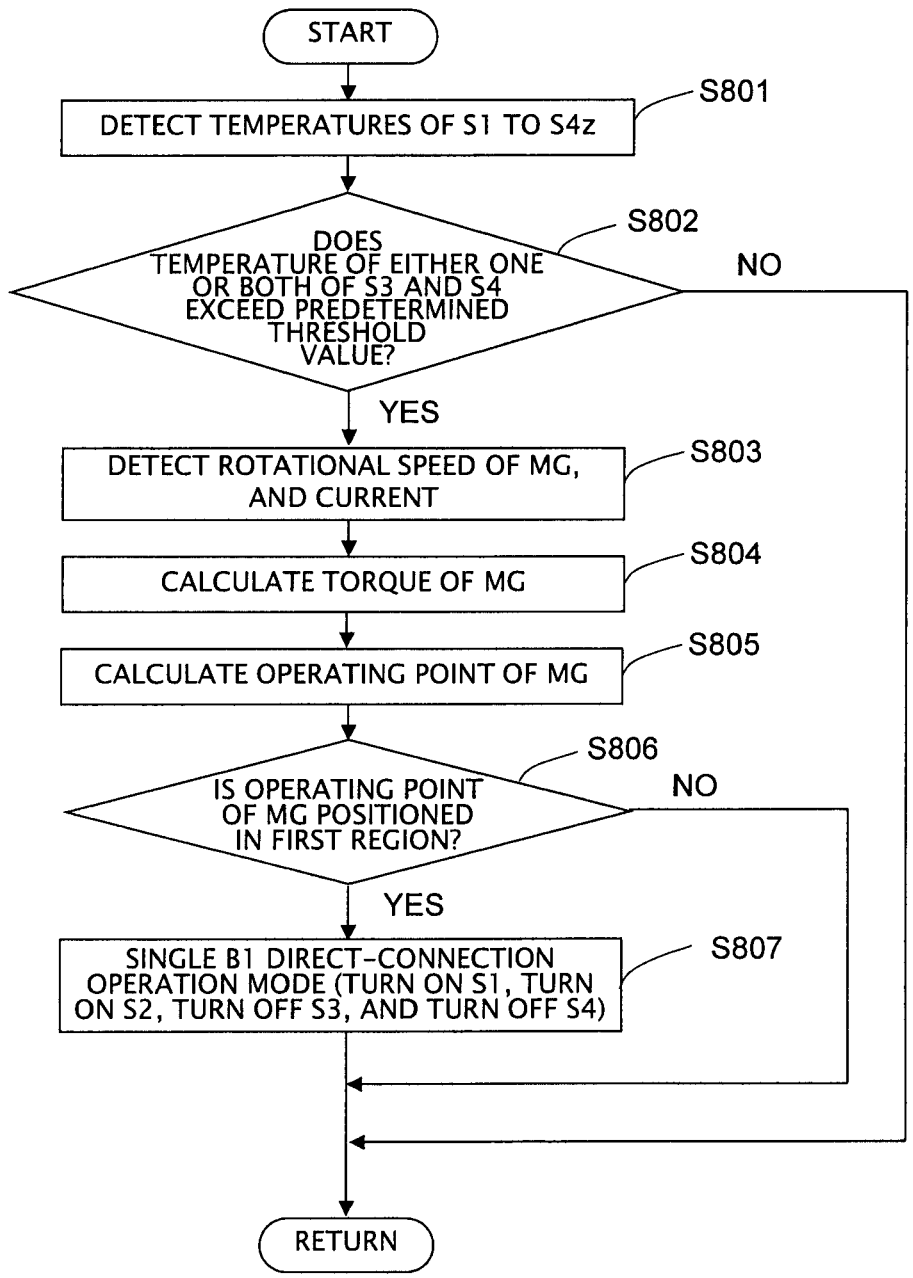
FIG. 23 is a flowchart illustrating transition to the single direct-connection operation mode in which the first battery is used, when the temperature of the third or fourth switching element of the control device of the motor-driven vehicle of the present invention, in which the first voltage converter is mounted, exceeds the predetermined threshold value.

When either one or both of the respective temperatures TS3 and TS4 of S3 (33) and S4 (34) exceeds the predetermined threshold value as illustrated in step S802 in FIG. 23, and the operating point of the motor-generator 50 is positioned in the first region as illustrated in step S806 in FIG. 23, the control device 100 allows the first voltage converter 10 to make the transition to the single battery direct-connection operation mode in which B1 (20) is used, S1 (31) and S2 (32) are turned on, and S3 (33) and S4 (34) are turned off as illustrated in step S807 in FIG. 23. The flow of current in the single battery direct-connection operation mode in which B1 (20) is used is identical to that illustrated in FIGS. 9(a) and 18(a). In this operation mode, the flow of current to S3 (33) and S4 (34) is restricted to zero, and thus it is possible to prevent the temperature of S3 (33) and S4 (34) from increasing beyond the predetermined operation temperature range.

<Transition to Each Operation Mode When Temperature of Second Switching Element Exceeds Predetermined Threshold Value>

Various operation modes, to which the first voltage converter 10 can make the transition when the temperature of each of S1 (31) to S4 (34) exceeds the predetermined threshold value, have been described up to this point, and hereinafter, thre wil be described an operation mode to which the first voltage converter 10 makes the transition taking the operating point of the motor-generator 50 and the state of charge (SOC) of B1 (20) and B2 (23) when the temperature of S2 (32) exceeds the predetermined threshold value.

Figure 24:
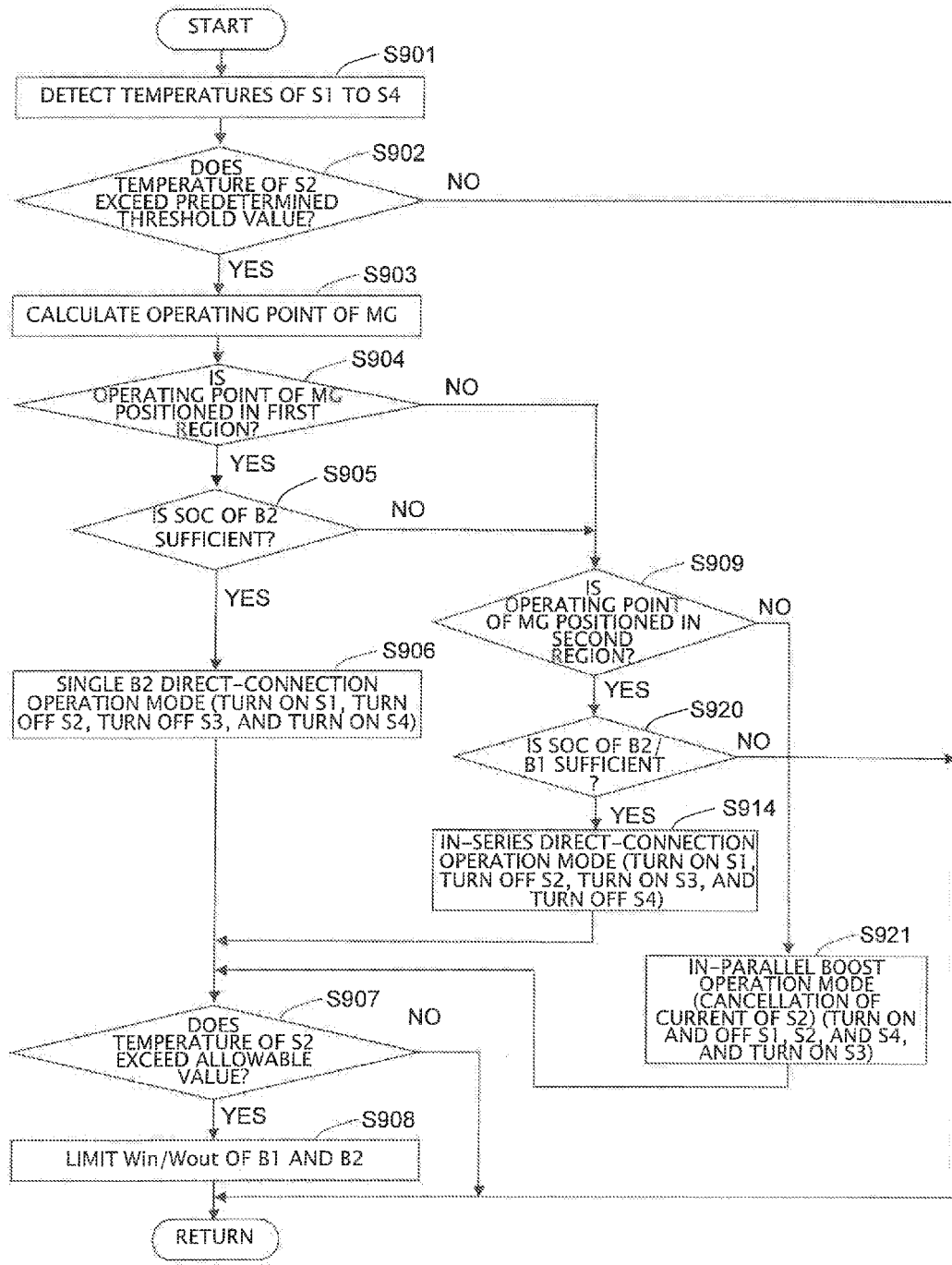
FIG. 24 is a flowchart illustrating transition to each operation mode when the temperature of the second switching element of the control device of the motor-driven vehicle of the present invention, in which the first voltage converter is mounted, exceeds the predetermined threshold value.

As illustrated in step S901 in FIG. 24, the control device 100 detects the respective temperatures TS1 to TS4 of S1 (31) to S4 (34) using the respective temperature sensors, and when the temperature of S2 (32) exceeds the predetermined threshold value as illustrated in step S902 in FIG. 24, the process proceeds to step S903 in FIG. 24, and the control device 100 calculates the operating point of the motor-generator 50. The operating point of the motor-generator 50 is calculated in the same manner as described in steps S103 to S105 in FIG. 7.

When in step S904 in FIG. 24 the control device 100 determines that the operating point of the motor-generator 50 is positioned in the first region, the process proceeds to step S905 in FIG. 24, and the control device 100 determines whether the state of charge (SOC) of B2 (23) is sufficient. When the control device 100 determines that the state of charge (SOC) of B2 (23) is sufficient, the process proceeds to step S906 in FIG. 24, and as described with reference to FIG. 8, the control device 100 allows the first voltage converter 10 to make the transition to the single battery direct-connection operation mode in which B2 (23) is used, S1 (31) and S4 (34) are turned on, and S2 (32) and S3 (33) are turned off. The control device 100 operates the motor-driven vehicle 200 in this state, and when the control device 100 determines that the temperature of S2 (32) exceeds an allowable value (allowable operation temperature) greater than the aforementioned threshold value as illustrated in step S907 in FIG. 24, the process proceeds to step S908 in FIG. 24, and the control device 100 limits the input/output electric power of B1 (20) and B2 (23).

When the control device 100 determines that the operating point of the motor-generator 50 is not positioned in the first region in step S904 in FIG. 24 (NO in step S904 in FIG. 24), or when the control device 100 determines that the state of charge (SOC) of B2 (23) is not sufficient in step S905 in FIG. 24 (NO in step S905 in FIG. 24), the process proceeds to step S909 in FIG. 24, and the control device 100 determines whether the operating point of the motor-generator 50 is positioned in the second region. When the control device 100 determines that the operating point of the motor-generator 50 is positioned in the second region (YES in step S909 in FIG. 24), the process proceeds to step S920 in FIG. 24, and the control device determines whether the state of charge (SOC) of B1 (20) and B2 (23) is sufficient. When the control device determines that the state of charge (SOC) of B1 (20) and B2 (23) is sufficient (YES in step S920 in FIG. 24), the process proceeds to step S914 in FIG. 24, and as described with reference to FIG. 11, the control device 100 allows the first voltage converter 10 to make the transition to the in-series direct-connection operation mode in which S1 (31) and S3 (33) are turned on, and S2 (32) and S4 (34) are turned off. The control device 100 operates the motor-driven vehicle 200 in this state, and when the control device 100 determines that the temperature of S2 (32) exceeds the allowable value (allowable operation temperature) greater than the aforementioned threshold value as illustrated in step S907 in FIG. 24, the process proceeds to step S908 in FIG. 24, and the control device 100 limits the input/output electric power of B1 (20) and B2 (23).

Figure 14:
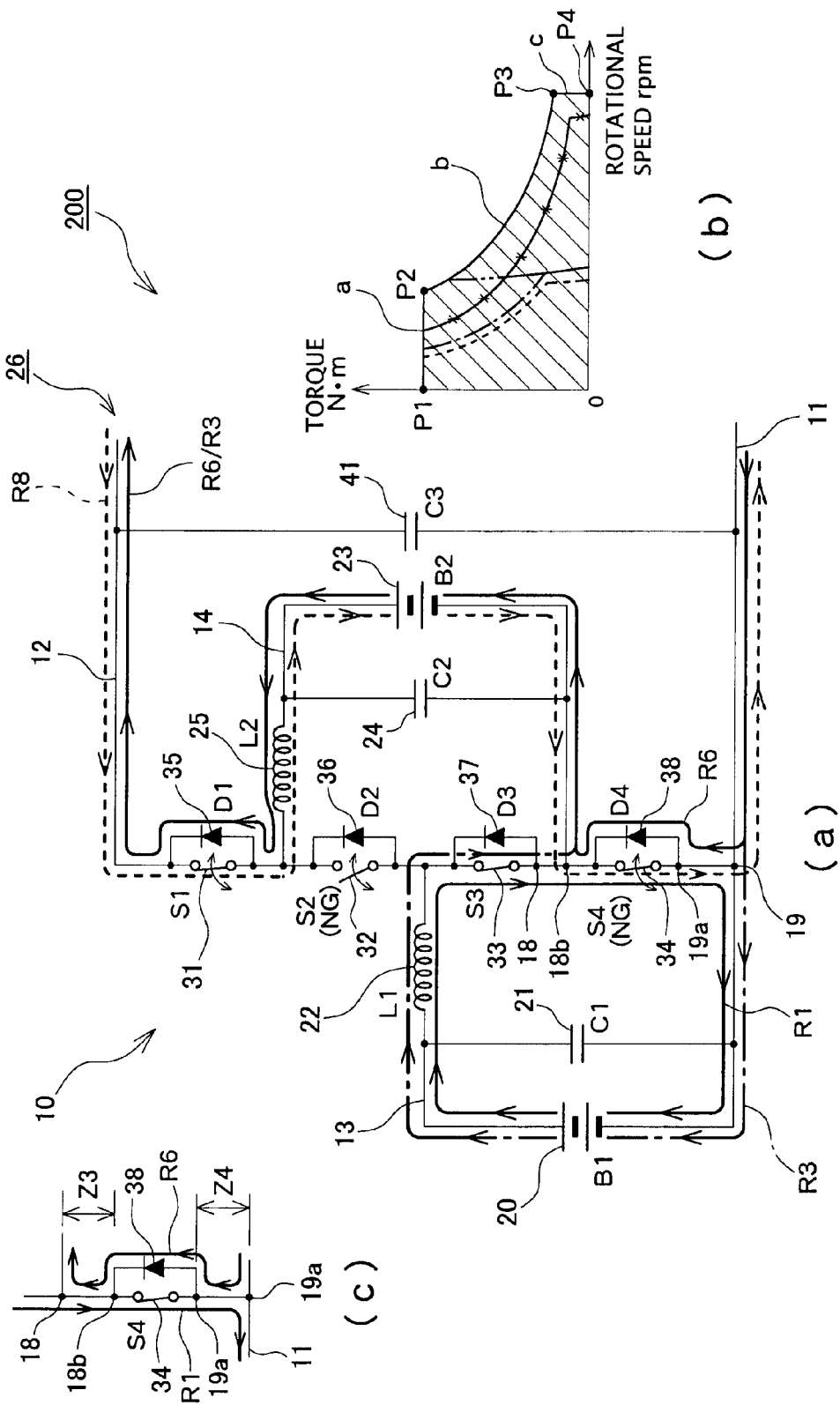
FIG. 14 is a diagram (2) illustrating the flow of current in the in-parallel boost operation mode when the temperature of the second or fourth switching element of the first voltage converter mounted in the motor-driven vehicle of the present invention exceeds the predetermined threshold value.

When in step S909 in FIG. 24 the control device 100 determines that the operating point of the motor-generator 50 is not positioned insie the second region (NO in step S909 in FIG. 24), or when in step S920 in FIG. 24 the control device 100 determines that the state of charge (SOC) of B1 (20) and B2 (23) is not sufficient (NO in step S920 in FIG. 24), the process proceeds to step S921 in FIG. 24, and as described with reference to FIGS. 13 to 15, the control device 100 allows the first voltage converter 10 to make the transition to the in-parallel boost operation mode in which S3 (33) is turned on, and S1 (31), S2 (32), and S4 (34) are turned on and off in such a manner that the current flowing via S2 (32) is cancelled out. The control device 100 operates the motor-driven vehicle 200 in this state, and when the control device 100 determines that the temperature of S2 (32) exceeds the allowable value (allowable operation temperature) greater than the aforementioned threshold value as illustrated in step S907 in FIG. 24, the process proceeds to step S908 in FIG. 24, and the control device 100 limits the input/output electric power of B1 (20) and B2 (23).

When in step S902 in FIG. 24*the* control device 100 determines that the temperature TS2 of S2 (32) does not exceed the predetermined threshold value, the control device ends the execution of a program. When the control device 100 determines that the temperature of S2 (32) does not exceed the allowable value in step S907 in FIG. 24, the control device ends the execution of the program without limiting the input/output electric power of B1 (20) and B2 (23).

In the aforementioned example, in step S904 in FIG. 24 the control device 100 determines whether the operating point of the motor-generator 50 is positioned in the first region. In this case, for example, in a case where the accelerator pedal 55 is depressed when the operating point of the motor-generator 50 is positioned in the vicinity of the equi-power output line d of B2 or in the vicinity of the limit rotational speed line e of B2, the operating point (output) of the motor-generator 50 may be beyond the first region and move into the second region. When the operating point of the motor-generator 50 moves from the first region to the second region, in the single battery direct-connection operation mode in which B1 (20) is used, it may not be able to deal with a demand load, and driveability may be impaired. For this reason, the control device 100 determines that the operating point of the motor-generator 50 may be beyond the first region when the operating point of the motor-generator 50 calculated in step S903 in FIG. 24 is positioned in the vicinity of the first region, and the control device 100 may determine that step S904 in FIG. 24 yields a NO result, and the process may proceed to step S909 in FIG. 24. The operating point may be determined to be positioned in the vicinity of the first region when the operating point is positioned in a range between the equi-power output line d of B2 and a power output line, the rotational speed and the torque of which are less by 10% than those of the equi-power output line d of B2 (23), or when the operating point is positioned in a range between the limit rotational speed line e of B2 and a rotational speed line, the rotational speed and the torque of which are less by 10% than those of the limit rotational speed line e of B2 (23). Similarly, also when determining whether the operating point of the motor-generator 50 is positioned in the second region in step S909 in FIG. 24, the control device 100 determines that the operating point of the motor-generator 50 may be beyond the second region when the operating point of the motor-generator 50 is positioned in the vicinity of the second region, and the control device 100 determines that step S909 in FIG. 24 yields a NO result, and the process proceeds to step S921 in FIG. 24.

<Transition to Each Operation Mode When Temperature of Third Switching Element Exceeds Predetermined Threshold Value>

Subsequently, there will be described an operation mode, to which the first voltage converter 10 makes the transition taking the operating point of the motor-generator 50 and the state of charge (SOC) of B1 (20) and B2 (23) into consideration when the temperature of S3 (33) exceeds the predetermined threshold value.

As illustrated in step S951 in FIG. 25, the control device 100 detects the respective temperatures TS1 to TS4 of S1 (31) to S4 (34) using the respective temperature sensors, and when the temperature of S3 (33) exceeds the predetermined threshold value as illustrated in step S952 in FIG. 25, the process proceeds to step S953 in FIG. 25, and the control device 100 calculates the operating point of the motor-generator 50. The operating point of the motor-generator 50 is calculated in the same manner as described in steps S103 to S105 in FIG. 7.

When in step S954 in FIG. 25 the control device 100 determines that the operating point of the motor-generator 50 is positioned in the first region, the process proceeds to step S955 in FIG. 25, and the control device 100 determines whether the state of charge (SOC) of B2 (23) is sufficient. When the control device 100 determines that the state of charge (SOC) of B2 (23) is sufficient, the process proceeds to step S956 in FIG. 25, and as described with reference to FIG. 8, the control device 100 allows the first voltage converter 10 to make the transition to the single battery direct-connection operation mode in which B2 (23) is used, S1 (31) and S4 (34) are turned on, and S2 (32) and S3 (33) are turned off. When in step S955 in FIG. 25 the control device 100 determines that the state of charge (SOC) of B2 (23) is not sufficient (NO in step S955 in FIG. 25), the process proceeds to step S959 in FIG. 25, and the control device 100 determines whether the state of charge (SOC) of B1 (20) is sufficient. When the control device 100 determines that the state of charge (SOC) of B1 (20) is sufficient, the process proceeds to step S960 in FIG. 25, and, as described with reference to FIG. 9, the control device 100 allows the first voltage converter 10 to make the transition to the single battery direct-connection operation mode in which B1 (20) is used, S1 (31) and S2 (32) are turned on, and S3 (33) and S4 (34) are turned off.

The control device 100 operates the motor-driven vehicle 200 in the state of steps S956 and S960, and when, as illustrated in step S957 in FIG. 26, the control device 100 determines that the temperature of S3 (33) exceeds an allowable value (allowable operation temperature) greater than the aforementioned threshold value, the process proceeds to step S958 in FIG. 26, and the control device 100 limits the input/output electric power of B1 (20) and B2 (23).

When in step S954 in FIG. 25 the control device 100 determines that the operating point of the motor-generator 50 is not positioned in the first region (NO in step S954 in FIG. 25), or when in step S959 in FIG. 25 the control device 100 determines that the state of charge (SOC) of B1 (20) is not sufficient (NO in step S959 in FIG. 25), the process proceeds to step S961 in FIG. 25, and the control device 100 determines whether the operating point of the motor-generator 50 is positioned in the third region. When the control device 100 determines that the operating point of the motor-generator 50 is positioned in the third region (YES in step S961 in FIG. 25), the process proceeds to step S962 in FIG. 25, and the control device 100 determines whether the voltage VB1 of B1 (20) is substantially equal to the voltage VB2 of B2 (23). When the control device 100 determines that the voltage VB1 of B1 (20) is substantially equal to the voltage VB2 of B2 (23) (YES in step S962 in FIG. 25), the process proceeds to step S963 in FIG. 25, and, as described with reference to FIG. 20, the control device 100 allows the first voltage converter 10 to make the transition to the in-parallel direct-connection operation mode in which S3 (33) is turned off, and S1 (31), S2 (32), and S4 (34) are turned on. The control device 100 operates the motor-driven vehicle 200 in this state, and when, as illustrated in step S957 in FIG. 26, the control device 100 determines that the temperature of S2 (32) exceeds the allowable value (allowable operation temperature) greater than the aforementioned threshold value, the process proceeds to step S958 in FIG. 26, and the control device 100 limits the input/output electric power of B1 (20) and B2 (23).

When in step S961 in FIG. 25 the control device 100 determines that the operating point of the motor-generator 50 is beyond the third region (NO in step S961 in FIG. 25), or when in step S962 in FIG. 25 the control device 100 determines that the voltage VB1 of B1 (20) is not substantially equal to the voltage VB2 of B2 (23) (NO in step S962 in FIG. 25), the process proceeds to step S964 in FIG. 26, and, as described with reference to FIGS. 13 to 15, the control device 100 allows the first voltage converter 10 to make the transition to the in-parallel boost operation mode in which S3 (33) is turned on, and S1 (31), S2 (32), and S4 (34) are turned on and off in such a manner that the current flowing via S2 (32) is cancelled out. The control device 100 operates the motor-driven vehicle 200 in this state, and when, as illustrated in step S957 in FIG. 26, the control device 100 determines that the temperature of S3 (33) exceeds the allowable value (allowable operation temperature) greater than the aforementioned threshold value the process proceeds to step S958 in FIG. 26, and the control device 100 limits the input/output electric power of B1 (20) and B2 (23).

When in step S952 in FIG. 25 the control device 100 determines that the temperature TS3 of S3 (33) does not exceed the predetermined threshold value, the control device 100 ends a program. When in step S957 in FIG. 26 the control device 100 determines that the temperature of S3 (33) does not exceed the allowable value, the control device 100 ends the program without limiting the input/output electric power of B1 (20) and B2 (23).

Similar to the description given with reference to FIG. 24, when the operating point of the motor-generator 50 calculated in step S954 in FIG. 25 is positioned in the vicinity of the first region, the control device 100 determines that the operating point of the motor-generator 50 may be beyond the first region, and determine that step S954 in FIG. 25 yields a NO result, and the process may proceed to step S961 in FIG. 25. Similarly, also when determining whether the operating point of the motor-generator 50 is positioned in the third region in step S961 in FIG. 25, the control device 100 determines that the operating point of the motor-generator 50 may be beyond the third region when the operating point of the motor-generator 50 is positioned in the vicinity of the third region, and determines that step S961 in FIG. 25 yields a NO result, and the process may proceed to step S964 in FIG. 26.

<System Configuration of Motor-Driven Vehicle in Which Second Voltage Converter is Mounted>

Subsequently, another embodiment of the present invention is described with reference to FIGS. 27 to 44. The same reference signs are assigned to parts identical to those in the aforementioned embodiment, and repeated descriptions thereof are omitted. A second voltage converter 110 illustrated in FIG. 27 is mounted in a motor-driven vehicle 300 of the embodiment, and the on/off operation pattern of a switching element (1A) 131 to a switching element (5A) 135 is different from that in the motor-driven vehicle 200.

As illustrated in FIG. 27, the motor-driven vehicle 300 of the embodiment includes the second voltage converter 110 including a first battery 120 (hereinafter, referred to as B1 (120)), a second battery 123 (hereinafter, referred to as B2 (123)), a plurality of the switching elements 131 to 134, 135a, and 135b, a first reactor 122 (hereinafter, referred to as L1 (122)), a second reactor 125 (hereinafter, referred to as L2 (125)), a first capacitor 121 (hereinafter, referred to as C1 (121)), and a second capacitor 124 (hereinafter, referred to as C2 (124)); an electric power output path 126 of the second voltage converter 110; the smoothing capacitor 41 connected to the electric power output path 126; the inverter 40; the motor-generator 50 that is connected to the inverter 40 and drives the motor-driven vehicle 300; and the control device 100 that turns on and off each of the switching elements 131 to 134, 135a, 135b. The alternate long and short dash lines in FIG. 27 represent signal lines.

The electric power output path 126 of the second voltage converter 110 includes a reference electric path 111 connected to a negative pole of each of B1 (120) and B2 (123), and a high voltage electric path 112 to which a high voltage obtained by boosting via the second voltage converter 110 is output. The switching element (1A) 131 and the switching element (2A) 132 are connected in series between a connection point 115 to the high voltage electric path 112 and a connection point 116d to the reference electric path 111 from the high voltage electric path 112 toward the reference electric path 111, and the switching element 134 and the switching element 133 are connected in series between a connection point 116a to the high voltage electric path 112 and a connection point 119 to the reference electric path 111 from the high voltage electric path 112 toward the reference electric path 111. Diodes 136 to 139 are respectively connected in inverse parallel to the switching element (1A) 131 to the switching element (4A) 134. The switching elements 135a and 135b are disposed in inverse parallel on an electric path (III) through which a fourth connection point 117 between the switching element (1A) 131 and the switching element (2A) 132 is connected to a fifth connection point 118 between the switching element (4A) 134 and the switching element (3A) 133, and diodes 135c and 135d are respectively connected in series to the switching elements 135a and 135b. B1 (120) and L1 (122) are disposed in series on an electric path (IV) 113 through which the fourth connection point 117 is connected to the reference electric path 111, and B2 (123) and L2 (125) are connected in series on an electric path (V) 114 through which the fifth connection point 118 is connected to the high voltage electric path 112. C1 (121) is connected in parallel to B1 (120), and C2 (124) is connected in parallel to B2 (123). The smoothing capacitor 41 is connected to the high voltage electric path 112 and the reference electric path 111 while being disposed therebetween.

Each of the switching element (1A) 131 and the switching element (4A) 134 is a switching element that is turned on when L2 (125) is charged by means of an electric power of B2 (123), or when an electric power stored in (charged into) L1 (122) is output to the electric power output path 126. Hereinafter, SW1 (131) denotes the switching element (1A) 131, and SW4 (134) denotes the switching element (4A) 134. Each of the switching element (2A) 132 and the switching element (3A) 133 is a switching element that is turned on when L1 (122) is charged by means of an electric power of B1 (120), or when an electric power stored in (charged into) L2 (125) is output to the electric power output path 126. Hereinafter, SW2 (132) denotes the switching element (2A) 132, and SW3 (133) denotes the switching element (3A) 133. The switching elements 135a and 135b and the diodes 135c and 135d are integrated together so that bi-directional switching element (5A) 135 can be formed. SW5 (135) denotes the bi-directional switching element (5A) 135. According to this denotation, SW1 (131), SW5 (135), and SW3 (133) are connected in series from the high voltage electric path 112 toward the reference electric path 111 in the sequence as listed, SW2 (132) is connected in parallel to SW5 (135) and SW3 (133), SW4 (134) is connected in parallel to SW1 (131) and SW5 (135), B1 (120) is connected in parallel to SW2 (132), and B2 (123) is connected in parallel to SW4 (134). B1 (120) is connected in parallel to SW2 (132), and B2 (123) is connected in parallel to SW4 (134).

Temperature sensors 181 to 184, 185a, and 185b for detecting temperatures TS1 to TS4, TS5a, and TS5b are respectively attached to the switching elements 131 to 134, 135a, and 135b. A voltage sensor 161 for detecting the voltage VB1 and a temperature sensor 162 for detecting the temperature TB1 are attached to B1 (120), and a voltage sensor 171 for detecting the voltage VB2 and a temperature sensor 172 for detecting the temperature TB2 are attached to B2 (123). A temperature sensor 163 for detecting the temperature TC1 and a temperature sensor 173 for detecting the temperature TC2 are respectively attached to C1 (121) and C2 (124). A temperature sensor 166 for detecting the temperature TL1 and a temperature sensor 176 for detecting the temperature TL2 are respectively attached to L1 (122) and L2 (125). A current sensor 165 for detecting the current IL1 of the electric path (IV) 113 and a current sensor 175 for detecting the current IL2 of the electric path (V) 114 are respectively attached to the electric path (IV) 113 and the electric path (V) 114. A voltage sensor 164 for detecting the voltage VL1 between both ends of C1 (121) is attached in parallel to C1 (121), a voltage sensor 174 for detecting the voltage VL2 between the two ends of C2 (124) is attached in parallel to C2 (124), and the voltage sensor 91 for detecting the voltage VH between the two ends of the smoothing capacitor 41 is attached to the high voltage electric path 112 and the reference electric path 111 while being disposed therebetween.

<Basic Operation of Second Voltage Converter>

The second voltage converter 110 can perform bi-directional voltage conversion between the electric power output path 126 and either one or both of B1 (120) and B2 (123) by switching the on/off operation pattern of SW1 (131) to SW5 (135) such that the voltage of B1 (120) or B2 (123) is boosted and the boosted voltage is output to the electric power output path 126, or the voltage of the electric power output path 126 is bucked, and B1 (120) or B2 (123) is charged with this bucked voltage, and the second voltage converter 110 can switch the connection of B1 (120) or B2 (123) to the electric power output path 126 between the in-series connection and the in-parallel connection. Hereinafter, the basic operation of the second voltage converter 110 is briefly described with reference to FIGS. 28 to 30. When being turned on, each of the switching elements 131 to 134, 135a, and 135b is configured as a semiconductor element such as an IGBT, which allows current to flow therethrough only in the direction of an arrow in FIG. 27, and does not allow current to flow therethrough in the opposite direction to the arrow. In the drawings referred to hereinbelow, each of the switching elements 131 to 134 is illustratively simplified as a simple on/off switch such that the on/off state of the switching elements 131 to 134 can be displayed. The switching elements 135a and 135b are illustratively simplified as one on/off switch which is one bi-directional switch SW5 (135).

<Boost/Buck Operation in In-Series Connection>

As illustrated in FIG. 28, when SW1 (131), SW3 (133), and SW5 (135) are turned off, and SW2 (132) and SW4 (134) are turned on, a circuit R11 (illustrated by an alternate long and short dash line in FIG. 28), in which current flows [from B1 (120), to L1 (122), SW2 (132), and B1 (120)], is formed, a circuit R12 (illustrated by an alternate long and short dash line in FIG. 28), in which current flows [from B2 (123), to L2 (125), SW4 (134), and B2 (123)], is formed, and L1 (122) and L2 (125) are respectively charged with electric powers of B1 (120) and B2 (123). When SW2 (132) and SW4 (134) are turned off, and SW5 (135) is turned on, a circuit R23 (illustrated by the solid line in FIG. 28), in which current flows [from B1 (120), to L1 (122), SW5 (135), B2 (123), L2 (125), the high voltage electric path 112, the reference electric path 111, and B1 (120)], is formed, and an electric power charged into L1 (122) and L2 (125) is output to the electric power output path 126. B1 (120) and B2 (123) are charged with a regenerative electric power via a circuit R24 (illustrated by the dotted line in FIG. 28) in which current flows [from the high voltage electric path 112, to L2 (125), B2 (123), SW5 (135), L1 (122), B1 (120), the reference electric path 111, and the high voltage electric path 112].

<Boost/Buck Operation (1) in In-Parallel Connection>

As illustrated in FIG. 29, similar to the boost/buck operation in the in-series connection described with reference to FIG. 28, when SW1 (131), SW3 (133), and SW5 (135) are turned off, and SW2 (132) and SW4 (134) are turned on, the circuits R11 and R12 (illustrated by alternate long and short dash lines in FIG. 29) are formed, and L1 (122) and L2 (125) are charged with electric powers of B1 (120) and B2 (123). When SW1 (131) and SW3 (133) are turned on, and SW2 (132), SW4 (134), and SW5 (135) are turned off, a circuit R13 (illustrated by a solid line in FIG. 29), in which current flows [from B1 (120), to L1 (122), D1 (136), the high voltage electric path 112, the reference electric path 111, and B1 (120)], is formed, a circuit R14 (illustrated by a solid line in FIG. 29), in which current flows [from B2 (123), to L2 (125), the high voltage electric path 112, the reference electric path 111, D3 (138), and B2 (123)], is formed, and an electric power charged into L1 (122) and L2 (125) is output to the electric power output path 126. B1 (120) is charged with a regenerative electric power via a circuit R15 (illustrated by a dotted line in FIG. 29) in which current flows [from the high voltage electric path 112, to SW1 (131), L1 (122), B1 (120), reference electric path 111, and the high voltage electric path 112], and B2 (123) is charged with a regenerative electric power via a circuit R16 (illustrated by a dotted line in FIG. 29) in which current flows [from the high voltage electric path 112, to L2 (125), B2 (123), SW3 (133), the reference electric path 111, and the high voltage electric path 112].

<Boost/Buck Operation (2) in In-Parallel Connection>

As illustrated in FIG. 30, when SW1 (131), SW3 (133), and SW5 (135) are turned on, and SW2 (132) and SW4 (134) are turned off, a circuit R17 (illustrated by an alternate long and short dash line in FIG. 30), in which current flows [from B1 (120), to L1 (122), SW5 (135), SW3 (133), and B1 (120)], is formed, a circuit R18 (illustrated by an alternate long and short dash line in FIG. 30), in which current flows [from B2 (123), to L2 (125), SW1 (131), SW5 (135), and B2 (123)] is formed, and L1 (122) and L2 (125) are respectively charged with electric powers of B1 (120) and B2 (123). When SW5 (135) remains turned on, SW1 (131) and SW3 (133) are turned off, and SW2 (132) and SW4 (134) are turned on, a circuit R19 (illustrated by a solid line in FIG. 30), in which current flows [from B1 (120), to L1 (122), SW5 (135), D4 (139), the high voltage electric path 112, the reference electric path 111, and B1 (120)], is formed, a circuit R20 (illustrated by a solid line in FIG. 30), in which current flows [from B2 (123), to L2 (125), the high voltage electric path 112, the reference electric path 111, D2 (137), SW5 (135), and B2 (123)], is formed, and an electric power charged into L1 (122) and L2 (125) is output to the electric power output path 126. B1 (120) is charged with a regenerative electric power via a circuit R21 (illustrated by a dotted line in FIG. 30) in which current flows [from the high voltage electric path 112, to SW4 (134), SW5 (135), L1 (122), B1 (120), the reference electric path 111, and the high voltage electric path 112], and B2 (123) is charged with a regenerative electric power via a circuit R22 (illustrated by a dotted line in FIG. 30) in which current flows [from the high voltage electric path 112, to L2 (125), B2 (123), SW5 (135), SW2 (132), the reference electric path 111, and the high voltage electric path 112].

Operation pattern switching control, when the temperature of each of SW1 (131) to SW5 (135) exceeds a predetermined threshold value in the motor-driven vehicle 300 in which the second voltage converter 110 with the aforementioned configuration is mounted, is described with reference to FIGS. 31 to 44. The temperature of the predetermined threshold value referred to here is a temperature lower than the maximum temperature in a predetermined operation temperature range of each of the switching elements SW1

(131) to SW5 (135), and is a temperature determined by the characteristics of each of the switching elements SW1 (131) to SW5 (135). The temperature threshold value may be approximately 100° C. or the like. A determination is made as to whether the temperature of SW5 (135) exceeds the predetermined threshold value, based on whether a temperature detected by either one or both of the temperature sensors 185a and 185b exceeds the predetermined threshold value.

<Transition to Single Direct-Connection Operation Mode>

As illustrated in step S1001 in FIG. 31, the control device 100 detects the respective temperatures of SW1 (131) to SW5 (135) using the respective temperature sensors, and in step S1002 in FIG. 31 the control device 100 determines whether the temperature of any one of SW2 (132), SW4 (134), and SW5 (135) exceeds the predetermined threshold value as illustrated. When the control device 100 determines that the temperature of any one of SW2 (132), SW4 (134), and SW5 (135) exceeds the predetermined threshold value (YES in step S1002 in FIG. 31), similar to the description given with reference to FIG. 7, in steps S1003 to S1005 in FIG. 31, the control device 100 detects the rotational speed of the motor-generator (MG) 50, and U-, V-, and W-phase currents using the respective sensors, and calculates the torque of the motor-generator (MG) 50, and the position of the operating point of the motor-generator 50 on the torque-rotational speed characteristic diagram illustrated in FIG. 6, and the process proceeds to step S1006 in FIG. 31. In contrast, when in step S1002 in FIG. 31 the temperature of any one of SW2 (132), SW4 (134), and SW5 (135) does not exceed the predetermined threshold value, the control device 100 ends a program without allowing the second voltage converter 110 to make the transition to the single battery direct-connection operation mode.

As illustrated in step S1006 in FIG. 31, the control device 100 determines whether the operating point of the motor-generator 50 is positioned in the first region (the hatched region illustrated in FIGS. 32(b) and 33(b)) on the torque-rotational speed characteristic diagram illustrated in FIG. 6. When the control device 100 determines that the operating point of the motor-generator 50 is positioned in the first region, the process proceeds to step S1007 in FIG. 31, and the control device 100 determines whether the state of charge (SOC) of B2 (123) required to be able to travel a predetermined distance is a predetermined value or greater. In contrast, when in step S1006 in FIG. 31 the control device 100 determines that the operating point of the motor-generator 50 is not positioned in the first region (is positioned outside the first region), the control device 100 determines that it may not be able to drive the motor-generator 50 when either of the batteries B1 (120) and B2 (123) is directly connected to the motor-generator 50, and the control device 100 ends the program without allowing the second voltage converter 110 to make the transition to the single battery direct-connection operation mode.

When the control device 100 determines that the state of charge (SOC) of B2 (123) is sufficient, the process proceeds to step S1008 in FIG. 31, and the control device 100 allows the second voltage converter 110 to make the transition to the single battery direct-connection operation mode in which B2 (123) is used, SW1 (131), SW2 (132), SW4 (134), and SW5 (135) are turned off, and SW3 (133) is turned on.

In contrast, when in step S1007 in FIG. 31 the control device 100 determines that the state of charge (SOC) of B2 (123) is not sufficient, the control device 100 determines that the motor-driven vehicle 300 cannot travel a sufficient distance when the second voltage converter 110 makes the transition to the single battery direct-connection operation mode in which B2 (123) is used, the process proceeds to step S1009 in FIG. 31, and the control device 100 determines whether the state of charge (SOC) of B1 (120) is sufficient. When the control device 100 determines that the state of charge (SOC) of B1 (120) is sufficient, the process proceeds to step S1010 in FIG. 31, and the control device 100 allows the second voltage converter 110 to make the transition to the single battery direct-connection operation mode in which B1 (120) is used, SW1 (131) is turned on, and SW2 (132), SW3 (133), SW4 (134), and SW5 (135) are turned off. In contrast, when the control device 100 determines that the state of charge (SOC) of B1 (120) is not sufficient, the control device 100 determines that the motor-driven vehicle 300 cannot travel a sufficient distance in the single battery direct-connection operation mode in which either of the batteries B1 (120) and B2 (123) is used, and the control device 100 ends the program without allowing the second voltage converter 110 to make the transition to the single battery direct-connection operation mode.

The flow of current in the single battery direct-connection operation mode, in which B2 (123) is used when the temperature of each of SW2 (132), SW4 (134), and SW5 (135) exceeds the predetermined temperature, is described with reference to FIG. 32(a). The flow of current in the single battery direct-connection operation mode, in which B1 (120) is used, is described with reference to FIG. 33(a).

<Single Battery Direct-Connection Operation Mode in Which B2 (123) is Used>

The single battery direct-connection operation mode, in which B2 (123) is used, is an operation mode in which B2 (123) is directly connected to the electric power output path 126, and the voltage of B2 (123) is output to the electric power output path 126 without being boosted by fixing SW2 (132), SW4 (134), SW5 (135), and SW1 (131) in an off state, and SW3 (133) in an on state in the second voltage converter 110. As illustrated in FIG. 32(a), in this operation mode, the electric power of B2 (123) is output to the electric power output path 126 via the circuit R14 (illustrated by the solid line in FIG. 32(a)), in which current flows [from B2 (123), to L2 (125), the high voltage electric path 112, the reference electric path 111, D3 (138), and B2 (123)], and B2 (123) is charged with the regenerative electric power of the motor-generator 50 via the circuit R16 (illustrated by the dotted line in FIG. 32(a)) in which current flows [from the high voltage electric path 112, to L2 (125), B2 (123), SW3 (133), the reference electric path 111, and the high voltage electric path 112]. Since the motor-generator 50 of the motor-driven vehicle 300 is operated in the first region of B2 (first power output region of B2 for the motor-generator 50) in which the motor-driven vehicle 300 can travel with the voltage VB2 and the outputable current of B2 (123), even if the temperature of any one or all of SW2 (132), SW4 (134), and SW5 (135) exceeds the predetermined threshold value, it is possible to restrict the flow of current to any one or all of SW2 (132), SW4 (134), and SW5 (135) to zero without limiting the input/output electric power of B2 (123) and impairing driveability, by switching the operation mode to the single battery direct-connection operation mode, and thus, it is possible to prevent the temperature of SW2 (132), SW4 (134), and SW5 (135) from increasing beyond the predetermined operation temperature range.

<Single Battery Direct-Connection Operation Mode in Which B1 (120) is Used>

The single battery direct-connection operation mode, in which B1 (120) is used, is an operation mode in which B1 (120) is directly connected to the electric power output path 126, and the voltage of B1 (120) is output to the electric power output path 126 without being boosted, by fixing SW2 (132), SW4 (134), SW5 (135), and SW3 (133) in an off state, and SW1 (131) in an on state in the second voltage converter 110. As illustrated in FIG. 33(a), in this operation mode, the electric power of B1 (120) is output to the electric power output path 126 via the circuit R13 (illustrated by the solid line in FIG. 33(a)), in which current flows [from B1 (120), to L1 (122), D1 (136), the high voltage electric path 112, the reference electric path 111, and B1 (120)], and B1 (120) is charged with the regenerative electric power of the motor-generator 50 via the circuit R15 (illustrated by the dotted line in FIG. 33(a)) in which current flows [from the high voltage electric path 112, to SW1 (131), L1 (122), B1 (120), the reference electric path 111, and the high voltage electric path 112]. Since the motor-generator 50 of the motor-driven vehicle 300 is operated in the first region of B1 (first power output region of B1 for the motor-generator 50) in which the motor-driven vehicle 300 can travel with the voltage VB1 and the outputable current of B1 (120), even if the temperature of any one or all of SW2 (132), SW4 (134), and SW5 (135) exceeds the predetermined threshold value, it is possible to restrict the flow of current to any one or all of SW2 (132), SW4 (134), and SW5 (135) to zero without limiting the input/output electric power of B1 (120) and impairing driveability, by switching the operation mode to the single battery direct-connection operation mode, and thus, it is possible to prevent the temperature of SW2 (132), SW4 (134), and SW5 (135) from increasing beyond the predetermined operation temperature range.

<Transition to In-Series Direct-Connection Operation Mode>

As illustrated in step S2001 in FIG. 34, the control device 100 detects the respective temperatures of SW1 (131) to SW5 (135) using the respective temperature sensors, and as illustrated in step S2002 in FIG. 34 determines whether any one of the respective temperatures of SW1 (131) to SW4 (134) exceeds the predetermined threshold value, and when in step S2002 in FIG. 34 the control device 100 determines that any one of the respective temperatures of SW1 (131) to SW4 (134) exceeds the predetermined threshold value (YES in step S2002 in FIG. 34), the process proceeds to step S2003 in FIG. 34, and similar to the description given with reference to FIG. 7, in step S2003 to S2005 in FIG. 34, the control device 100 detects the rotational speed of the motor-generator (MG) 50, and U-, V-, and W-phase currents using the respective sensors, and calculates the torque of the motor-generator (MG) 50 and the position of the operating point of the motor-generator 50, and the process proceeds to step S2006 in FIG. 34.

As illustrated in step S2006 in FIG. 34, the control device 100 determines whether the operating point of the motor-generator 50 is positioned in the second region (the region surrounded by the maximum torque line a, the second equi-power output line h, and the second limit rotational speed line j illustrated in FIG. 6; that is, the hatched region illustrated in FIG. 35(b)) on the torque-rotational speed characteristic diagram illustrated in FIG. 6. When the control device 100 determines that the operating point of the motor-generator 50 is positioned in the second region, the control device 100 determines that it is possible to drive the motor-generator 50 by directly connecting B1 (120) and B2 (123) in series to the motor-generator 50, and the process proceeds to step S2007 in FIG. 34, and as illustrated in FIG. 35(a), the control device 100 allows the second voltage converter 110 to make the transition to the in-series direct-connection operation mode in which SW1 (131) to SW4 (134) are turned off, and SW5 (135) is turned on. In contrast, when the control device 100 determines that the operating point of the motor-generator 50 is not positioned in the second region (is positioned outside the second region), the control device 100 determines that it may not be able to drive the motor-generator 50 even if B1 (120) and B2 (123) are directly connected in series to the motor-generator 50, and the control device 100 ends a program without allowing the second voltage converter 110 to make the transition to the in-series direct-connection operation mode.

<In-Series Direct-Connection Operation Mode>

The in-series direct-connection operation mode is an operation mode in which B1 (120) and B2 (123) are directly connected to the electric power output path 126 in series, and the total voltage (VB1+VB2), which is the sum of the voltage VB1 of B1 (120) and the voltage VB2 of B2 (123), is output to the electric power output path 126 by fixing all of SW1 (131) to SW4 (134) in an off state, and SW5 (135) in an on state in the second voltage converter 110. As illustrated in FIG. 35(a), in this operation mode, the electric power of B1 (120) and B2 (123) is output to the electric power output path 126 via the circuit R23 (illustrated by the solid line in FIG. 35(a)), in which current flows [from B1 (120), to L1 (122), SW5 (135), B2 (123), L2 (125), the high voltage electric path 112, the reference electric path 111, and B1 (120)], and B1 (120) and B2 (123) are charged with the regenerative electric power of the motor-generator 50 via the circuit R24 (illustrated by the dotted line in FIG. 35(a)) in which current flows [from the high voltage electric path 112, to L2 (125), B2 (123), SW5 (135), L1 (122), B1 (120), the reference electric path 111, and the high voltage electric path 112]. Since the motor-generator 50 of the motor-driven vehicle 300 is operated in the second region (second power output region of the motor-generator 50) in which the motor-driven vehicle 300 can travel with the total voltage (VB1 +VB2) of B1 (120) and B2 (123) and the outputable current of B1 (120) or B2 (123), even if the temperature of any one or all of SW1 (131) to SW4 (134) exceeds the predetermined threshold value, it is possible to restrict the flow of current to SW1 (131) to SW4 (134) (having a temperature exceeding the predetermined threshold value) to zero without limiting the input/output electric power of B1 (120) and B2 (123) and impairing driveability by switching the operation mode to the in-series direct-connection operation mode, and thus, it is possible to prevent the temperature of SW1 (131) to SW4 (134) from increasing beyond the predetermined operation temperature range.

<Transition to In-Parallel Direct-Connection Operation Mode>

As illustrated in step S3001 in FIG. 36, the control device 100 detects the respective temperatures of SW1 (131) to SW5 (135) using the respective temperature sensors, and determines whether any one of the respective temperatures of SW2 (132), SW4 (134), and SW5 (135) exceeds the predetermined threshold value as illustrated in step S3002 in FIG. 36. When the control device 100 determines that any one of the respective temperatures of SW2 (132), SW4 (134), and SW5 (135) exceeds the predetermined threshold value (YES in step S3002 in FIG. 36), similar to the description given with reference to FIG. 7, in steps S3003 to S3005 in FIG. 36, the control device 100 detects the rotational speed of the motor-generator (MG) 50, and U-, V-, and W-phase currents using the respective sensors, and calculates the torque of the motor-generator (MG) 50 and the position of the operating point of the motor-generator 50, and the process proceeds to step S3006 in FIG. 36. In contrast, in step S3002 in FIG. 36, when none of the respective temperatures of SW2 (132), SW4 (134), and SW5 (135) exceeds the predetermined threshold value, the control device 100 ends a program without allowing the second voltage converter 110 to make the transition to the single battery direct-connection operation mode.

As illustrated in step S3006 in FIG. 36, the control device 100 determines whether the operating point of the motor-generator 50 is positioned in the third region (the hatched region in FIG. 37(b)) on the torque-rotational speed characteristic diagram illustrated in FIG. 6. When the control device 100 determines that the operating point of the motor-generator 50 is positioned in the third region, the process proceeds to step S3007 in FIG. 36. In contrast, when the control device 100 determines that the operating point of the motor-generator 50 is not positioned in the third region (is positioned outside the third region) in step S3006 in FIG. 36, the control device 100 determines that it may not be able to drive the motor-generator 50 even if B1 (120) and B2 (123) are directly connected in parallel to the motor-generator 50, and the control device 100 ends a program without allowing the second voltage converter 110 to make the transition to the in-parallel direct-connection operation mode.

After the process proceeds to step S3007 in FIG. 36, the control device 100 determines whether the voltage VB1 of B1 (120) is substantially equal to the voltage VB2 of B2 (123). When the control device 100 determines that the voltage VB1 of B1 (120) is substantially equal to the voltage VB2 of B2 (123), the process proceeds to step S3008 in FIG. 36, and the control device 100 allows the second voltage converter 110 to make the transition to the in-parallel direct-connection operation mode in which SW1 (131) and SW3 (133) are turned on, and SW2 (132), SW4 (134), and SW5 (135) are turned off. In contrast, when the control device 100 determines that the voltage VB1 of B1 (120) is not substantially equal to the voltage VB2 of B2 (123), the control device 100 determines that the second voltage converter 110 cannot make the transition to the in-parallel direct-connection operation mode, and ends the program without allowing the second voltage converter 110 to make the transition to the in-parallel direct-connection operation mode.

<In-Parallel Direct-Connection Operation Mode>

The in-parallel direct-connection operation mode is an operation mode in which B1 (120) and B2 (123) are directly connected to the electric power output path 126 in parallel, and the total current, obtained by adding the current of B1 (120) to the current of B2 (123), is output to the electric power output path 126 by fixing SW2 (132), SW4 (134), and SW5 (135) in an off state, and SW1 (131) and SW3 (133) in an on state in the second voltage converter 110. The voltages VB1 and VB2 output to the electric power output path 126 are substantially equal. As illustrated in FIG. 37(a), in this operation mode, the circuit R13 (illustrated by a solid line in FIG. 37(a)), in which current flows [from B1 (120), to L1 (122), D1 (136), the high voltage electric path 112, the reference electric path 111, and B1 (120)], is formed, the circuit R14 (illustrated by a solid line in FIG. 37(a)), in which current flows [from B2 (123), to L2 (125), the high voltage electric path 112, the reference electric path 111, D3 (138), and B2 (123)], is formed, and the electric powers of B1 (120) and B2 (123) are respectively output to the electric power output path 126 via the circuits R13 and R14. B1 (120) is charged with the regenerative electric power of the motor-generator 50 via the circuit R15 (illustrated by a dotted line in FIG. 37(a)) in which current flows [from the high voltage electric path 112, to SW1 (131), L1 (122), B1 (120), the reference electric path 111, and the high voltage electric path 112], and B2 (123) is charged with the regenerative electric power of the motor-generator 50 via the circuit R16 (illustrated by a dotted line in FIG. 37(a)) in which current flows [from the high voltage electric path 112, to L2 (125), B2 (123), SW3 (133), the reference electric path 111, and the high voltage electric path 112]. Since the motor-generator 50 of the motor-driven vehicle 300 is operated in the third region (third power output region of the motor-generator 50) in which the motor-driven vehicle 300 can travel with the voltage VB1 of B1 (120) (substantially equal to the voltage VB2 of B2 (123)) and the outputable currents of B1 (120) and B2 (123), even if the temperature of any one or all of SW2 (132), SW4 (134), and SW5 (135) exceeds the predetermined threshold value, it is possible to restrict the flow of current to any one or all of SW2 (132), SW4 (134), and SW5 (135) (having a temperature exceeding the predetermined threshold value) to zero without limiting the input/output electric power of B1 (120) and B2 (123) and impairing driveability, by switching the operation mode to the in-parallel direct-connection operation mode, and thus, it is possible to prevent the temperature of SW2 (132), SW4 (134), and SW5 (135) from increasing beyond the predetermined operation temperature range.

<Transition to In-Parallel Boost Operation Mode>

As illustrated in step S4001 in FIG. 38, the control device 100 detects the respective temperatures of SW1 (131) to SW5 (135) using the respective temperature sensors, and as illustrated in step S4002 in FIG. 38 the control device 100 determines whether the temperature of either one or both of SW1 and SW3, or either one or both of SW2 and SW4 exceeds the predetermined threshold value, and when the control device 100 determines that step S4002 in FIG. 38 yields a YES result, the process proceeds to step S4003 in FIG. 38, and similar to the description given with reference to FIG. 7, the control device 100 detects the rotational speed of the motor-generator (MG) 50 and the rotational angle of the rotor, and V- and W-phase currents using the respective sensors, and calculates the torque of the motor-generator (MG) 50 as illustrated in step S4004 in FIG. 38, and the position of the operating point of the motor-generator 50 on the torque-rotational speed characteristic diagram illustrated in FIG. 6 as illustrated in step S4005 in FIG. 38, and the process proceeds to step S4006 in FIG. 38.

As illustrated in step S4006 in FIG. 38, the control device 100 determines whether the operating point of the motor-generator 50 is positioned in the maximum region (the region surrounded by the maximum torque line a, the maximum equi-power output line b, and the limit rotational speed line c illustrated in FIG. 6; that is, the hatched region illustrated in FIGS. 39(b), 40(b), 42(b), and 43(b)) on the torque-rotational speed characteristic diagram illustrated in FIG. 6. When the control device 100 determines that the operating point of the motor-generator 50 is positioned in the maximum region, the process proceeds to step S4007 in FIG. 38, and the control device 100 allows the second voltage converter 110 to make the transition to an in-parallel boost operation mode (1) illustrated in FIGS. 39 to 41, or an in-parallel boost operation mode (2) illustrated in FIGS. 42 to 44.

When the control device 100 determines that step S4002 in FIG. 38 yields a NO result, or determines that the operating point of the motor-generator 50 is not positioned in the maximum region in step S4006 in FIG. 38, the control device 100 ends a program without allowing the second voltage converter 110 to make the transition to the in-parallel boost operation mode.

<In-Parallel Boost Operation Mode (1)>

The in-parallel boost operation mode (1) is an operation mode in which boosting the voltage of B1 (120) and B2 (123) and the output of the electric power of B1 (120) and B2 (123) are alternately performed by turning off SW2 (132) and SW4 (134), turning on SW5 (135), and turning on and off SW1 (131) and SW3 (133) as illustrated in FIGS. 39 to 41. Parts identical to the operation described with reference to FIGS. 13 to 15 are briefly described.

As illustrated in FIGS. 41(a) and 41(b), in the in-parallel boost operation mode (1) of the second voltage converter 110, the control device 100 turns on and off SW1 (131) and SW3 (133) in such a manner that a time period (a period of times t3 to t5 and a period of times t6 to t8) for charging L1 (122) with B1 (120) is offset from a time period (a period of times t1 to t3 and a period of times t4 to t6) for charging L2 (125) with B2 (123), and a time period (a period of times t2 to t3 and a period of times t5 to t6) for outputting an electric power from B1 (120) is offset from a time period (a period of times t3 to t4 and a period of times t6 to t7) for outputting an electric power from B2 (123). At this time, SW5 (135) is fixed in an on state, and SW2 (132) and SW4 (134) are fixed in an off state (refer to FIGS. 41(c) to 41(g)). At the time t3 illustrated in FIGS. 41(a) and 41(b), similar to the in-parallel boost operation mode of the first voltage converter 10 described with reference to FIG. 15, when SW1 (131) and SW3 (133) are operated in such a manner that the timing for switching from the output of the electric power of B1 (120) to the charging of L1 (122) coincides with the timing for starting the output of the electric power of B2 (123), as illustrated in FIGS. 41(c) and 41(e), ΔT1 is longer than ΔT2, and ΔT4 is longer than ΔT3, the turn-on time ΔT1 of SW3 (133) operated at a small duty ratio includes the turn-off time ΔT2 of SW1 (131) operated at a large duty ratio, and in contrast, the turn-on time ΔT4 of SW1 (131) operated at a large duty ratio includes the turn-off time ΔT3 of SW3 (133) operated at a small duty ratio.

The flow of current in the following manner in the second voltage converter 110, when SW1 (131) and SW3 (133) are turned on and off at the aforementioned duty ratios and timings, is as follows. When SW1 (131) is turned on, and SW3 (133) is turned off during a period of time t2 to t3 and a period of time t5 to t6 in FIG. 41, as illustrated in FIG. 39(a), the circuit R18 (illustrated by a solid line in FIG. 39(a)), in which current flows [from B2 (123), to L2 (125), SW1 (131), and B2 (123)] is formed, and the circuit R13 (illustrated in a solid line in FIG. 39(a)), in which current flows [from B1 (120), to L1 (122), D1 (136), the high voltage electric path 112, the reference electric path 111, and B1 (120)], is formed. L2 (125) is charged with an electric power output from B2 (123) via the circuit R18, and the electric power of B1 (120) is output to the high voltage electric path 112 via the circuit R13. As illustrated in FIG. 39(c), the direction of current flow in the circuit R13 is opposite to the direction of current flow in the circuit R18, on an electric path Z5 between the connection point 115 to the high voltage electric path 112 and a high voltage-side connection point 115b between SW1 (131) and D1 (136), and on an electric path Z6 between the fourth connection point 117 and a low voltage-side connection point 117a between SW1 (131) and D1 (136). For this reason, currents cancel each other out on the electric paths Z5 and Z6 illustrated in FIG. 39(c), and current flowing between the connection point 115 to the high voltage electric path 112 and the fourth connection point 117 is decreased, and thus the magnitude of current flowing via SW1 (131) is decreased. Since SW5 (135) is fixed in an on state while SW1 (131) is turned on, and SW2 (132), SW3 (133), and SW4 (134) are turned off, as illustrated in FIG. 39(a), the circuit R23 (illustrated by an alternate long and short dash line and solid line in FIG. 39(a)), in which current flows [from B1 (120), to L1 (122), SW5 (135), B2 (123), L2 (125), the high voltage electric path 112, the reference electric path 111, and B1 (120)], is formed, and thus current from the high voltage electric path 112 flows via the circuit R23. As described above, the current flowing via SW1 (131) is decreased due to being cancelled out during a period of time t2 to t3 and a period of time t5 to t6 in FIG. 41. During these periods, SW2 (132) and SW4 (134) are turned off, and thus current does not flow via SW2 (132) and SW4 (134).

When SW1 (131) is turned off, and SW3 (133) is turned on during a period of time t3 to and t4 and a period of time t6 to t7 in FIG. 41, as illustrated in FIG. 40(a), the circuit R17 (illustrated by a solid line in FIG. 40(a)), in which current flows [from B1 (120), to L1 (122), SW5 (135), SW3 (133), and B1 (120)], is formed, and the circuit R14 (illustrated by a solid line in FIG. 40(a)), in which current flows [from B2 (123), to L2 (125), the high voltage electric path 112, the reference electric path 111, D3 (138), and B2 (123)], is formed. L1 (122) is charged with an electric power output from B1 (120) via the circuit R17, and the electric power of B2 (123) is output to the high voltage electric path 112 via the circuit R14; however, similar to the description given with reference to FIG. 39, currents flowing via electric paths Z7 and Z8 and SW1 (131) illustrated in FIG. 40(c) are decreased due to being cancelled out. During these periods, SW2 (132) and SW4 (134) are turned off, and thus current does not flow via SW2 (132) and SW4 (134).

As illustrated in FIGS. 41(c) and 41(e), during a period of time t1 to t2, a period of time t4 to t5, and a period of time of t7 to t8; that is, during a period (a period illustrated by hatching in FIGS. 41(c) and 41(e)) during which SW1 (131) and SW3 (133) are turned on at the same time, the circuits R18 and R17 (illustrated by the alternate long and short dash line in FIG. 30) described with reference to FIG. 30 are formed, and the magnitude of current flowing via SW1 (131) and SW3 (133) is equal to the magnitude of current when L1 (122) and L2 (125) are respectively charged with the electric powers of B1 (120) and B2 (123) at the same time in the basic boost/buck operation mode of the second voltage converter 110 when B1 (120) and B2 (123) are connected in parallel. Accordingly, during these periods, the currents flowing via SW1 (131) and SW3 (133) do not cancel each other out, and SW1 (131) and SW3 (133) are heated by the passing current.

As described above, in the in-parallel boost operation mode (1), the time, during which current flows via SW1 (131) and SW1 (131) is heated by the current, is a time (ΔT4−ΔT3) obtained by subtracting the turn-off time ΔT3 of SW3 (133) from the turn-on time ΔT4 of SW1 (131) as illustrated in FIG. 41(c), or a time (ΔT1−ΔT2) obtained by subtracting the turn-off time ΔT2 of SW1 (131) from the turn-on time ΔT1 of SW3 (133). Since ΔT4 and ΔT2 are respectively equal to the turn-on times of SW1 (131) and SW3 (133) required to boost the respective voltages VB1 and VB2 of B1 (120) and B2 (123) to the high voltage VH in the in-parallel connection described with reference to FIG. 30, times for heating of SW1 (131) and SW3 (133) in the in-parallel boost operation mode (1) are respectively considerably shorter than the time ΔT4 for heating of SW1 (131) and the time ΔT1 for heating of SW3 (133) in the basic boost/buck operation for the in-parallel connection, and as a result, it is possible to effectively prevent an increase in the temperature of SW1 (131) and SW3 (133).

<In-Parallel Boost Operation Mode (2)>

The in-parallel boost operation mode (1) of the second voltage converter 110 is an operation mode in which boosting the voltage of B1 (120) and B2 (123) and the output of the electric power of B1 (120) and B2 (123) are alternately performed by turning on and off SW1 (131) and SW3 (133) when the temperature of either one or both of SW1 (131) and SW3 (133) exceeds the predetermined threshold value, and the temperature of SW5 (135) is the predetermined threshold value or less. In contrast, the in-parallel boost operation mode (2) is an operation mode in which boosting the voltage of B1 (120) and B2 (123) and the output of the electric power of B1 (120) and B2 (123) are alternately performed by turning on and off SW2 (132) and SW4 (134) as llustrated in FIG. 44, when the temperature of either one or both of SW2 (132) and SW4 (134) exceeds the predetermined threshold value, and the temperature of SW5 (135) is the predetermined threshold value or less. As illustrated in FIG. 44, SW2 (132) and SW4 (134) are turned on and off at the same time when SW1 (131) and SW3 (133) are turned on and off in the in-parallel boost operation mode (1) illustrated in FIG. 41. Similar to the in-parallel boost operation mode (1) illustrated in FIG. 41, SW5 (135) is fixed in an on state. Hereinafter, parts identical to those described with reference to FIGS. 39 to 41 are briefly described.

The flow of current when SW2 (132) and SW4 (134) are turned on and off at the aforementioned timings is as illustrated in FIGS. 42 and 43. Similar to the description given with reference to FIGS. 39 to 41, as illustrated in FIG. 42, while SW2 (132) is turned off and SW4 (134) is turned on (during a period of time t2 to t3 and a period of time t5 to t6 in FIG. 44), the circuits R12 and R19 illustrated in FIG. 42 are formed, and currents flowing via electric paths Z9 and Z10 illustrated in FIG. 42(c) cancel each other out, and thus current flowing via SW4 (134) is decreased due to being cancelled out. While SW2 (132) is turned on, and SW4 (134) is turned off (during a period of time t3 to t4 and a period of time t6 to t7 in FIG. 44), the circuits R11 and R20 illustrated in FIG. 43 are formed, and currents flowing via electric paths Z11 and Z12 illustrated in FIG. 43(c) cancel each other out, and thus current flowing via SW2 (132) is decreased due to being cancelled out. During a period of time t1 to t2, a period of time t4 to t5, and a period of time t7 to t8 illustrated in FIG. 44 (periods illustrated by hatching in FIGS. 42(d) and 42(f)), similar to the description given with reference to FIGS. 39 and 41, SW2 (132) and SW4 (134) are turned on at the same time, the current flowing via SW2 (132) and SW4 (134) is not cancelled out, and SW2 (132) and SW4 (134) are heated by the passing current. However, similar to the description given with reference to FIGS. 39 to 41, times for heating of SW2 (132) and SW4 (134) in the in-parallel boost operation mode (2) are respectively considerably shorter than the time ΔT4 for heating of SW2 (132) and the time ΔT1 for heating of SW4 (134) in the basic boost/buck operation for the in-parallel connection, and thus it is possible to effectively prevent an increase in the temperature of SW2 (132) and SW4 (134).

When the temperature of either one or both of SW1 (131) and SW3 (133) exceeds the predetermined threshold value, the temperature of SW5 (135) is the predetermined threshold value or less, and the temperature of SW2 (132) and SW4 (134) is the predetermined threshold value or less, the operation mode may switch to the in-parallel boost operation mode (2) in which SW1 (131) and SW3 (133) are turned off instead of switching to the in-parallel boost operation mode (1), thereby preventing an increase in the temperature of SW1 (131) and SW3 (133). Similarly, when the temperature of either one or both of SW2 (132) and SW4 (134) exceeds the predetermined threshold value, the temperature of SW5 (135) is the predetermined threshold value or less, and the temperature of SW1 (131) and SW3 (133) is the predetermined threshold value or less, the operation mode may switch to the in-parallel boost operation mode (1) in which SW2 (132) and SW4 (134) are turned off instead of switching to the in-parallel boost operation mode (2), thereby preventing an increase in the temperature of SW2 (132) and SW4 (134).

As described above, in the motor-driven vehicle 200 of the embodiment in which the first voltage converter 10 is mounted, and the motor-driven vehicle 300 of the other embodiment in which the second voltage converter 110 is mounted, it is possible to prevent the temperature of each of the switching elements 31 to 34, 131 to 134, 135a, and 135b from increasing beyond the predetermined operation temperature range, without limiting the input/output electric power of the batteries 20, 23, 120, and 123 and impairing the power performance or the driveability of the motor-driven vehicles 200 and 300.

The present invention is not limited to the aforementioned embodiments, and includes all modifications and amendments insofar as the modifications and amendments do not depart from the technical scope and the nature of the present invention specified by the claims.

REFERENCE SIGN LIST 10, 110: Voltage converter
11, 111: Reference electric path
12, 112: High voltage electric path
13: Electric path (I)
14: Electric path (II)
16: First connection point
16b, 17a, 18b, 19a, 115, 115b, 116b, 116d, 117a, 119: Connection point
17: Second connection point
18: Third connection point
20, 23, 120, 123: Battery
21, 24, 121, 124: Capacitor
22, 25, 122, 125: Reactor
26, 126: Electric power output path
31 to 34, 131 to 134, 135a, 135b: Switching element
35 to 38, 136 to 139: Diode
40: Inverter
41: Smoothing capacitor
43, 44, 45: Electric power output line
50: Motor-generator
51: Output shaft
52: Gear apparatus
53: Axle
54: Wheel
55: Accelerator pedal
56: Brake pedal
57: Starter switch
61, 64, 71, 74, 91, 161, 171, 164, 174: Voltage sensor
62, 63, 66, 72, 73, 76, 81 to 84, 181 to 184, 185a, 185b: Temperature sensor
65, 75, 92, 93, 165, 175: Current sensor
94: Resolver
95: Speed sensor
96: Accelerator pedal position sensor
97: Brake pedal position sensor
100: Control device
101: CPU
102: Storage unit 103: Device/sensor interface
104: Data bus
105: Control program
106: Control data
107: Switching program
113: Electric path (IV)
114: Electric path (V)
117: Fourth connection point
118: Fifth connection point
200, 300: Motor-driven vehicle
a: Maximum torque line
b: Maximum equi-power output line
c: Maximum limit rotational speed line
d, f: First equi-power output line
e, g: First limit rotational speed line
h: Second equi-power output line
j: Second limit rotational speed line
t1 to t6: Time
Z1 to Z12: Electric path
$\Delta T1$, $\Delta T4$: Turn-on time
$\Delta T2$, $\Delta T3$: Turn-off time
B1 (20), B1 (120): First battery
B2 (23), B2 (123): Second battery
C1 (21), C1 (121): First capacitor
C2 (24), C2 (124): Second capacitor
L1 (22), L1 (122): First reactor
L2 (25), L2 (125): Second reactor
S1 (31), SW1 (131): First switching element
S2 (32), SW2 (132): Second switching element
S3 (33), SW3 (133): Third switching element
S4 (34), SW4 (134): Fourth switching element
SW5 (135): Fifth switching element
D1 (35), D1 (136), D2 (36), D2 (137), D3 (37), D3 (138), D4 (38), D4 (139): Diode
VB1: Voltage of first battery
VL1: Voltage between two ends of first capacitor
IL1: Current of electric path (I) and electric path (IV)
TB1: Temperature of first battery
TC1: Temperature of first capacitor
TL1: Temperature of first reactor
VB2: Voltage of second battery
VL2: Voltage between two ends of second capacitor
IL2: Current of electric path (II) and electric path (V)
TB2: Temperature of second battery
TC2: Temperature of second capacitor
TL2: Temperature of second reactor
VH: Voltage between two ends of smoothing capacitor

The invention claimed is:

1. A motor-driven vehicle comprising:
a first battery;
a second battery;
a voltage converter that includes a plurality of switching elements configured to perform bi-directional voltage conversion between an electric power output path and either one or both of the first battery and the second battery, and to switch the connection of the first battery and the second battery to the electric power output path between an in-series connection and an in-parallel connection;
a vehicle drive motor connected to the electric power output path; and
a control device configured to turn on and off the switching elements,
wherein the electric power output path includes a first electric path and a second electric path having an electric potential lower than that of the first electric path,
wherein the plurality of switching elements are configured as first to fourth switching elements which are provided in series from the first electric path toward the second electric path,
wherein the first battery is connected in parallel to the third switching element and the fourth switching element,
wherein the second battery is connected in parallel to the second switching element and the third switching element, and
wherein the control device switches connection to at least one of connection between the electric power output path and the first battery, connection between the electric power output path and the second battery, and connection between the first battery and the second battery based on the switching element from the plurality of switching elements, the temperature of which exceeds a predetermined threshold, and the operating point of the motor.

2. The motor-driven vehicle according to claim 1,
wherein the voltage of the second battery is lower than or equal to the voltage of the first battery, and
wherein when the operating point of the motor is positioned in a first region on a torque characteristic diagram relative to the rotational speed of the motor, the first region being surrounded by a first equi-power output line that defines torque relative to a rotational speed when the power output of the motor becomes constant at the maximum electric power output of the second battery, a maximum torque line that defines the maximum torque of the motor, and a first limit rotational speed line that defines a limit rotational speed relative to torque based on the voltage of the second battery, and when the temperature of either one of the second switching element and the fourth switching element exceeds the predetermined threshold value, the control device performs the switching of connection such that an electric power is transmitted and received between the electric power output path and only the battery connected in parallel to one of the second switching element and the fourth switching element, the temperature of which exceeds the predetermined threshold value.

3. The motor-driven vehicle according to claim 2,
wherein when the operating point of the motor is positioned in the first region, and the temperature of either one of the second switching element and the fourth switching element exceeds the predetermined threshold value, the control device turns on the first switching element, turns off the third switching element, turns off one of the second switching element and the fourth switching element, the temperature of which exceeds the predetermined threshold value, and turns on the other switching element.

4. The motor-driven vehicle according to claim 1,
wherein the voltage of the second battery is lower than or equal to the voltage of the first battery, and
wherein when the operating point of the motor is positioned in a second region on a torque characteristic diagram relative to the rotational speed of the motor, the second region being surrounded by a second equi-power output line that defines torque relative to a rotational speed when the power output of the motor becomes constant at the maximum electric power output of the first battery and the second battery connected in series, a maximum torque line that defines the maximum torque of the motor, and a second limit rotational speed line that defines a limit rotational speed relative to torque based on the total voltage of the first battery and the second battery, and when the temperature of either one or both of the second switching element and the fourth switching element exceeds the predetermined threshold value, the control device connects the first battery and the second battery in series, and performs the switching of connection such that an electric power is transmitted and received between both the batteries and the electric power output path.

5. The motor-driven vehicle according to claim 4, wherein when the operating point of the motor is positioned in the second region, and the temperature of either one or both of the second switching element and the fourth switching element exceeds the predetermined threshold value, the control device turns off the second switching element and the fourth switching element, and turns on the first switching element and the third switching element.

6. The motor-driven vehicle according to claim 1, wherein when the operating point of the motor is positioned in a maximum region on a torque characteristic diagram relative to the rotational speed of the motor, the maximum region being surrounded by a maximum equi-power output line that defines torque relative to a rotational speed when the power output of the motor becomes a constant maximum power output, a maximum torque line that defines the maximum torque of the motor, and a maximum limit rotational speed line that defines the limit rotational speed of the motor, and when the temperature of either one or both of the second switching element and the fourth switching element exceeds the predetermined threshold value, the control device connects the first battery and the second battery in parallel, and performs the switching of connection such that an electric power is transmitted and received between both the batteries and the electric power output path.

7. The motor-driven vehicle according to claim 6, wherein when the operating point of the motor is positioned in the maximum region, and the temperature of either one or both of the second switching element and the fourth switching element exceeds the predetermined threshold value, the control device turns on the third switching element, turns on and off each of the second switching element and the fourth switching element at a predetermined duty ratio in such a manner that the turn-on time of the switching element operated at a small duty ratio includes the turn-off time of the switching element operated at a large duty ratio, turns on the first switching element while either one of the second switching element and the fourth switching element is turned off, and turns off the first switching element while both the second switching element and the fourth switching element are turned on or off.

8. The motor-driven vehicle according to claim 1, wherein the voltage of the second battery is lower than or equal to the voltage of the first battery, and wherein when the operating point of the motor is positioned in a first region on a torque characteristic diagram relative to the rotational speed of the motor, the first region being surrounded by a first equi-power output line that defines torque relative to a rotational speed when the power output of the motor becomes constant at the maximum electric power output of the second battery, a maximum torque line that defines the maximum torque of the motor, and a first limit rotational speed line that defines a limit rotational speed relative to torque based on the voltage of the second battery, and when the temperature of the third switching element exceeds the predetermined threshold value, the control device performs the switching of connection such that an electric power is transmitted and received between the electric power output path and either one of the first battery and the second battery.

9. The motor-driven vehicle according to claim 8, wherein when the operating point of the motor is positioned in the first region, and the temperature of the third switching element exceeds the predetermined threshold value, the control device turns on the first switching element, turns off the third switching element, turns on one of the second switching element and the fourth switching element, and turns off the other switching element.

10. The motor-driven vehicle according to claim 1, wherein when the operating point of the motor is positioned in a maximum region on a torque characteristic diagram relative to the rotational speed of the motor, the maximum region being surrounded by a maximum equi-power output line that defines torque relative to a rotational speed when the power output of the motor becomes a constant maximum power output, a maximum torque line that defines the maximum torque of the motor, and a maximum limit rotational speed line that defines the limit rotational speed of the motor, and when the temperature of the third switching element exceeds the predetermined threshold value, the control device connects the first battery and the second battery in parallel, and performs the switching of connection such that an electric power is transmitted and received between both the batteries and the electric power output path.

11. The motor-driven vehicle according to claim 10, wherein when the operating point of the motor is positioned in the maximum region, and the temperature of the third switching element exceeds the predetermined threshold value, the control device turns on the third switching element, turns on and off each of the second switching element and the fourth switching element at a predetermined duty ratio in such a manner that the turn-on time of the switching element operated at a small duty ratio includes the turn-off time of the switching element operated at a large duty ratio, turns on the first switching element while either one of the second switching element and the fourth switching element is turned off, and turns off the first switching element while both the second switching element and the fourth switching element are turned on or off.

12. The motor-driven vehicle according to claim 1, wherein when the voltage of the first battery is substantially equal to the voltage of the second battery, when the operating point of the motor is positioned in a third region on a torque characteristic diagram relative to the rotational speed of the motor, the third region being surrounded by a maximum equi-power output line that defines torque relative to a rotational speed when the power output of the motor becomes a constant maximum power output, a maximum torque line that defines the maximum torque of the motor, and a third limit rotational speed line that defines a limit rotational speed relative to torque based on the voltage of the second battery, and when the temperature of the third switching element exceeds the predetermined threshold value, the control device turns off the third switching element, and turns on the other switching elements.

13. The motor-driven vehicle according to claim 1, wherein the voltage of the second battery is lower than or equal to the voltage of the first battery, and
wherein when the operating point of the motor is positioned in a first region on a torque characteristic diagram relative to the rotational speed of the motor, the first region being surrounded by a first equi-power output line that defines torque relative to a rotational speed when the power output of the motor becomes constant at the maximum electric power output of the second battery, a maximum torque line that defines the maximum torque of the motor, and a first limit rotational speed line that defines a limit rotational speed relative to torque based on the voltage of the second battery, and when the temperature of either one or both of the second switching element and the third switching element exceeds the predetermined threshold value, the control device turns on the first switching element, turns off the second switching element and the third switching element, and turns on the fourth switching element, and thus the motor is driven with the second battery.

14. The motor-driven vehicle according to claim 1, wherein the voltage of the second battery is lower than or equal to the voltage of the first battery, and
wherein when the operating point of the motor is positioned in a first region on a torque characteristic diagram relative to the rotational speed of the motor, the first region being surrounded by a first equi-power output line that defines torque relative to a rotational speed when the power output of the motor becomes constant at the maximum electric power output of the second battery, a maximum torque line that defines the maximum torque of the motor, and a first limit rotational speed line that defines a limit rotational speed relative to torque based on the voltage of the second battery, and when the temperature of either one or both of the third switching element and the fourth switching element exceeds the predetermined threshold value, the control device turns on the first switching element and the second switching element, and turns off the third switching element and the fourth switching element, and thus the motor is driven with the first battery.

15. A motor-driven vehicle comprising:
a first battery;
a second battery;
a voltage converter that includes a plurality of switching elements configured to perform bi-directional voltage conversion between an electric power output path and either one or both of the first battery and the second battery, and to switch the connection of the first battery and the second battery to the electric power output path between an in-series connection and an in-parallel connection;
a vehicle drive motor connected to the electric power output path; and
a control device configured to turn on and off the switching elements,
wherein the electric power output path includes a first electric path and a second electric path having an electric potential lower than that of the first electric path,
wherein the plurality of switching elements are configured as a first switching element, a second switching element, a third switching element, a fourth switching element, and a fifth switching element which are provided between the first electric path and the second electric path,
wherein the first switching element, the fifth switching element, and the third switching element are provided in series from the first electric path toward the second electric path,
wherein the second switching element is connected in parallel to the fifth switching element and the third switching element,
wherein the fourth switching element is connected in parallel to the first switching element and the fifth switching element,
wherein the first battery is connected in parallel to the second switching element,
wherein the second battery is connected in parallel to the fourth switching element, and
wherein the control device switches connection to at least one of connection between the electric power output path and the first battery, connection between the electric power output path and the second battery, and connection between the first battery and the second battery based on the switching element from the plurality of switching elements, the temperature of which exceeds a predetermined threshold value, and the operating point of the motor.

* * * * *